Oct. 17, 1961     W. HOPPE     3,004,704
ELECTRICAL CALCULATING MACHINE WITH OPERATIONAL
GROUPS OF SWITCHING ELEMENTS
Filed July 22, 1954     34 Sheets-Sheet 1

Oct. 17, 1961 W. HOPPE 3,004,704
ELECTRICAL CALCULATING MACHINE WITH OPERATIONAL
GROUPS OF SWITCHING ELEMENTS
Filed July 22, 1954 34 Sheets-Sheet 3

INVENTOR
Walter Hoppe
By Emory L. Groff
Attorney

Oct. 17, 1961 W. HOPPE 3,004,704
ELECTRICAL CALCULATING MACHINE WITH OPERATIONAL
GROUPS OF SWITCHING ELEMENTS
Filed July 22, 1954 34 Sheets-Sheet 4

INVENTOR
Walter Hoppe
By Emory L. Groff
Attorney

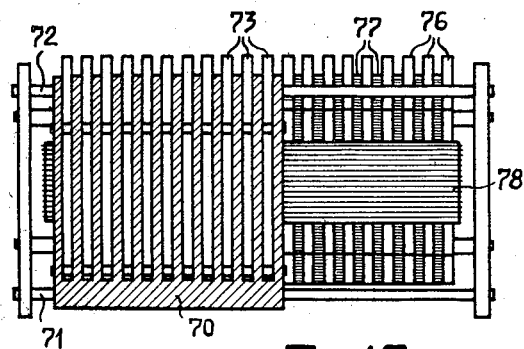
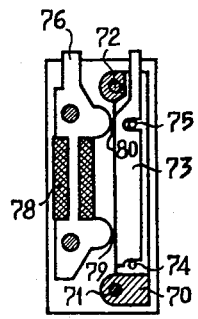
Fig. 15    Fig. 16
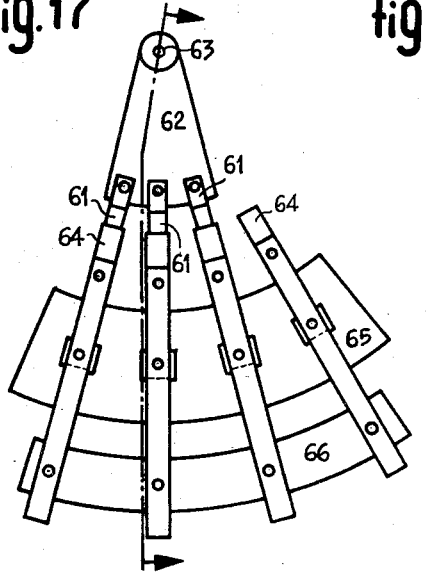
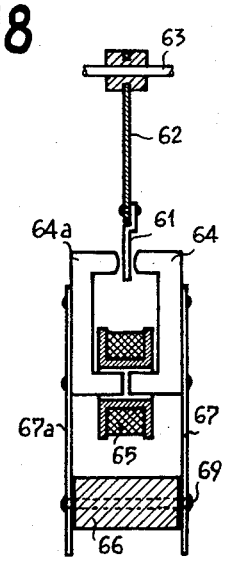
Fig. 17    Fig. 18

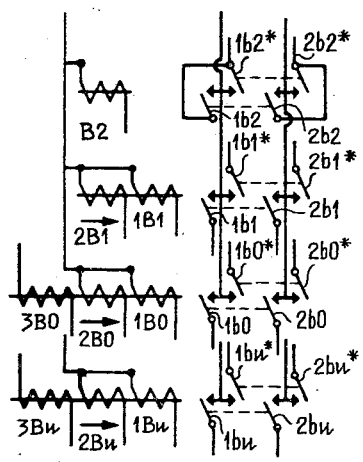
Fig. 21
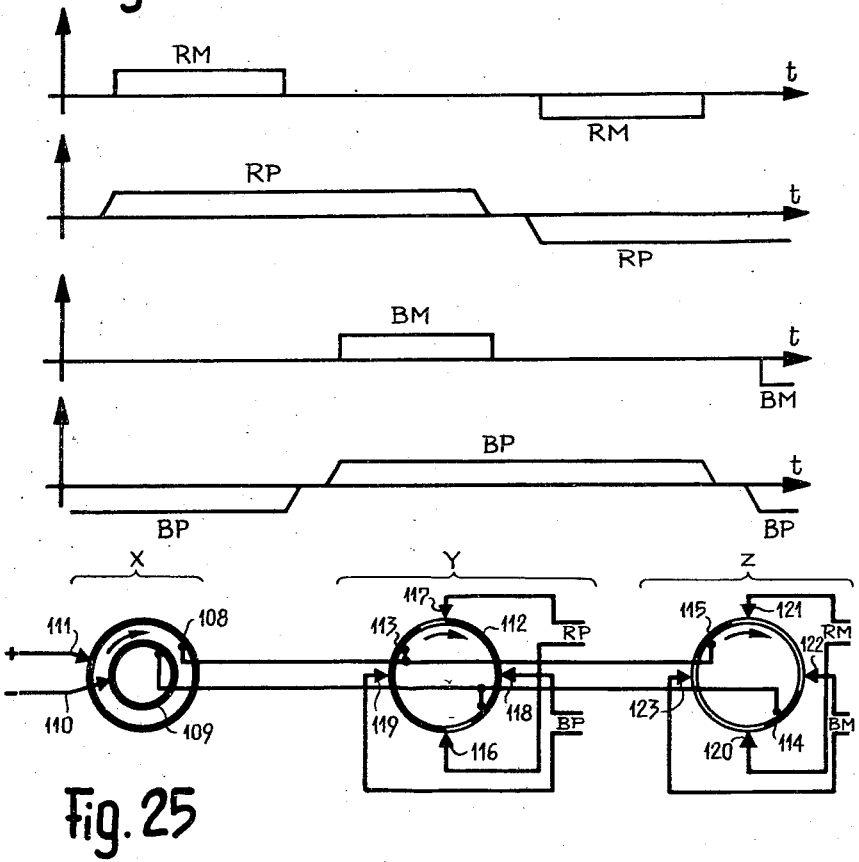
Fig. 24
Fig. 25

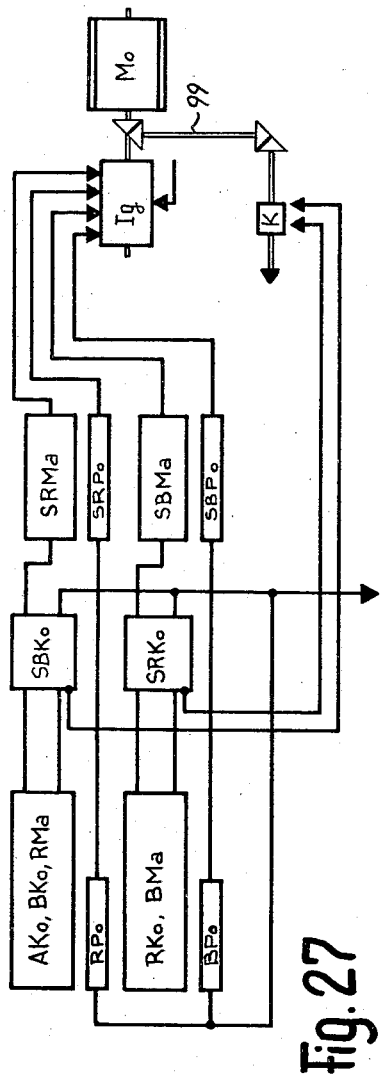
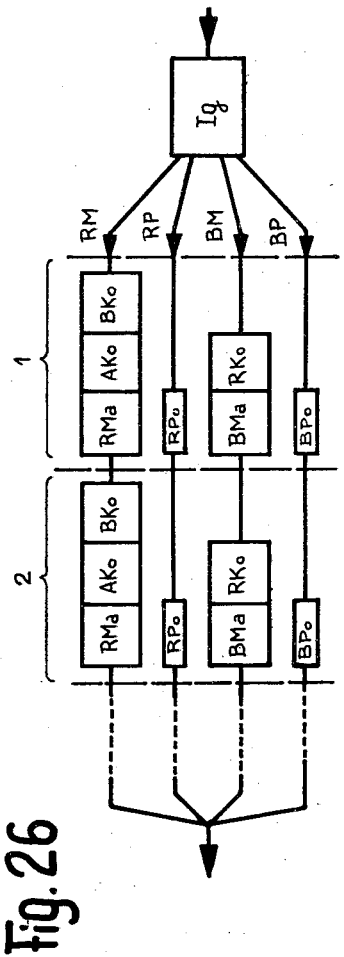
Fig. 27
Fig. 26

Oct. 17, 1961 W. HOPPE 3,004,704
ELECTRICAL CALCULATING MACHINE WITH OPERATIONAL
GROUPS OF SWITCHING ELEMENTS
Filed July 22, 1954 34 Sheets-Sheet 13

INVENTOR
Walter Hoppe
By Emory L. Groff
Attorney

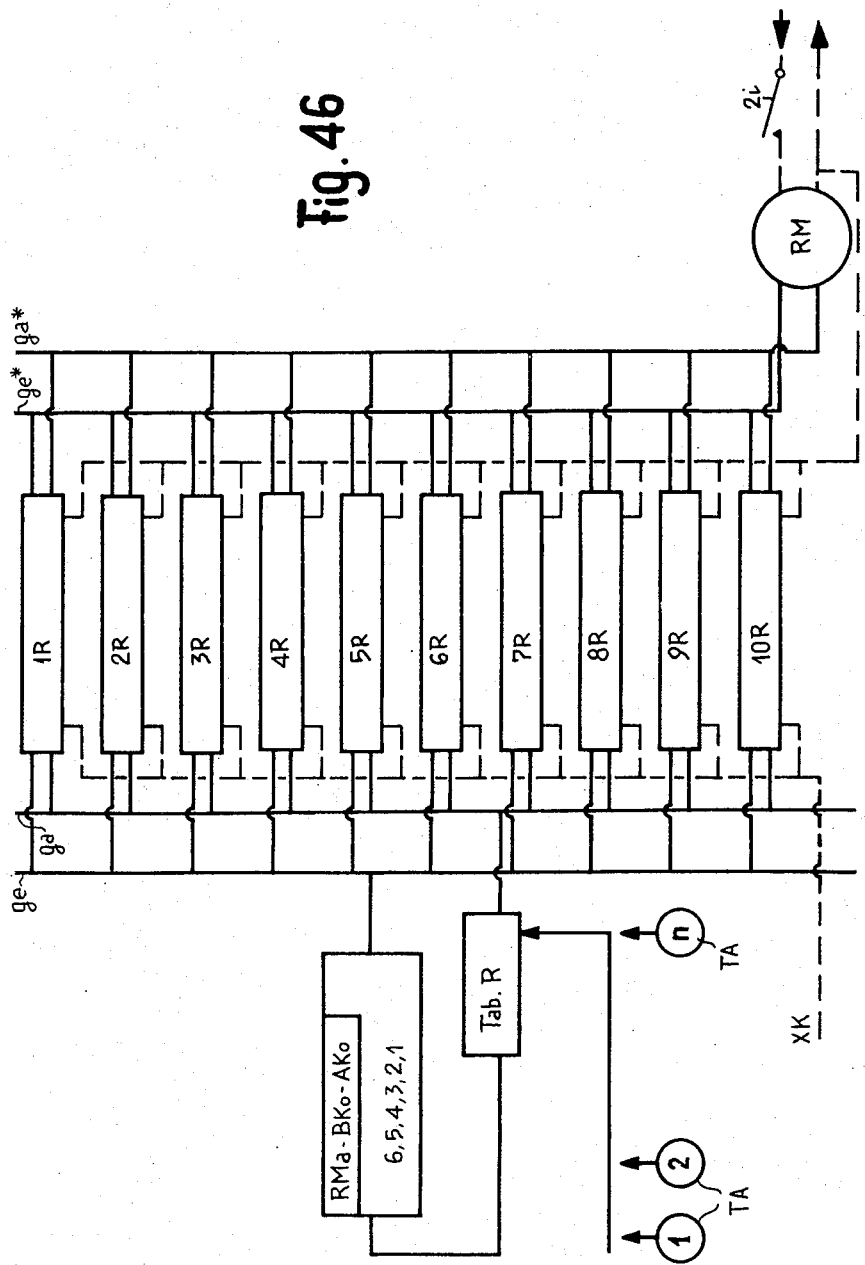

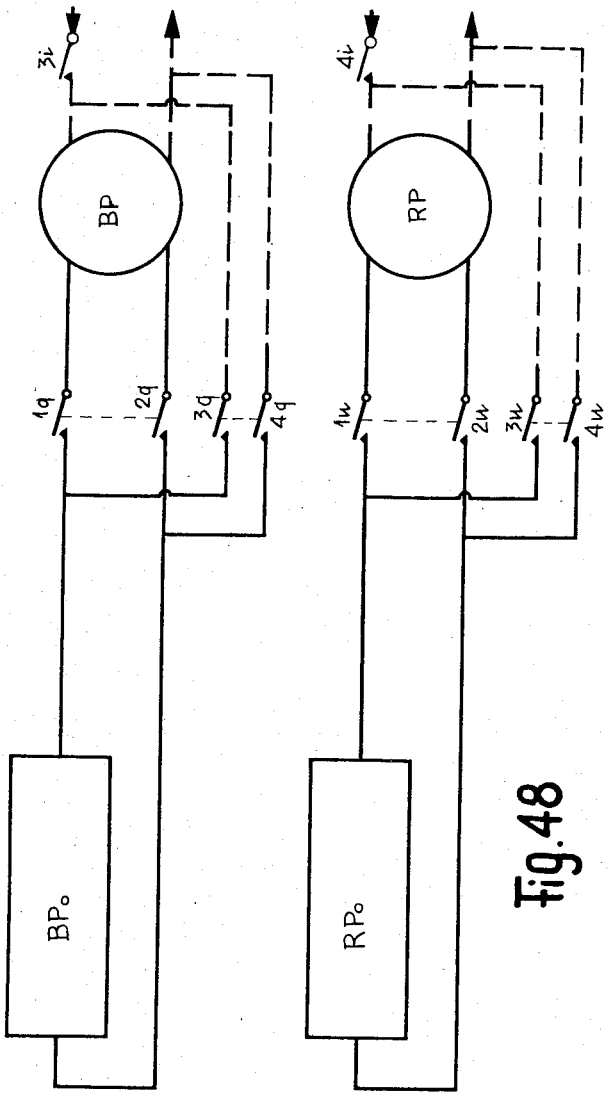

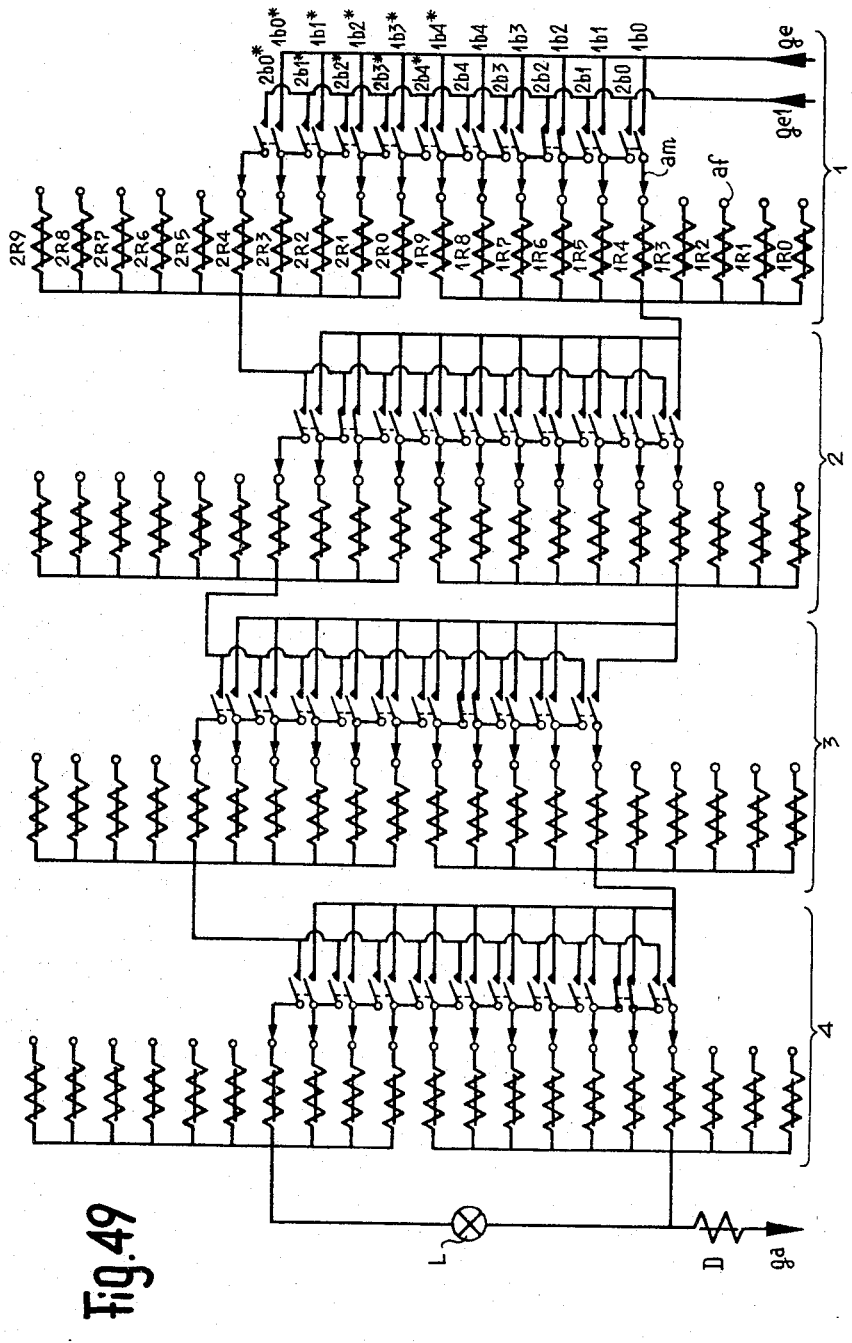

Oct. 17, 1961 W. HOPPE 3,004,704
ELECTRICAL CALCULATING MACHINE WITH OPERATIONAL
GROUPS OF SWITCHING ELEMENTS
Filed July 22, 1954 34 Sheets-Sheet 24

INVENTOR
Walter Hoppe
By Emary L. Groff
Attorney

Oct. 17, 1961 W. HOPPE 3,004,704
ELECTRICAL CALCULATING MACHINE WITH OPERATIONAL
GROUPS OF SWITCHING ELEMENTS
Filed July 22, 1954 34 Sheets-Sheet 25

INVENTOR
Walter Hoppe
By Emery L. Groff
Attorney

Oct. 17, 1961
W. HOPPE
3,004,704
ELECTRICAL CALCULATING MACHINE WITH OPERATIONAL
GROUPS OF SWITCHING ELEMENTS
Filed July 22, 1954
34 Sheets-Sheet 28
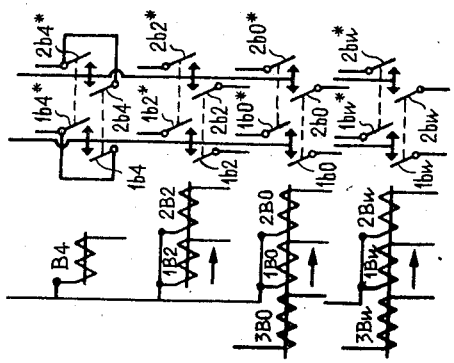
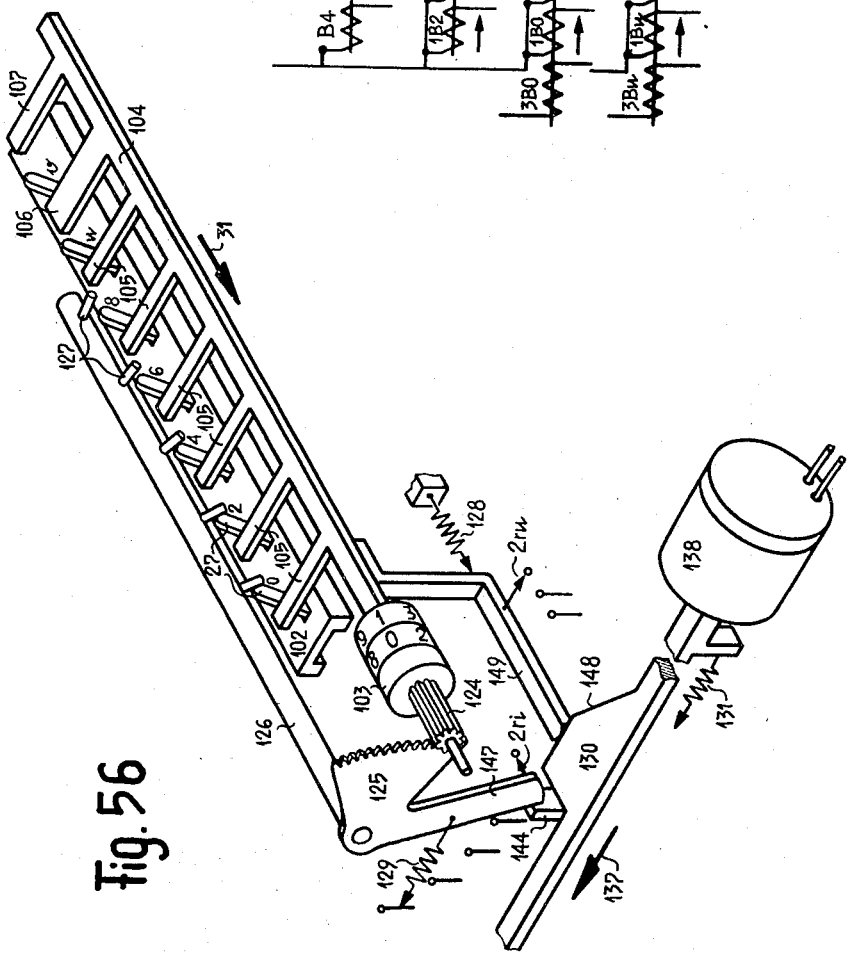
INVENTOR
Walter Hoppe
By Emory L. Groff
Attorney Oct. 17, 1961
W. HOPPE
3,004,704
ELECTRICAL CALCULATING MACHINE WITH OPERATIONAL GROUPS OF SWITCHING ELEMENTS
Filed July 22, 1954
34 Sheets-Sheet 32

INVENTOR
Walter Hoppe
By Emory L. Groff
Attorney

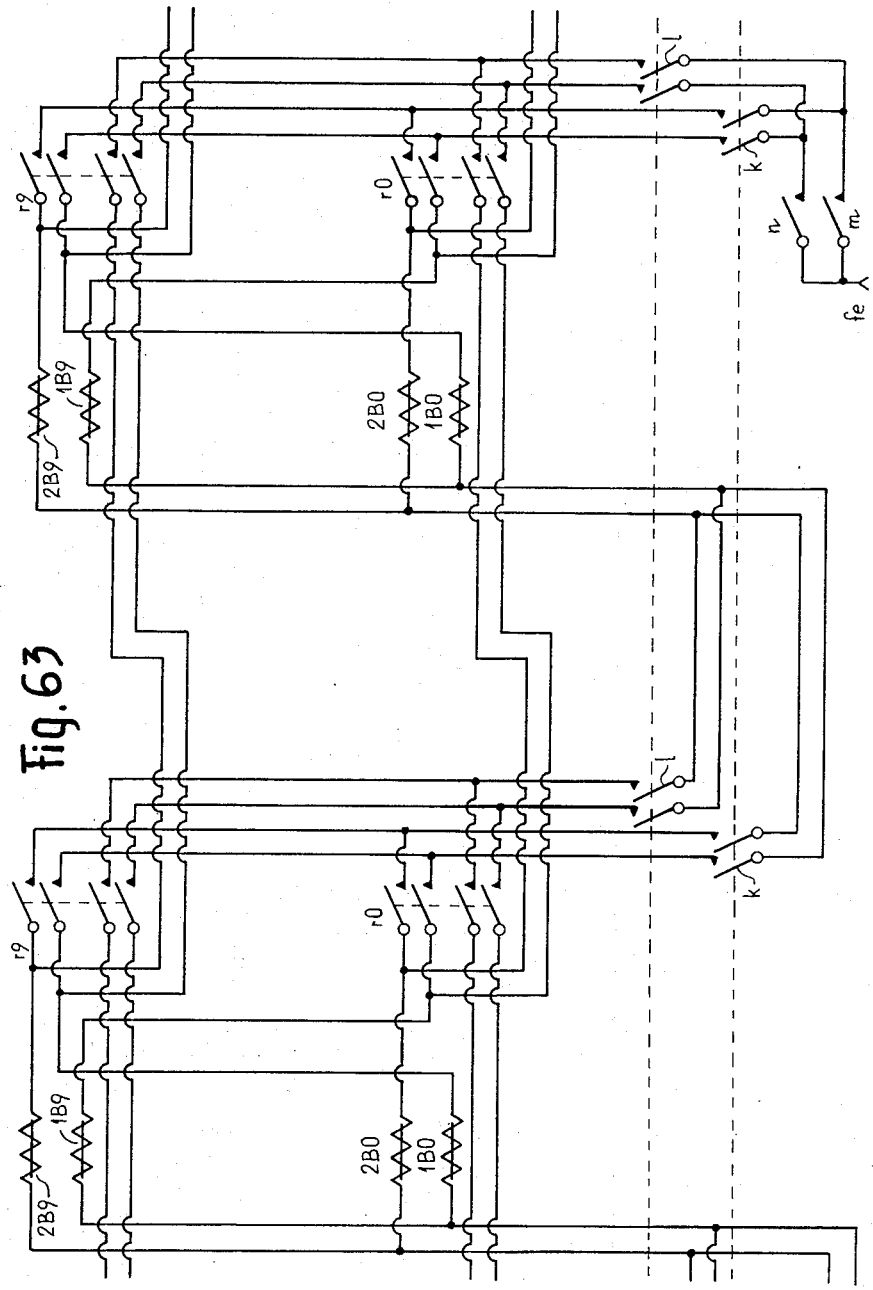

United States Patent Office 3,004,704
Patented Oct. 17, 1961

3,004,704
ELECTRICAL CALCULATING MACHINE WITH OPERATIONAL GROUPS OF SWITCHING ELEMENTS
Walter Hoppe, Bern, Switzerland, assignor to El-Re-Ma S.A. per lo sfruttamento di brevetti, Lugano, Switzerland, a corporation of Switzerland
Filed July 22, 1954, Ser. No. 445,070
Claims priority, application Switzerland July 31, 1953
30 Claims. (Cl. 235—159)

This invention relates to electrical calculating machines.

More particularly the invention concerns an electrical calculating machine controlled by current impulses, comprising at least three groups A, B and R of switching elements, for the introduction into the machine of the numbers involved in an arithmetical operation and for the performance of this operation, and a set of control parts determining the kind of operation to be performed. The elements of the A group have the function of defining one of the two numbers involved in an arithmetical operation and are connected to the elements of the B group in such a way that the numbers defined in the A and B groups are involved in a calculation phase, the result of which is defined by the elements of the R group. The characteristic feature of this calculating machine is that the A group comprises switching elements that make it possible to perform a single one of the two simple arithmetical operations, groups B and R comprising switching means to make it possible to perform compound calculation operations, a mechanism being provided to set the elements of the A group in positions defining one of the numbers involved in an arithmetical operation and to maintain them in those positions until the calculation is completed, the elements of the R group being connected to those of the B group so as to transfer to the latter, during a transfer phase, a number that depends on the number defined by the elements of the R group, the control parts being designed to order an alternating sequence of calculation and transfer phases as well as circuit changes in the elements of the B and R groups, depending on the kind of operation to be performed. By "simple arithmetical operation" is meant addition or subtraction. All the other arithmetical operations are made up of a series of "simple operations" and are designated as being "compound arithmetical operations."

As described above, setting the elements of the A group is independent of the arithmetical operation chosen. Since the switching positions of these elements remain the same throughout an entire calculation operation, it is possible to use relays with a relatively long reaction time in the A group, or switches actuated directly by depressing the keys of a keyboard, without appreciably decreasing the speed of the calculation for the compound operations (division, multiplication).

It is advisable to arrange the general system of the machine in such a way that the A group contains switching elements able to establish several connections at once, while the B and R groups, in which the numbers vary constantly, as do the positions of the connections of these groups, contain switching elements designed to establish only a small number of connections.

A calculating machine able to perform the four fundamental operations should be able in particular to perform addition, subtraction and denomination row shifting. In the various machines described below subtraction is obtained by means of a complementary formation that takes place in the B group or in the R group, and not in the A group as is usual. This leads to a different control of the calculations which will be described by means of a subtraction example, while an exact description of the means needed to perform multiplication and division will be given later in connection with an embodiment of the machine according to the invention. The following example applies to a machine with three denomination rows and deals with the subtraction 625−37=588.

In the customary form of calculation, the number in the A group is converted into its ten's complement and then an addition is performed:

$$\begin{array}{r}625\\+\ 963\\\hline 1:\ 588\end{array}$$

The 1 on the left is beyond the capacity of the machine and therefore is not read out.

In a machine according to the invention, however, the number in the B group can be converted into its ten's complement and added to A $$\begin{array}{r}375\\+\ 037\\\hline 412\end{array}$$

In this way the ten's complement of the desired result is obtained, so that a new conversion to the complement must be performed. In order to maintain the number set up in group A, another addition has to be performed:

$$\begin{array}{r}412\\+\ 037\\\hline 449\end{array}$$

Finally, another addition is performed, prior to which the number 449, which is to be transmitted to the B group, is once more converted into its complement by means of the same apparatus. This addition leads to the final result:

$$\begin{array}{r}551\\+\ 037\\\hline 588\end{array}$$

It is seen from this example that maintaining the connections in the A group for additions and subtractions makes it necessary to perform the latter by means of an operation composed of three additions.

Likewise, denomination row shifting too is possible without changing the number set up in the A group and without requiring a system differing from the system for addition.

The following description indicates, by way of example and with reference to the attached set of drawings, three embodiments and certain variants of the calculating machine with which the invention is concerned.

FIGURES 15 to 18 represent two embodiments of a multiple-contact slider;

FIGURE 21 illustrates the principle of the conversion of a number into its nine's complement;

FIGURE 24 is an illustration of an impulse diagram in functions of time permitting sequential operation of calculation and transfer phases, thereby holding the armatures of the R switch group in position during the transfer phase and those of the B switch group during the calculation phase;

FIGURE 25 is a schematic representation of a collector commutator adapted to supply impulses according to FIGURE 24;

FIGURE 26 shows in a very schematic way the feeding of the calculator and transfer circuits from a generator Ig delivering current impulses;

FIGURE 27 is a schematic illustration of a control mechanism adapted to change the direction of the current during the transfer and calculation phases;

Figure 35:
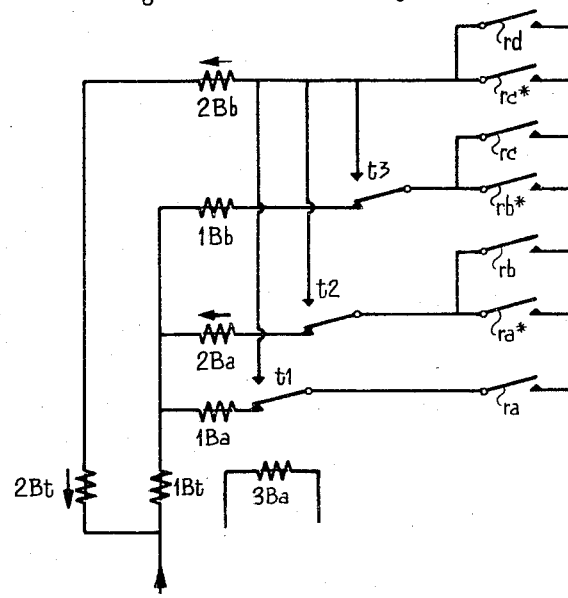
Figure 34:
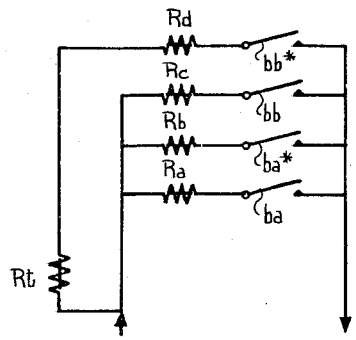

FIGURES 34 and 35 concern a tabulating control device.

Figure 19:
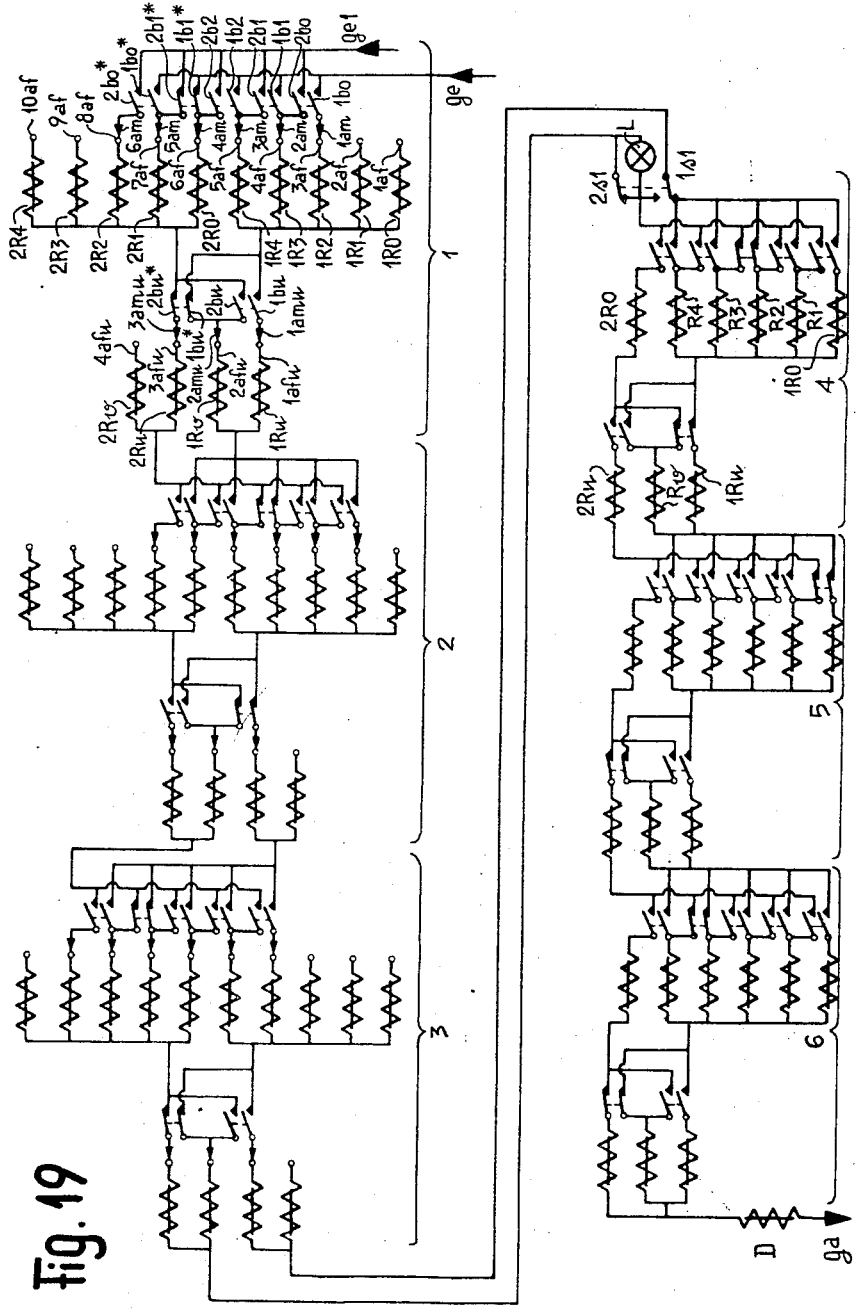
FIGURE 19 is a diagrammatic representation of a calculation circuit permitting the addition of the numbers defined in the A and B switch groups, whose result is defined by the contacts of the R switch group.
Figure 20:
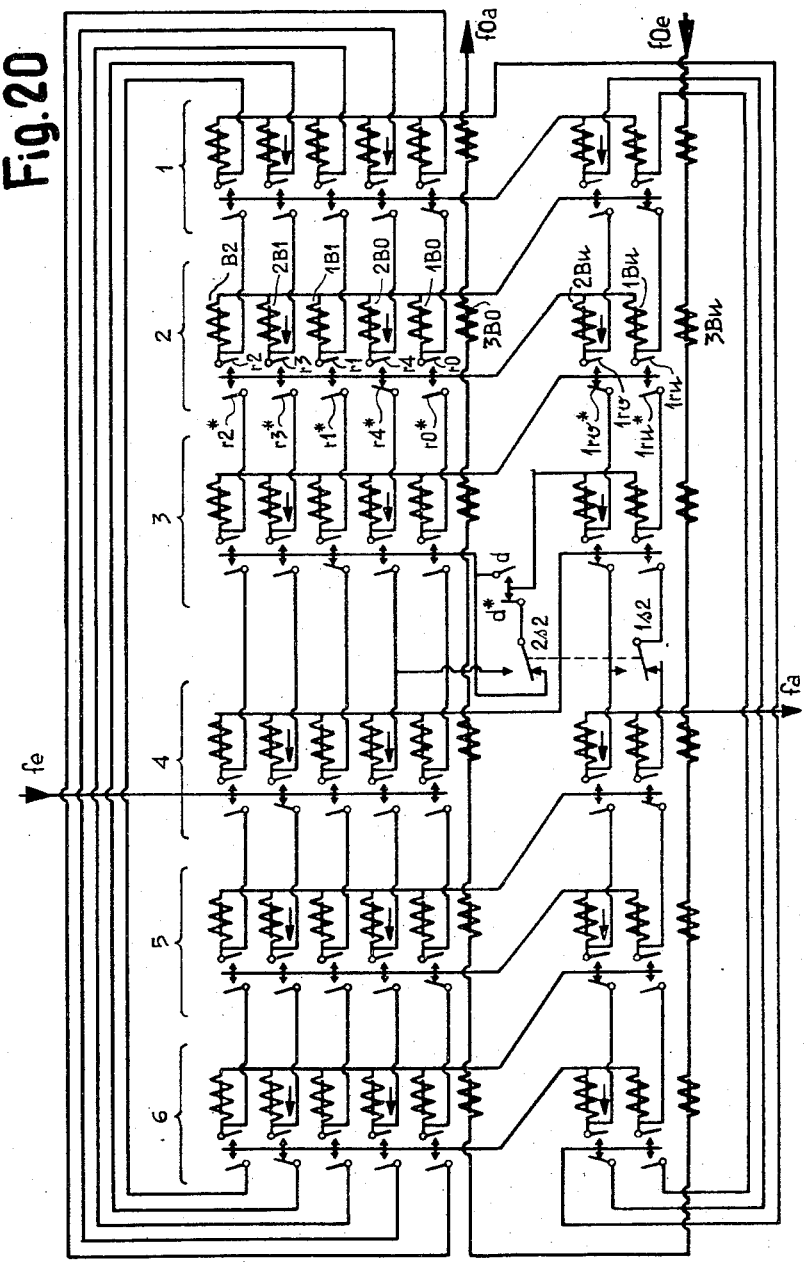
FIGURE 20 is a schematic representation of a transfer circuit permitting transfer into the B switch group, the result set up in the R switch group.
Figure 36:
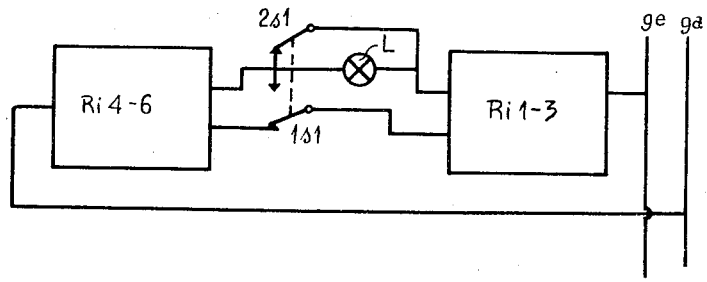
Figure 37:
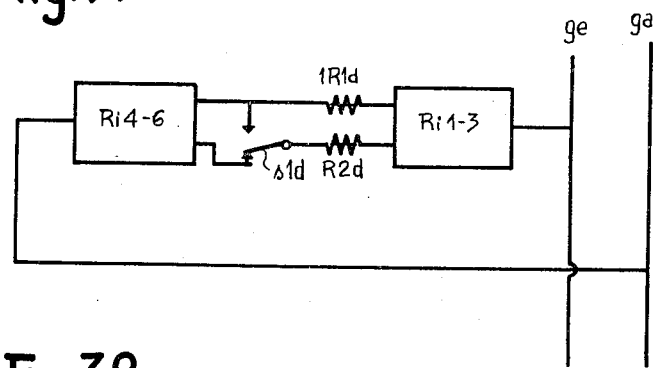
Figure 38:
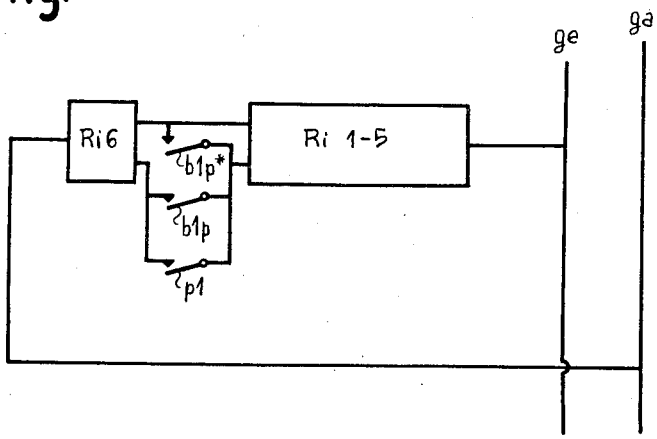
Figure 39:
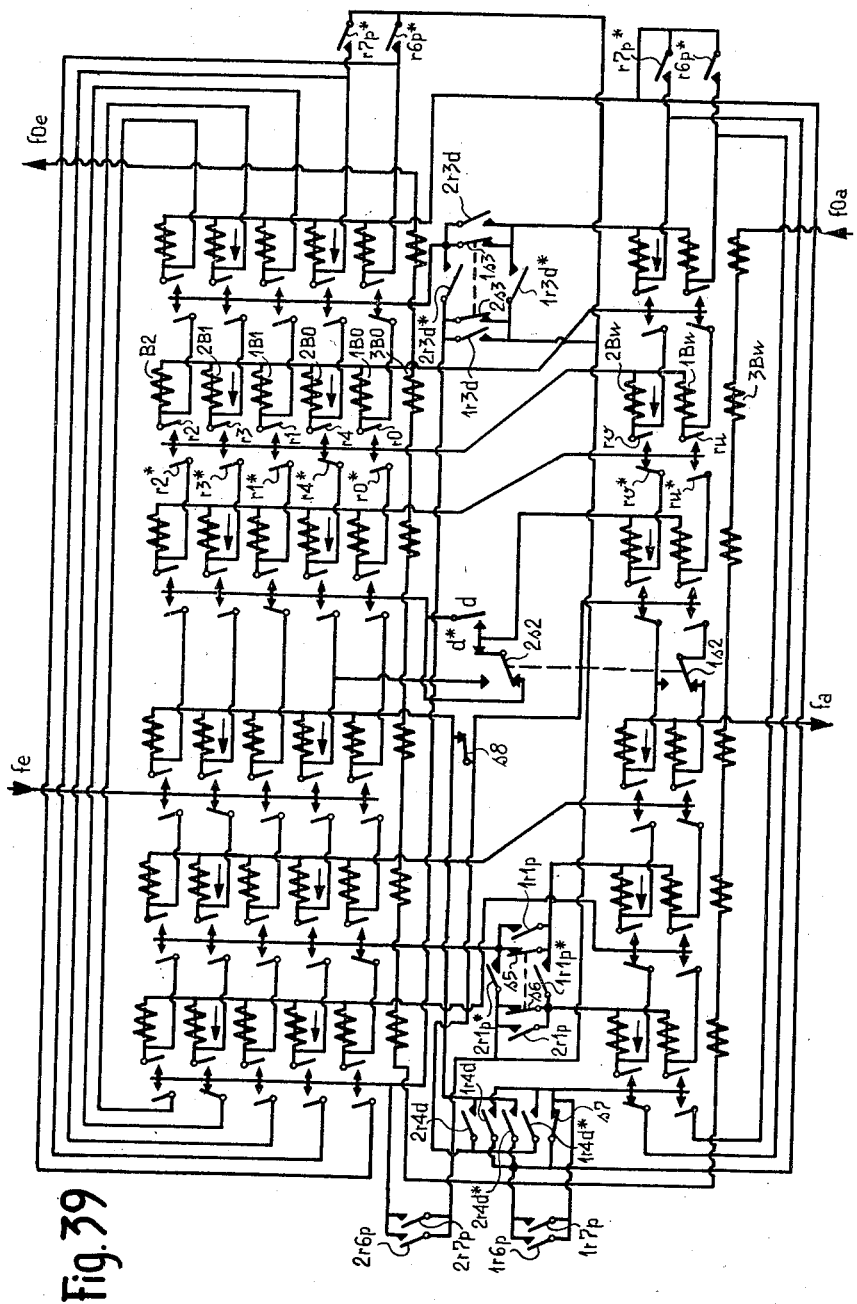
Figure 40:
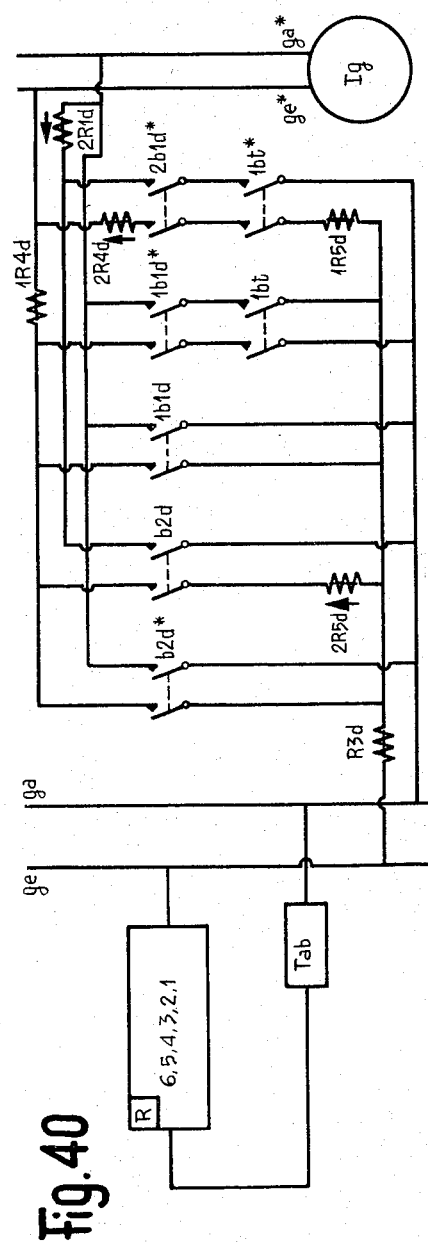
Figure 41:
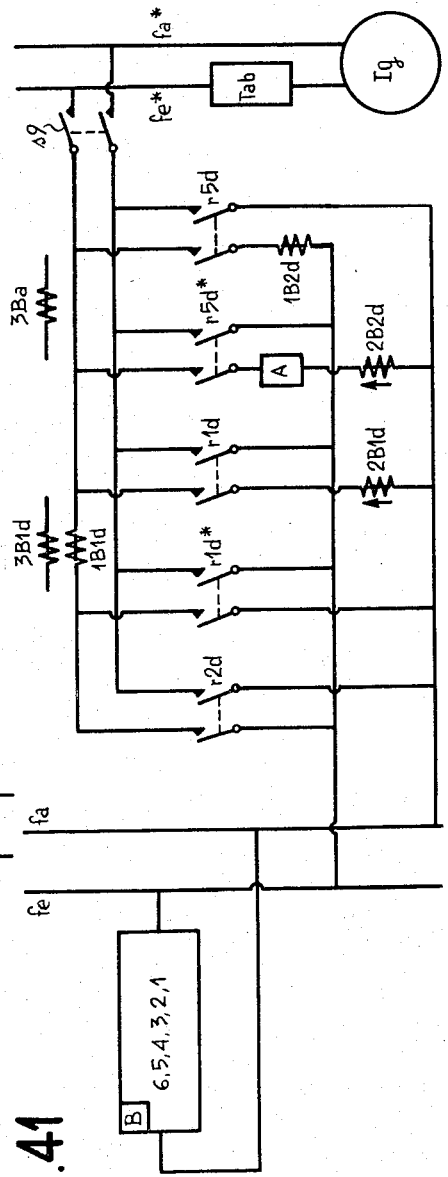
Figure 42:
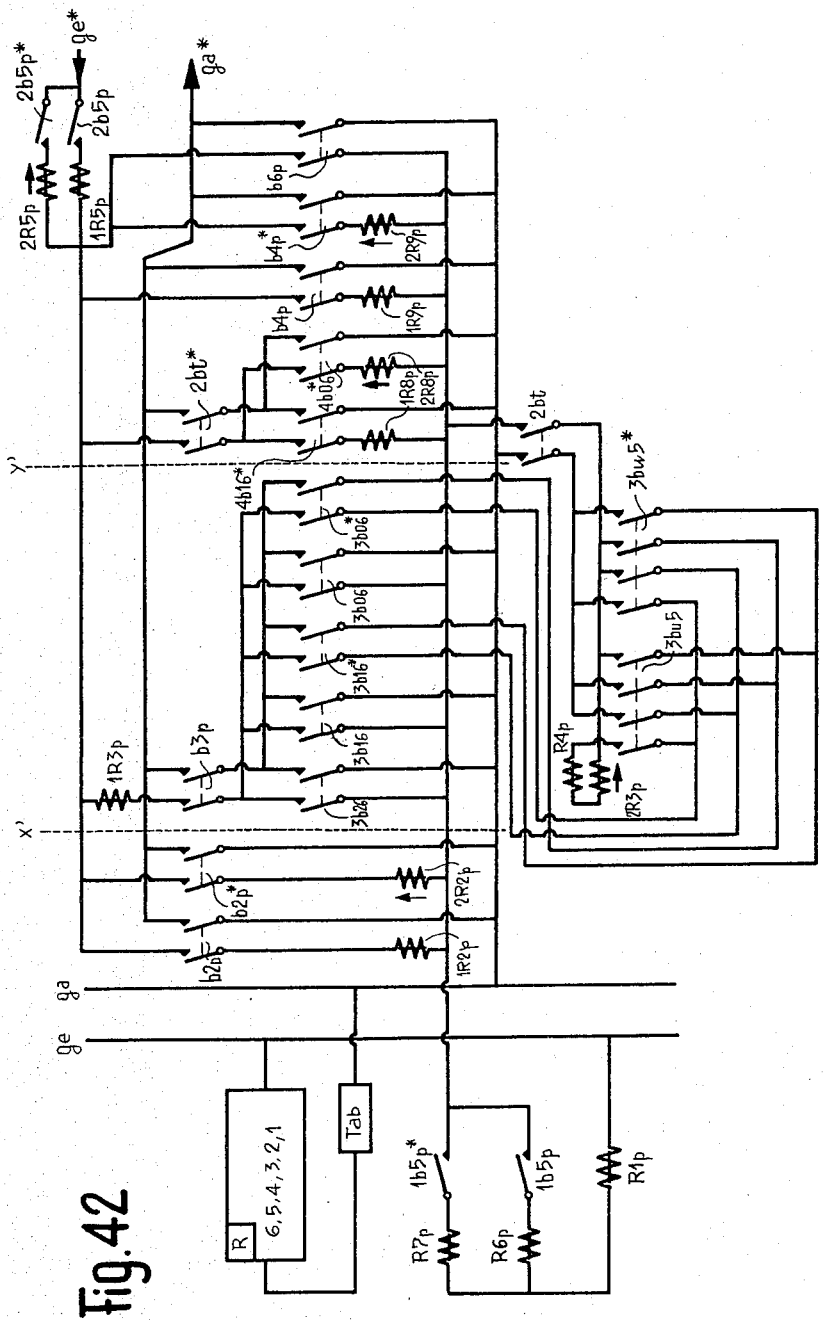
Figure 43:
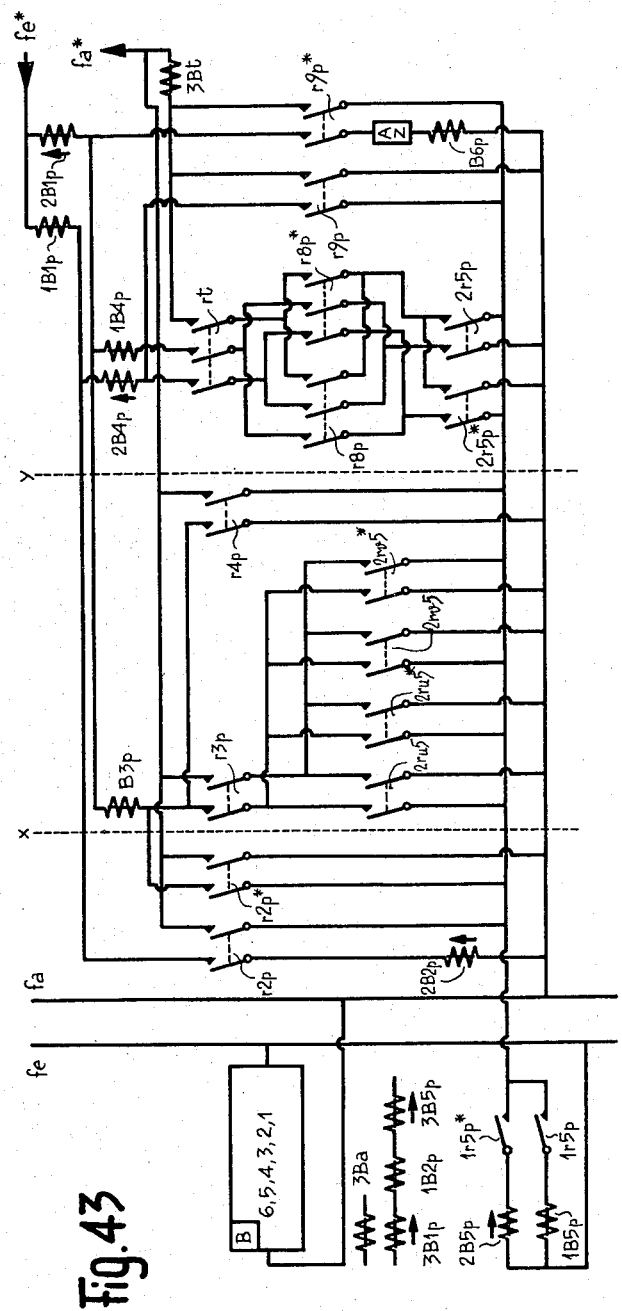
Figure 44:
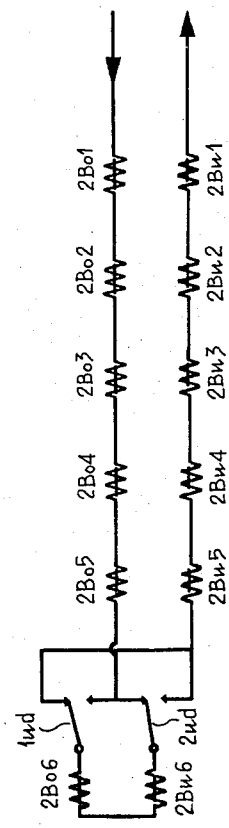
Figure 45:
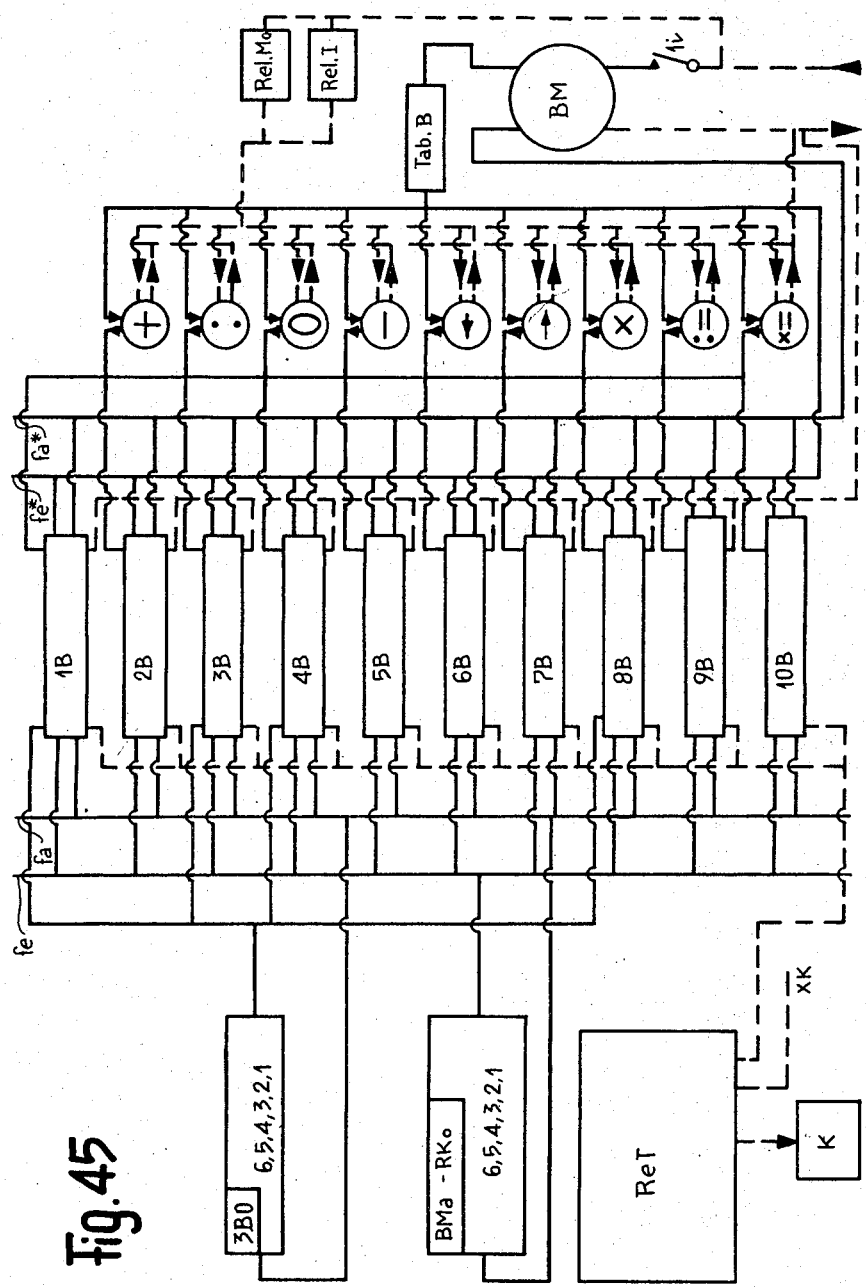
Figure 50:
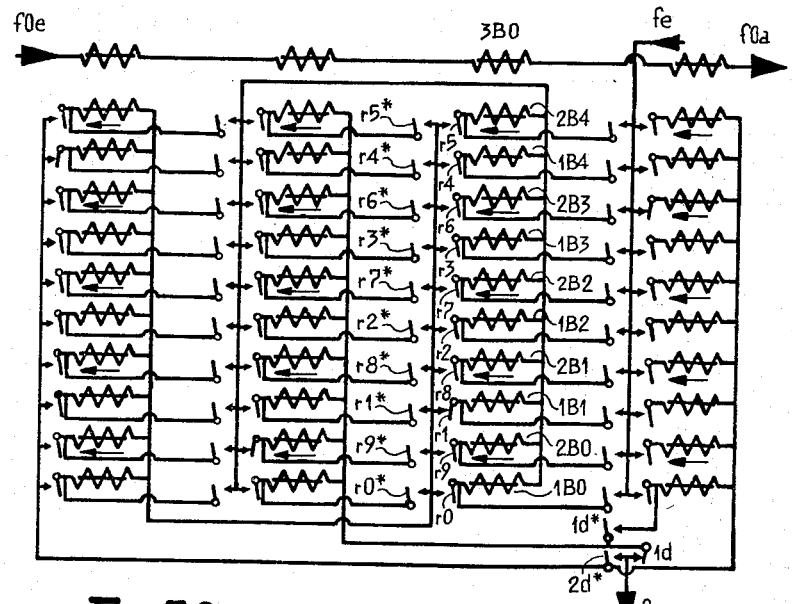
Figure 51:
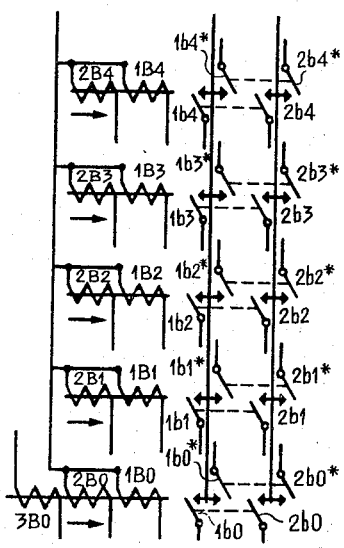
Figure 52:
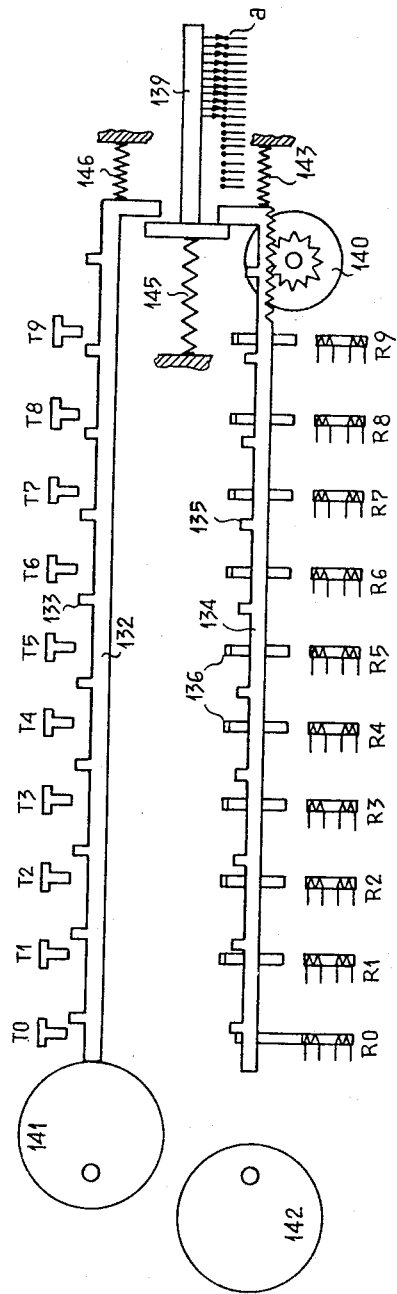
Figure 53:
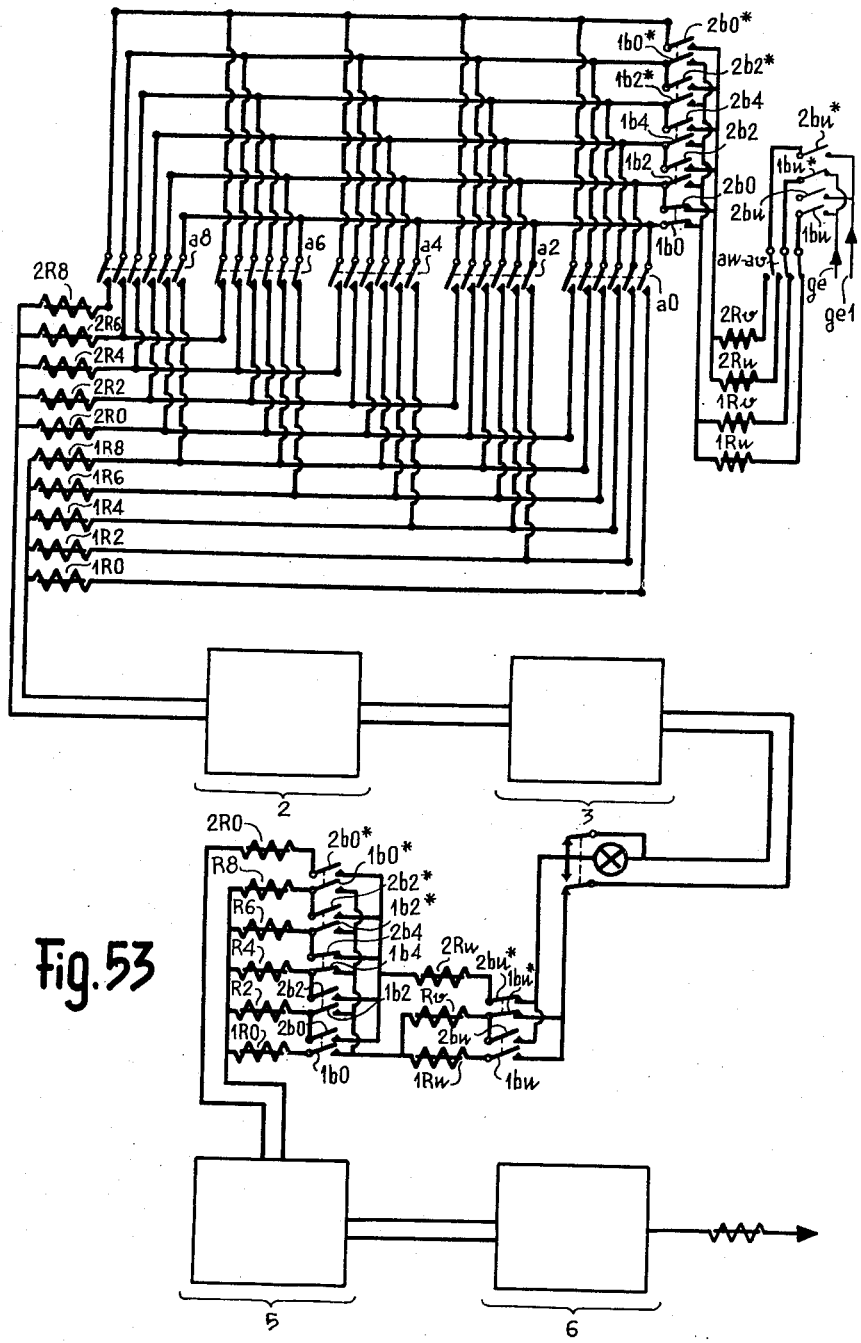
Figure 54:
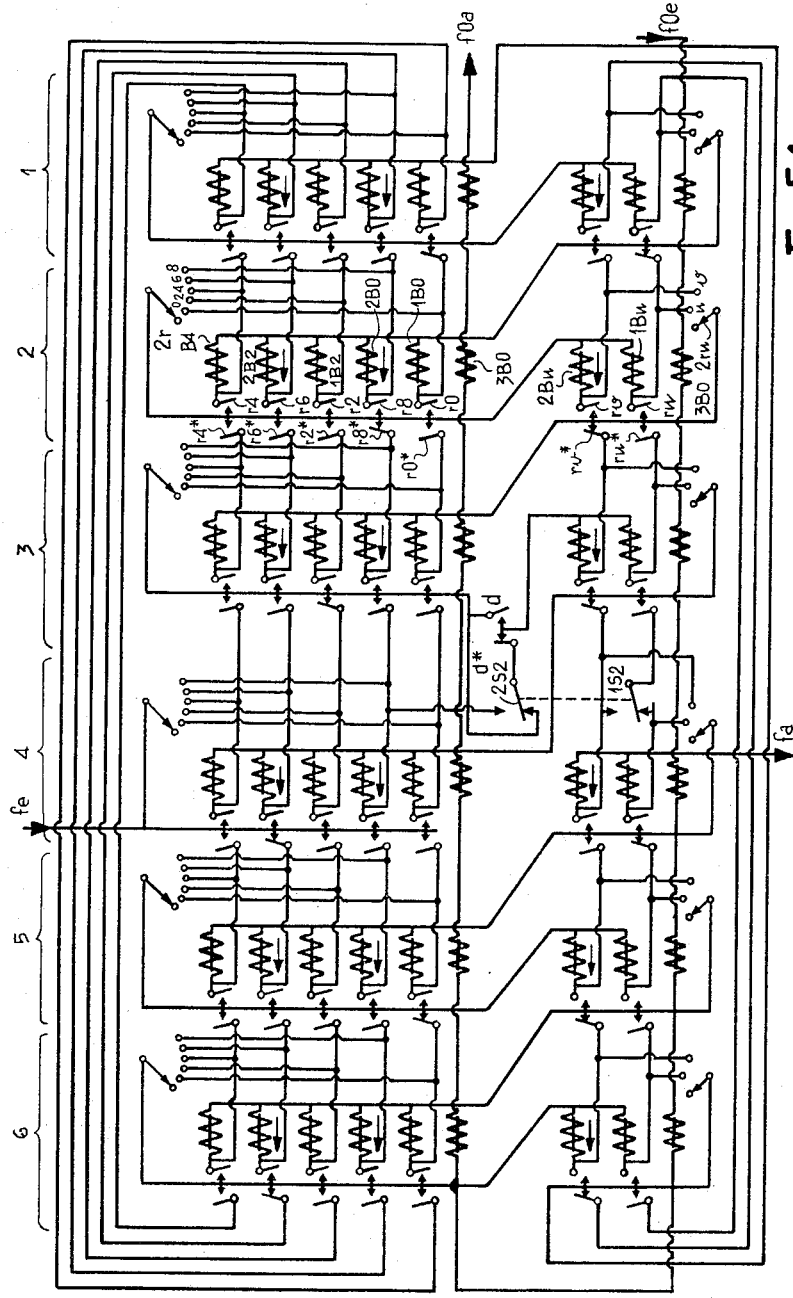
Figure 57:
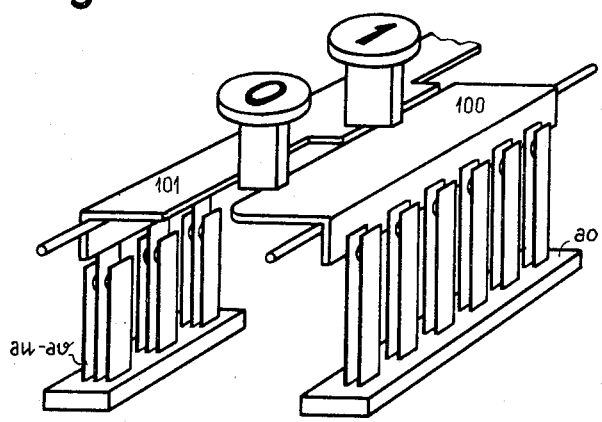
Figure 58:
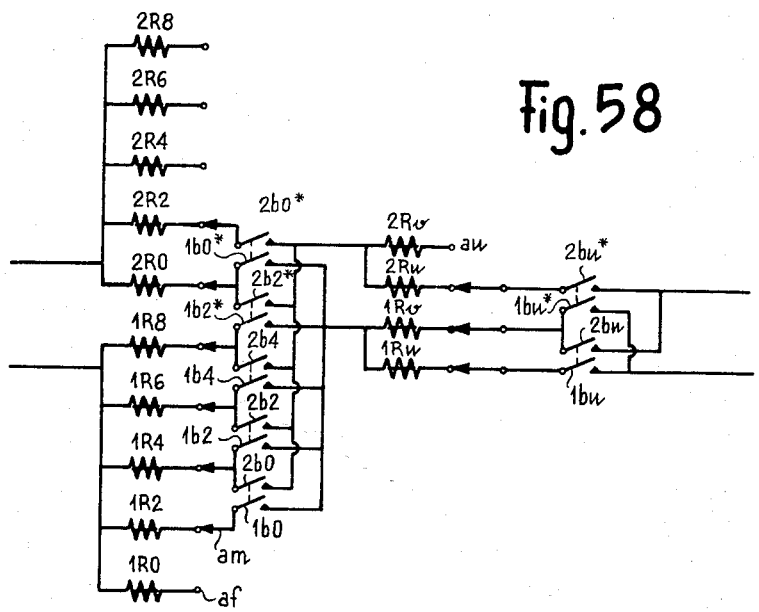
Figure 59:
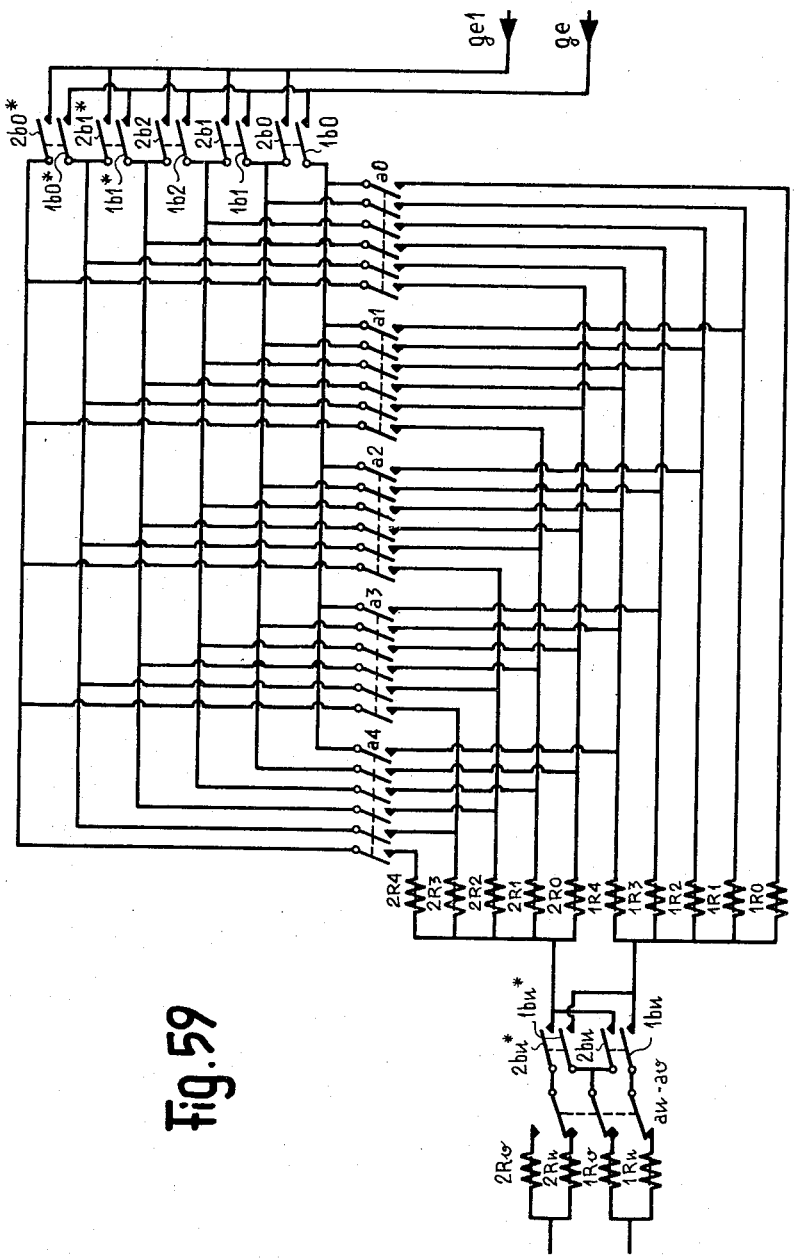
Figure 60:
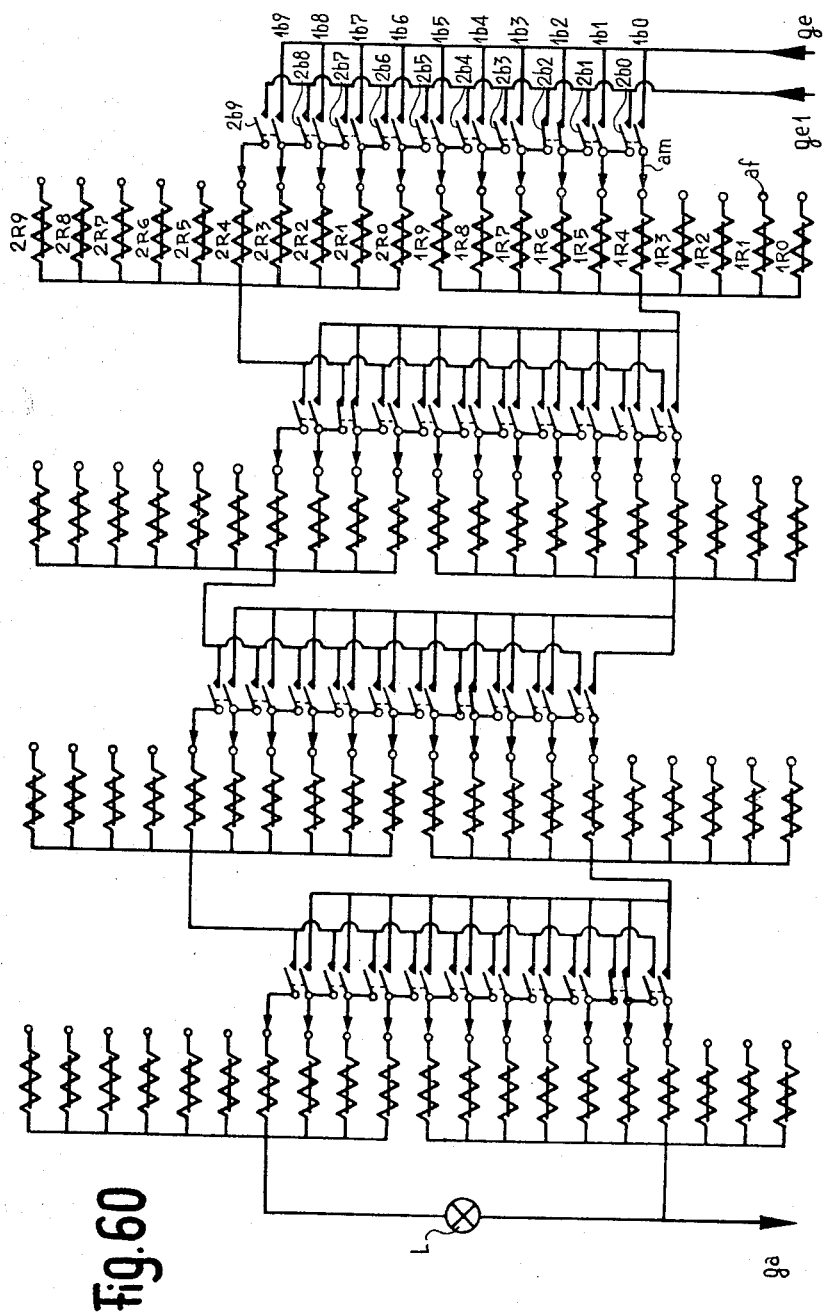
Figure 61:
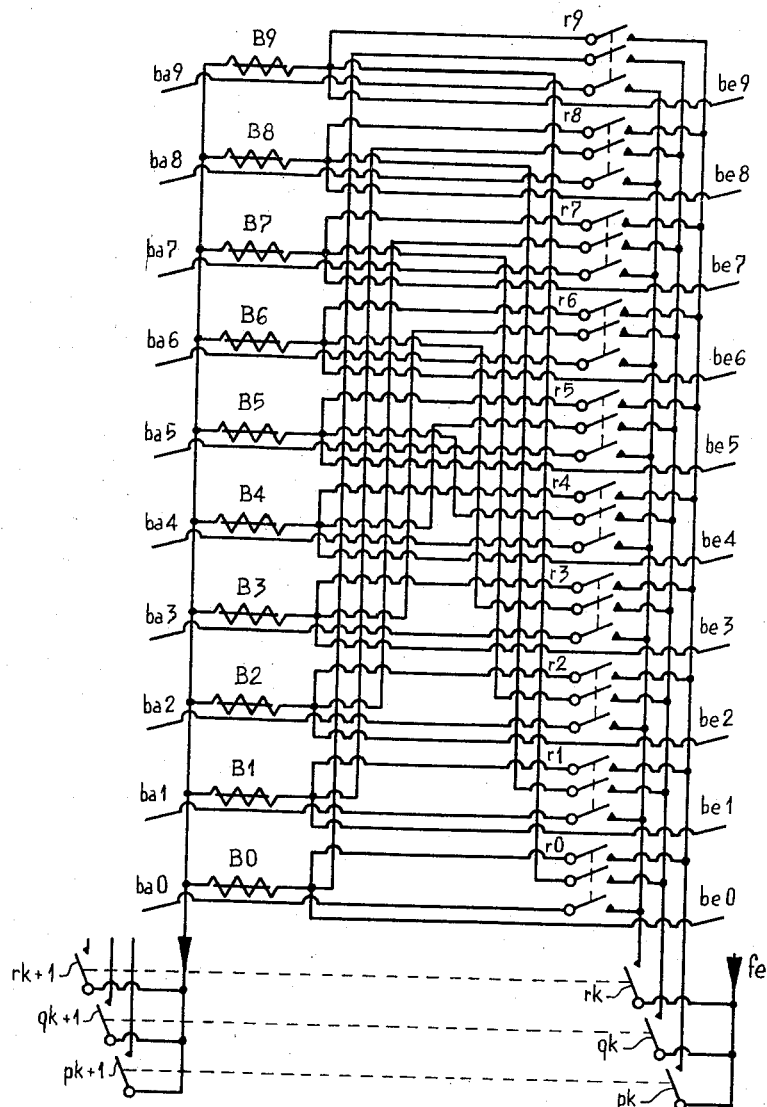
Figure 62:
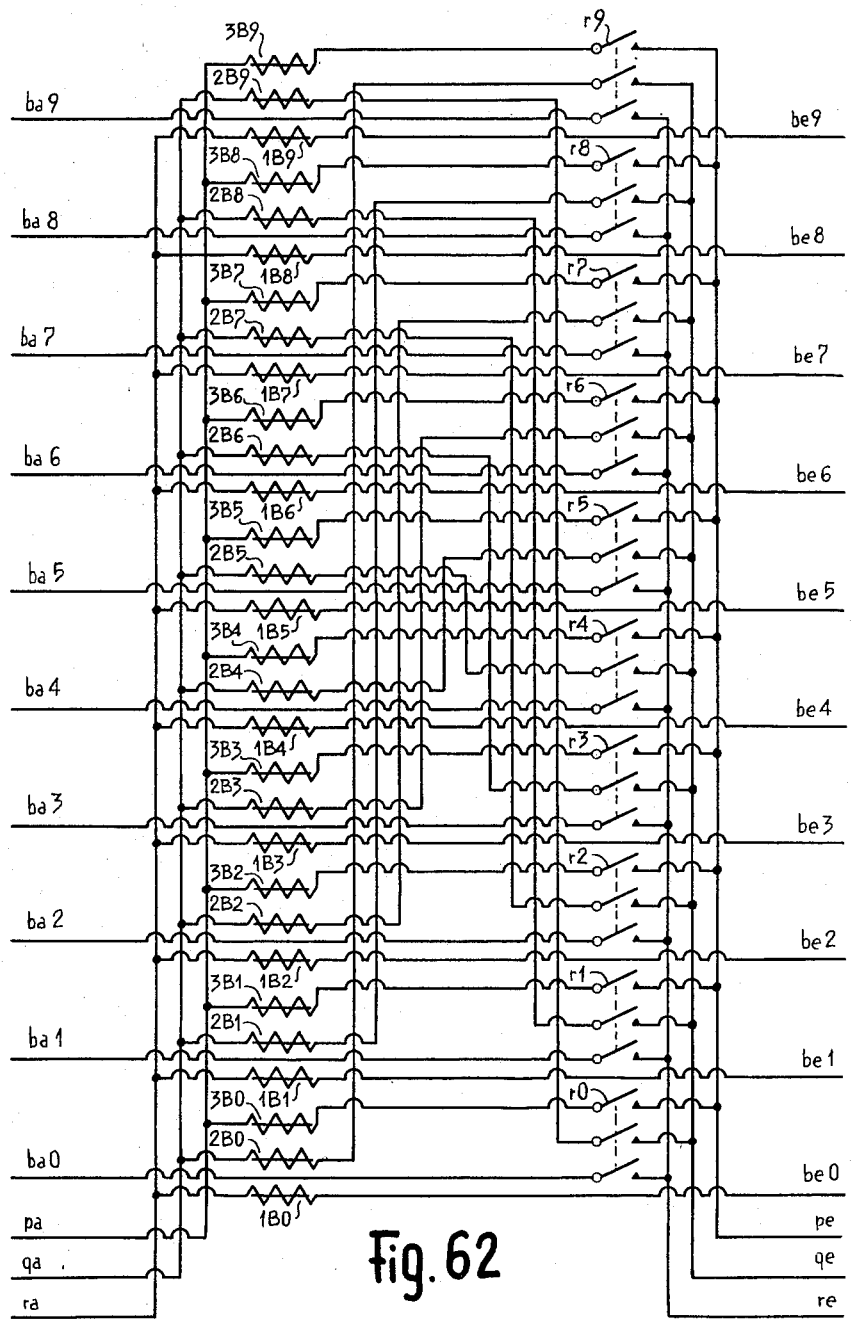

FIGURE 36 shows a diagram permitting the execution of non-automatic division;

FIGURE 37 shows very schematically the calculator circuit provided for automatic division;

FIGURE 38 shows very schematically the calculator circuit modified to permit the execution of multiplications;

FIGURE 39 represents the B circuit of FIGURE 20 with the connections necessary for automatic division and multiplication;

FIGURES 40 and 41 show, respectively, the control-device circuit for division, for the calculator and transfer circuits;

FIGURES 42 and 43 are a schematic representation of the multiplication circuit;

FIGURE 44 represents a simple diagram making it possible to obtain the result of a multiplication operation by using two elementary operations;

FIGURE 45 shows the various parts connected between the transfer circuit BMa—Rko and the impulse output BM of the impulse generator;

FIGURE 46 also represents the parts located between the calculation circuit RMa—BKo—AKo and the impulse generator output for the RM impulses;

FIGURES 47 and 48 represent the connections between the polarization windings BPo and RPo, respectively, and the corresponding output conductors of the impulse generator;

FIGURE 49 represents the calculation circuit of a machine in a second embodiment of the invention, comprising four denomination rows and operating on the decimal system;

FIGURE 50 represents the corresponding transfer circuit;

FIGURE 51 shows in detail the contacts and windings of the relays of a denomination row of the B group;

FIGURE 52 illustrates the mechanical portion for introducing the numbers into the A group and the read-out mechanism provided for this machine;

FIGURE 53 schematically represents the third embodiment of the calculation circuit;

FIGURE 54 shows the transfer circuit thereof;

FIGURE 55 shows the principle of the formation of the complement thereof;

FIGURE 56 schematically represents the read-out mechanism thereof;

FIGURE 57 shows an embodiment of the keyboard contacts thereof;

FIGURE 58 represents the calculation circuit for one denomination row of the odd-even system wherein multiple contact sliders are used as in FIGURE 19;

FIGURE 59 represents a denomination row on the biquinary system, in which a table of addition has been used;

FIGURE 60 illustrates the calculation circuit of a four-denomination-row machine operating on the decimal system;

FIGURE 61 shows the diagram of a denomination row of the transfer circuit of a machine using the circuit of FIGURE 60;

FIGURE 62 represents another modification of a transfer circuit;

FIGURE 63 represents a diagram of the first two successive denomination rows of a transfer circuit under still another embodiment, this circuit being designed to allow a transfer with a denomination row shift and a conversion to the complement at the same time.

*Polarized relays with at least three positions.*—The construction of these relays is very important for the proper technical construction of the calculating machines. The first thing shown is several embodiments of relays that can be used in the embodiments of calculating machines described hereinafter. These relays are, moreover, described in greater detail in application Ser. No. 320,218, now Pat. No. 2,794,158. The relays illustrated in FIGS. 1 to 14 not only have a greater number of positions than normal electromagnetic relays, but are also smaller and lighter, thus making it possible to construct calculating machines of the size of the customary office machines.

By reason of the fact that their magnetic parts make it possible to establish the electrical contacts directly, the relays can be of simpler construction and smaller dimensions than ordinarily constructed relays.

Figure 1:
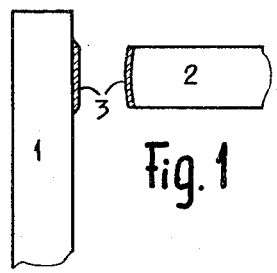
FIGURES 1 and 2 show the principle of direct electrical contact between armatures and core.
Figure 2:
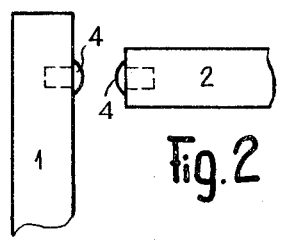

FIG. 1 represents a core 1 and the end of an armature 2, the two having the purpose of providing an electrical contact. To this end they are coated with a layer 3 of precious metal, which makes it possible at once to insure a stable electrical contact and to decrease the remanence in the magnetic circuit. In FIG. 2, precious metal layers 3 are replaced by contact rivets 4.

Figure 3A:
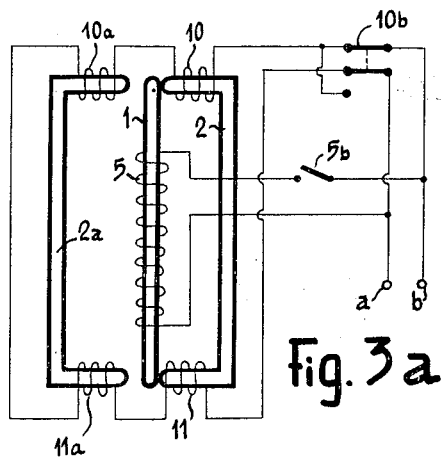
FIGURE 3a shows schematically a relay of the type shown in FIGURE 3 and shows how it is connected to a source of current, the terminals being indicated by $a$ and $b$.
Figure 3:
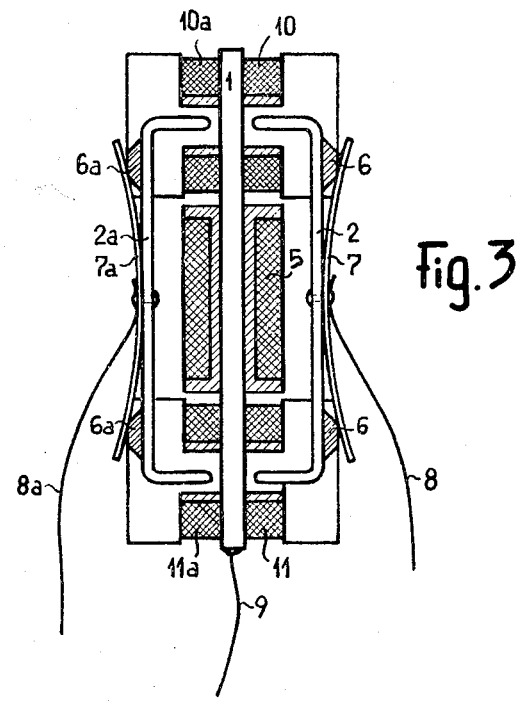
FIGURE 3 illustrates a preferred embodiment for a three-position relay.

The relay illustrated in FIG. 3 comprises a magnetic core 1 bearing a control winding 5, as well as two armatures 2 and 2a which are held against stops 6 and 6a by springs 7 and 7a. Input conductors 8 and 8a, in the form of wires or flexible strips, are connected to these armatures, while a third input conductor 9 is connected to the core. The poles of armatures 2 and 2a, which are U-shaped, plunge into polarization coils 10, 11 and 10a, 11a, respectively to be magnetically polarized by the latter. The ampere-turns of these polarization coils are so chosen that when the effect of a polarization coil is contrary to that of the control coil, the resultant magnetic field is not strong enough to cause the attraction of an armature subjected to this field. When a current is sent through control coil 5, for instance, so that core 1 has its south magnetic pole up and its north magnetic pole down, armature 2 is attracted while armature 2a is not. If the direction of the current is reversed, whether in the polarization coils or in main coil 5, then it is armature 2a that is attracted. The armatures make the electrical contact with the core 1 at two points (at their two ends), which increases the certainty of this contact's functioning. This relay constitutes a switching element that can assume the following three positions:

0 : Armatures 2 and 2a are not attracted (main coil without current).
Input conductor 9 is not connected to 8 and 8a.
I : Armature 2 is attracted, 9 is connected to 8.
II : Armature 2a is attracted, 9 is connected to 8a.

If the current intensity in the windings, the width of the air gap between core 1 and armatures 2 and 2a, and the thickness of contact layer 3 or of contact rivets 4 are suitably chosen, it is possible to insure that, after the excitation of coil 5 has been broken, the attracted armature, 2 or 2a, is maintained in its attracted position by the action of polarization coils 10 and 11 or 10a and 11a, respectively. When the current is interrupted in the polarization coils, the attracted armatures return to rest position under the action of springs 7 and 7a.

Figure 3a shows schematically a relay of the type shown in FIGURE 3 and shows how it is connected to a source of current, the terminals being indicated by a and b. A switch 5b permits control of the current into the main coil 5, while a commutator 10b permits passage of the current in one direction or another into the coils 10, 10a, 11 and 11a. In the position shown the armature 2a is maintained attracted to the core 1 due to the current of polarization passing in the coils 10 and 11 although the main coil 5 is no longer excited as a result of the opening of switch 5b.

Figure 4:
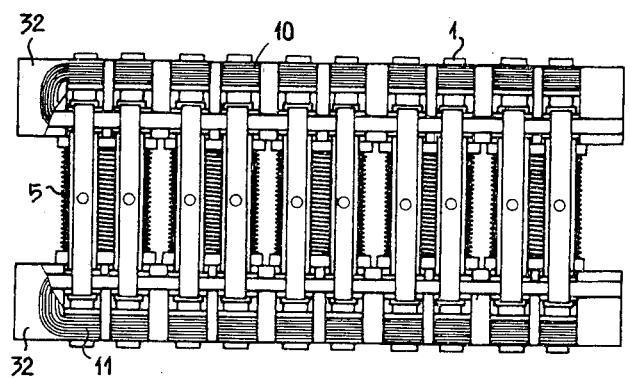
FIGURE 4 shows a set of five relays according to FIGURE 3.

FIG. 4 represents a group made up of five relays of the same sort as those shown in FIG. 3, but in which each control coil 5 surrounds two parallel cores 1 magnetically and electrically insulated from each other. Each of these cores cooperates with two armatures 2 and 2a. In this case it is advisable to have ports 32 made of insulating material supporting these elements and at the same time making up the body of the polarization coils 10, 11 and 10a, 11a of the armatures. The armatures 2a and polarization coils 10a and 11a are not visible in the drawing.

In the assembly that is shown, a coil in common 11 is seen to surround the lower end of armatures 2 of the five elements and another coil in common 10 to surround the upper end of these armatures.

Figure 5:
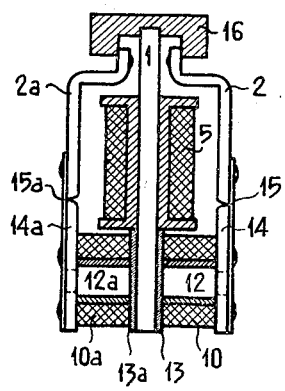
FIGURES 5, 6 and 7 show other embodiments of the said relays.

The relay shown in FIG. 5 has a core 1 surrounded by a control coil 5. Polarization coils 10 and 10a are mounted on studs 12 and 12a, which are separated from the core by insulating layers 13 and 13a and carry parts 14 and 14a on which armatures 2 and 2a are attached by leaf springs 15 and 15a. A part 16 made of insulating material serves as a stop for the armatures and makes it possible to set the maximum air gap between them and the core.

The excitation of polarization coils 10 and 10a polarizes the armatures, and when the current passes through control coil 5, armature 2 or 2a is attracted, depending on the direction of the polarization.

It goes without saying that several relays according to FIG. 5 could be combined to form an assembly of the same kind as the one in FIG. 4.

The combination of magnetic circuits and electrical contacts, as illustrated in the examples of FIGS. 1 to 5, is of advantage in the construction of the relays, but yet is not indispensable.

Figure 6:
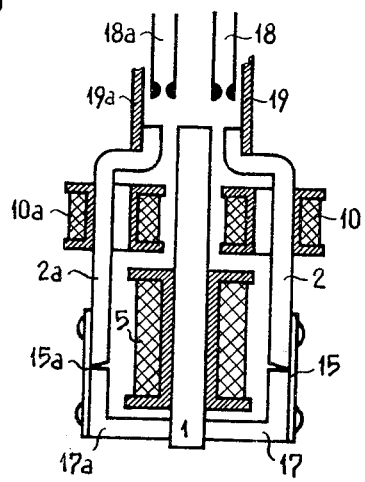

FIG. 6 represents an instance in which the electrical contacts are separate from the magnetic circuit. Core 1 bears a control coil 5 and armatures 2 and 2a are attached by springs 15, 15a to parts 17, 17a firmly attached to the core. These armatures are polarized by coils 10, 10a and operate contacts 18, 18a through insulating parts 19, 19a.

Figure 7:
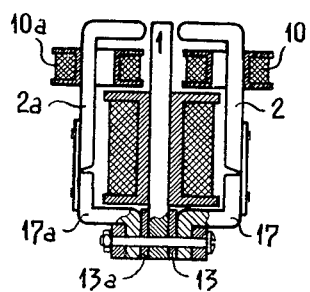

FIG. 7 represents a similar apparatus, but with direct contacts between armatures 2 and 2a and core 1. In this embodiment, parts 17 and 17a must be insulated from core 1 by an insulating layer 13, 13a.

Figure 8:
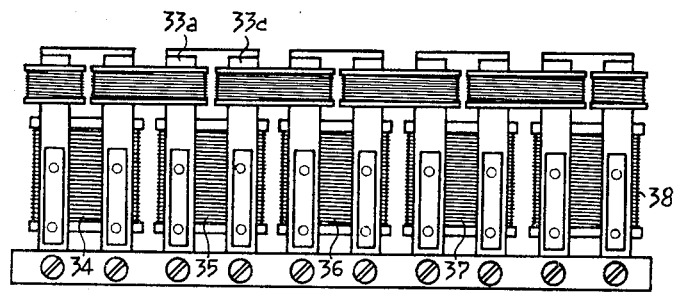
FIGURES 8 and 9 represent a combination of five five-position relays according to FIGURE 6.

FIG. 8 illustrates an assembly made up of five relays according to FIG. 7, in a way analogous to FIG. 4. It is to be remarked that in this case, however, the arrangement of the polarization coils provides that each relay has five positions 0, I, II, III, IV, the 0 position being the rest position, for which no electrical contact is established.

Figure 9:
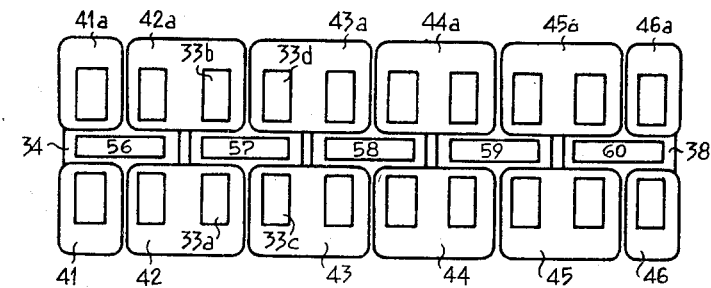

As is seen from FIG. 9, it is possible, by connecting the polarization coils suitably, to polarize three armatures of a group of four in one sense and the fourth in the other sense, so that by sending through a control current with suitable polarity, a single armature out of the group of four can be caused to be attracted.

The five relays of this set each have a core 56, 57, 58, 59 and 60 going through main windings 34, 35, 36, 37 and 38, respectively. Each core is designed to coact with four armatures capable of entering into contact with it. Core 57 cooperates with armatures 33a, 33b, 33c, 33d, which are polarized by four coils 42, 42a, 43 and 43a. If polarization coils 41 to 46 as well as 41a, 43a, 45a are connected in the same sense, but coils 42a, 44a, 46a, contrariwise, in the opposite sense, and if a current is sent only through control coil 35, choosing its direction in such a way that only those armatures that are polarized by coils 42a, 44a, 46a are attracted, then only armature 33b will be attracted when the control coil is excited. By varying the connections and the direction of the current in the polarization coils, it is possible to obtain at will the attraction of one or the other of the four armatures 33a, 33b, 33c, 33d.

It is understood that the polarization coils in common, in the group of relays illustrated in FIG. 4, could be replaced by several coils as is indicated in FIG. 8. Thus, each main winding 5 would surround two parallel cores 1 magnetically and electrically insulated from each other. A group of two armatures can then be placed on either side of the said cores 1, these armatures being likewise electrically and magnetically insulated from each other, with the result that each relay can have four independent armatures, none of which is attracted for position 0, while the two armatures of one group are attracted for position I and the two armatures of the other group for position II.

The relays according to FIGS. 3 to 8 are especially well suited to performing calculation operations electrically. If it is desired to show the result of a calculation visibly, this result being determined by the positions of certain armatures, an electrical indicator may be used, printing if desired as is already known in certain calculating machines of this type. In the embodiments described hereinafter, however, a means is shown for reading out directly, by a mechanical process, the result defined by the relays used in the calculation.

For this pupose supplementary or auxiliary means must be provided on these relays. Since the armatures that close the contacts travel only a short distance, it is advisable to provide relay sensing or feeling parts to read the position of these armatures. These relay sensing parts are designed to go through a much greater trajectory than the armatures do, which makes it possible to simplify the construction of the read-out mechanism. The reaction time of these sensing parts is much longer than that of the relays, but this is unimportant, since the read-out operation takes place only once for each calculation, whereas for a multiplication, for example, a large number of successive motions of the armatures (about 30 to 50) have to be reckoned with. The sensing parts of the relays described hereinafter are designed in such a way as to remain inactive during the calculation operations properly so called.

Figure 10:
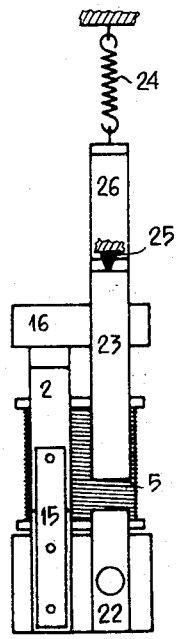
FIGURES 10 to 14 show relays equipped with feeling parts.
Figure 11:
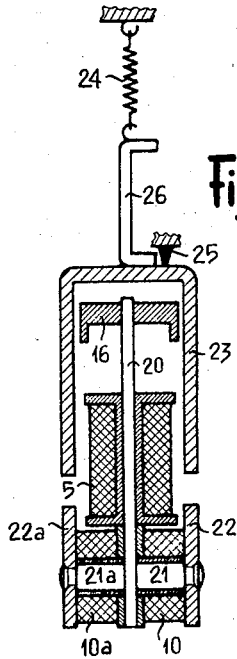

FIGS. 10 and 11 show the principles of an embodiment in which a sensing part is formed by a portion of the mechanical elements of the relay. A portion of the latter corresponds exactly to what is shown in FIG. 5. Control coil 5, however, is wound around still another core 20 bearing studs 21, 21a and parts 22, 22a. These last cooperate with a U-shaped armature 23 held against a stop 25 by a spring 24 in the rest position. When a read-out operation is to be performed, a stronger current is sent first of all through polarization coils 10, 10a so as to attract armatures 23 of all the elements. Then a current is sent through the control coil of the element containing a result, while the polarization current is interrupted. All the armatures 23 of the various elements return to their rest positions except that of the element whose control coil is excited, for through the excitation of this last a closed magnetic circuit is formed by core 20, parts 21, 21a, 22, 22a and armature 23. The number indicated can also be read, as will be described hereinafter, with the aid of a part 26 situated between armature 23 and spring 24.

Instead of providing special partial magnetic apparatus to form the sensing parts, these devices may be arranged in such a way as to read the result off directly according to the positions of the armatures that are used in the calculation. In this way it is possible to avoid using the aforesaid magnetic apparatus, which makes it possible to have smaller and lighter relays.

Figure 12:
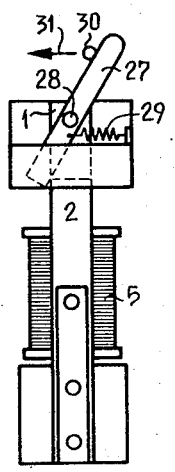
Figure 13:
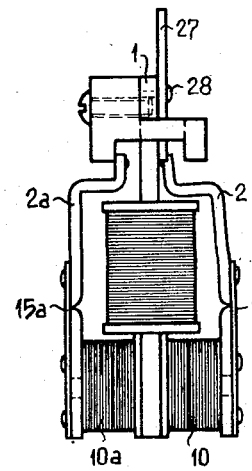

FIGS. 12 and 13 show another embodiment, in which the relay is of the same type as the one in FIG. 5. However, the core 1 of this relay is longer and at its end a lever 27 is attached, on a pivot 28. A spring 29 urges this lever against a movable stop 30 that can be displaced in the direction of the arrow 31. When stop 30 is shifted in this direction, spring 29 causes lever 27 to pivot and the lower end of this lever then comes between armature 2 and core 1. If, at the moment that stop 30 shifts, armature 2 is in attracted position, that is, in contact with core 1, the lower end of lever 27 strikes against armature 2 and this lever rests in the position shown in FIG. 12, instead of being able to assume a position in the prolongation of core 1. The upper end of the aforesaid lever thus goes through a path that is much longer than the displacement of the armature, and this makes it possible to use a simple means for mechanically exploring the relays whose armatures are attracted, without requiring very close machining tolerances.

It goes without saying that the device described above could also be combined with relays according to FIGS. 3, 6 or 7.

Figure 14:
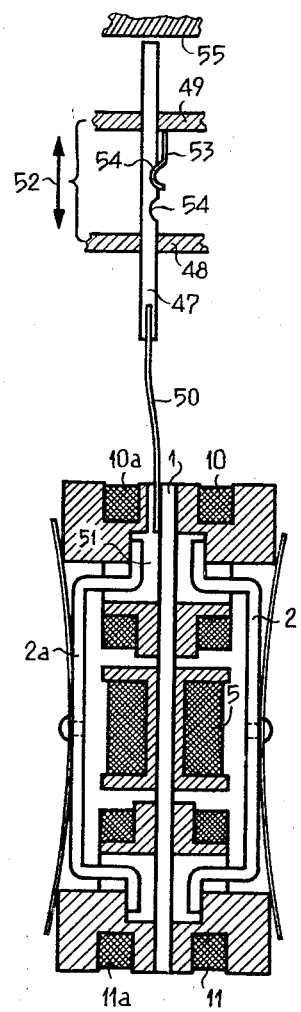

The arrangement according to FIG. 14 is very similar to the one in FIGS. 12 and 13, and likewise presents the same advantage. In this figure relays of the same kind as those of FIG. 3 are used, but it is clearly understood that relays according to FIGS. 5 to 7 could also be used.

In order to explore the position of the armatures, small slides 47 have been provided, sliding in guides 48 and 49. These slides bear a spring 50 that rests against the core of the relay. These springs are thin enough to slip into the space 51 between the core and armature 2a when the contact is not closed. In the contrary event, the entry of the spring is prevented by the attracted armature. It is advisable to set all the guides 48, 49 in common tracks capable of being shifted in the direction of arrow 52. A spring 53 cooperates with notches 54 of slide 47 to prevent any untimely shift of the latter with respect to guides 48 and 49. Upon the return of these last, slide 47 comes up against a fixed stop 55 when it has scanned the position of an attracted armature, and it is thereby replaced in its initial position.

In this raised position, shown in FIG. 14, springs 50 are far from the armatures and do not interfere with their movement.

A movable part could be provided to read the position of slides 47.

The relays described above are sufficient for the construction of a calculating machine according to the invention. However, in the embodiments described hereinafter, mechanical multiple-contact wipers or sliders will generally be used, two examples of construction hereof being given in FIGS. 15 to 18. In general, these wipers or sliders have a set of points capable of being moved with respect to fixed points, and because of the friction of these contact points against each other, a not inconsiderable force is required to shift the movable points. To avoid this drawback, wipers or sliders are preferred in which the points are not in contact during their respective displacements, the contact pressure between the fixed points and the movable points being made only after the latter have come into position. Wipers or sliders of this kind, in which the movable and stationary points are of magnetic material and form parts of magnetic circuits that can be excited by means of a winding, are described (application Ser. No. 356,577).

In a part 70 made of insulating material (FIGS. 15 and 16), sliding on rods 71 and 72, are armatures 73, set in grooves in which they can execute a slight motion. This displacement is restricted on one side by rods 74 and 75 and on othe other by magnetic cores 76. These last are insulated from each other by insulating layers 77 and surrounded by winding 78. So long as this last is not excited, part 70, bearing armatures 73, can be shifted practically without friction along rods 71 and 72 and, depending on the number of armatures 73 and cores 76, assume a certain number of positions for which each armature 73 is opposite a core 76.

When coil 78 is energized for one of these positions, armatures 73 are drawn up against cores 76 and exert a considerable pressure on them at two points of contact 79 and 80. Since these cores 76 constitute the fixed points and the armatures the movable points, a stable and certain electrical contact is obtained in this way, thanks to the double contact. It is helpful to coat these cores 76 and the armatures with a layer of precious metal in order still further to improve the electrical contact.

The construction as in FIGS. 17 and 18 has the advantage that the inertia of the movable contacts is still smaller. The latter consist of segments 61 made of magnetic sheet-iron, which it is advisable to coat with precious metal. These segments are fixed on a sector 62 made of insulating material and pivoting on 63.

The fixed contacts consist of two parts 64 and 64a passing through a coil in common, 65. These parts 64, 64a are U-shaped and fastened to a support 66 made of insulating material by leaf springs 67 and 67a, these last being electrically connected by rivets 69. When there is no current, segments 61 can move freely between parts 64 and 64a. When coil 65 is energized, parts 64 and 64a are drawn up against each other and make it possible for the current to pass from 64 and 64a to 61, once more making a double contact.

*First embodiment*

Electrical calculation portion, FIGURES 19 through 23.—The calculating machine described hereinafter has three groups of contacts A, B and R. The A group consists of multiple-contact wipers or sliders, while the contacts of the B and R groups are controlled by polarized relays with at least three positions. The contacts of each group can define a number by the positions in which they are closed. The contacts of the A and B groups are connected to the control windings of the relays of the R group in such a way as to cause the closure of those contacts of the R group that define the number corresponding to the sum of the numbers defined by the contacts of the A and B groups. The contacts of the R group are connected to the control windings of the relays of the B group in such a way as to cause the closure of those contacts of the B group that define a number that is a function of the one defined in the R group, namely that number itself or its nine's complement.

In principle, a calculation operation consists of a sequence of two-phase elementary operations. Each two-phase elementary operation itself is made up of a calculation phase and a transfer phase, the calculation phase being that in which the addition of the numbers defined in the A and B groups is made, the result being defined in the R group, while the transfer phase is that in which the result defined in the R group is transferred to the B group.

*Calculation and transfer phases*

*General remarks.*—To make the diagrams clearer and to get shorter connections, the contacts and control coils of the relays have been separated in the drawings, as it is customary to do in telecommunication diagrams. It is to be observed, in particular, that the contacts and the coils that are connected to each other never belong to the same group of relays.

The circuits that make it possible to perform a calculation phase will be designated as "R circuits" in what follows, while those that make the transfer phases possible will be designated as "B circuits." The control coils of the relays of the R group will be designated, for the purposes of the description, by $Ri$, where the index $i$ represents the number defined by the relay in question. When a relay can define several numbers, one of those numbers is chosen as the index $i$. A relay has, in general, two and sometimes three control coils, which are then designated by $1Ri$, $2Ri$, etc. The contacts of the relays of the R group are designated in the same way, but there is an $r$ instead of an R for their I position, and an $r^*$ for their II position, these positions having been defined with reference to FIG. 3. One direction on the winding of the control coils is not specifically shown in the drawings, while the opposite direction is indicated by an arrow parallel to the symbol of the coil represented. In the diagrams the reference signs of only one denomination row have been indicated, the signs of the other demonination rows being subject to the same rules. When it is to be indicated in the description that reference is being made to a relay in a given denomination row, an index $k$ will be added ($Rik$, $rik$) that refers to the numbering of the denomination rows. For example, the indication $2R23$ refers to the second control winding of a relay in group R, which defines the digit 2 in the third denomination row. $2R2$, on the other hand, refers to the second control coil of the relay defining the digit 2, without specifying the denomination row. The designation of index $k$ is omitted in the reference signs of the drawings for the sake of clarity, the indication of the denomination rows being made, in general, by a brace for each place. This applies equally to the designation of contacts. In addition, when a relay has only a single contact or a single winding, the reference will be simplified by eliminating the first number. A single contact, for example, will be designated by $ri$ instead of $1ri$.

The control coils and contacts of the B group are designated in the same manner, with the difference that the letters B and $b$ occur instead of R and $r$. For each of the positions I and II, therefore, the relays of the B group have contacts $1bi$, $2bi$ and $1bi^*$, $2bi^*$, respectively.

In the calculating machine, whose calculation and transfer circuits are indicated in FIGS. 19 and 20, the digits are defined in each denomination row by the closing of contacts on the biquinary system. In other words, in order to define a digit from 0 to 9, we must have seven contacts at our disposal. Five of these contacts make it possible to define the digits from 0 to 4, while the other two contacts have the purpose of determining whether a zero or a five should be added to the number determined by one of the five contacts of the first set. Thus in the R group, these fixed contacts and the windings of the relays that control them, will bear an index from 0 to 4, while the indices $u$ and $v$ are provided for the other two contacts. The digits of a denomination row will thus be defined on the biquinary code by the closure of contacts with indices as indicated in the following table:

| Digit | Index | Index |
| --- | --- | --- |
| 0 | 0 | $u$ |
| 1 | 1 | $u$ |
| 2 | 2 | $u$ |
| 3 | 3 | $u$ |
| 4 | 4 | $u$ |
| 5 | 0 | $v$ |
| 6 | 1 | $v$ |
| 7 | 2 | $v$ |
| 8 | 3 | $v$ |
| 9 | 4 | $v$ |

Thus, a number is always determined by the simultaneous closure of two contacts for each denomination row, both in the contacts of the A group and in those of the B and R groups.

The calculation circuit illustrated in FIG. 19 is that of a simplified calculating machine having a total of six denomination rows.

In the diagrams of FIGS. 19 and 20, only the circuits of the control coils of the relays have been shown, the polarization circuits being omitted. The elements belonging in each denomination row are indicated by a brace numbered from 1 to 6. The units denomination row bears the number 1, the tens place the number 2, etc. To simplify the diagram, the reference characters have been indicated in only one or two of the decimal places.

FIG. 21 schematically represents the contacts of the group B necessary to define, on the biquinary system, the various digits of a denomination row, that is, the numbers from zero to nine. These contacts are controlled by four relays provided with one, two or three control windings and with polarization windings, the latter not being shown.

The first relay has a control winding B2 and four contacts $1b2$, $2b2$, $1b2^*$ and $2b2^*$. The two contacts $1b2$ and $2b2$ constitute a double contact that closes for position I, that is, for a certain direction of the current in winding B2, while contacts $1b2^*$ and $2b2^*$ close when the direction of the current is reversed, that is, for position II. As is seen, contacts $1b2$ and $1b2^*$, and $2b2$ and $2b2^*$, respectively, are connected to each other in such a way as to establish the same connection irrespective of the direction of the current in B2.

The second relay has two windings 1B1 and 2B1 wound in opposite directions and controlling two double contacts $1b1$, $2b1$ and $1b1^*$, $2b1^*$, respectively. The third relay bears three windings 1B0, 2B0, 3B0 for controlling two double contacts $1b0$, $2b0$ and $1b0^*$, $2b0^*$, respectively. Winding 2B0 is wound in the opposite direction to 1B0 and 3B0. The fourth relay is similar to the third, but the index 0 is replaced by $u$.

The digits of a denomination row are defined by the closure of these contacts in accordance with the pattern below:

| Digits | Contacts | Contacts |
| --- | --- | --- |
| 0 | $1bu$, $2bu$ | $1b0$, $2b0$. |
| 1 | $1bu$, $2bu$ | $1b1$, $2b1$. |
| 2 | $1bu$, $2bu$ | $1b2$, $2b2$ or $1b2^*$, $2b2^*$. |
| 3 | $1bu$, $2bu$ | $1b1^*$, $2b1^*$. |
| 4 | $1bu$, $2bu$ | $1b0^*$, $2b0^*$. |
| 5 | $1bu^*$, $2bu^*$ | $1b0$, $2b0$. |
| 6 | $1bu^*$, $2bu^*$ | $1b1$, $2b1$. |
| 7 | $1bu^*$, $2bu^*$ | $1b2$, $2b2$ or $1b2^*$, $2b2^*$. |
| 8 | $1bu^*$, $2bu^*$ | $1b1^*$, $2b1^*$. |
| 9 | $1bu^*$, $2bu^*$ | $1b0^*$, $2b0^*$. |

It is seen that the ten digits of a denomination row can be defined by a set of four relays, two of which always act simultaneously. Thus, the number of relays provided in each denomination row of the B group is equal to half the number of numerals corresponding to the code used—in this case the biquinary code—rounded to the whole number immediately higher. The relation between the closure of the contacts and the number defined, as has been indicated above, makes it possible to obtain the conversion of a number into its nine's complement in a very simple way. For, the said relays are polarized and, as has already been explained, have three positions, namely a rest position 0, a position I for which contacts $bi$ are closed and a position II for which contacts $bi^*$ are closed. If, for given directions of control and polarization currents, contacts $bi$ or $bi^*$, respectively, of a relay are closed, it is merely necessary to reverse the direction of one of these currents to have contacts $bi^*$ close instead of $bi$, or $bi$ instead of $bi^*$, as the case may be. By referring to the aforesaid table, it will be seen that we need only reverse the direction of a current in the relays of the B group to cause the closure of the contacts that define not the transmitted number but its nine's complement. For example, it will be seen that the digit 3 is defined by the closure of contacts $1bu$, $2bu$ and $1b1^*$, $2b1^*$. If the direction of the control current is reversed, for example, this will cause the closure of contacts $1bu^*$, $2bu^*$ and $1b1$, $2b1$, which define the number 6. Thus, the subtraction $9-3=6$ will have been performed. It will be seen later in the description that this possibility has great advantages and is made use of to make it possible to perform calculation operations.

Two of the four relays have a third control winding $3B0$ and $3Bu$, respectively. These windings have the purpose of making it possible to introduce the number zero by means of an independent control circuit. By reversing the direction of the current in these supplementary or auxiliary windings, it is also possible to cause the closure of the contacts that define the number nine instead of zero.

Referring once more to FIG. 19, the calculation circuit has two input conductors $ge$, $ge1$, which are connected to five double contacts $1b0$, $2b0$, $1b1$, $2b1$, $1b2$, $2b2^*$, $1b1^*$, $2b1^*$, $1b0^*$, $2b0^*$. These contacts correspond to those depicted in FIG. 21, but contacts $1b2^*$ and $2b2^*$, which are connected in parallel to contacts $1b2$ and $2b2$, have not been shown in order not to overload the drawing. These contacts of the B group are connected to six moving contact members $1am$, $2am$, ... $6am$ of a multiple-contact wiper or slider. These six movable contact members can be shifted with respect to ten fixed contact members $1af$, $2af$, ... $10af$, which are connected to windings $1R0$, $1R1$, $1R2$, $1R3$, $1R4$, $2R0$, $2R1$, $2R3$, $2R4$, respectively of five relays of the R group. These windings are mounted two to a relay. Thus, $1R0$ and $2R0$ belong to the same relay; likewise for $1R1$ and $2R1$, $1R2$ and $2R2$, etc. The contacts of the B group mentioned above can define a digit from 0 to 4. The movable contact members of the multiple-contact wiper or slider can also assume five different positions with respect to the fixed contact members in such a way as to define the digits from 0 to 4.

All of these contacts of the A and B groups, taken together, form an addition circuit, so that the current fed in at $ge$ goes only through that control winding of the relay R that corresponds to the sum of the numbers defined by the contacts of the A and B groups. In denomination row one, double contact $1b1^*$, $2b1^*$ is closed and defines the digit 3, while the movable contact members of the multiple-contact wiper or slider are shifted two positions up and define the digit 2. If a current is sent through input conductor $ge$, it will go through winding $2R0$ after having passed through contact $1b1^*$ and the multiple-contact wiper or slider. Winding $2R0$ makes it possible to define the digit 0 or the digit 5 in the R group, according to the positions of relays $Ru$ and $Rv$, which are connected in series in the same denomination row. Actually, windings $1R0$ to $2R4$ form two groups leading to two output conductors. Windings $1R0$ to $1R4$ are connected to one of these output conductors and windings $2R0$ to $2R4$ to the other. These two output conductors are connected to two double contacts $1bu$, $2bu$ and $1bu^*$, $2bu^*$, respectively, which were described in connection with FIG. 21. These contacts are connected to a multiple-contact wiper or slider having three movable points $1amu$, $2amu$, $3amu$, and which can assume two positions which respect to four fixed points $1afu$, $2afu$, $3afu$ and $4afu$. These fixed points are connected to four windings $1Ru$, $2Ru$, $1Rv$ and $2Rv$ of two relays $Ru$ and $Rv$. This calculation circuit offers two output conductors for this denomination row. Windings $1Ru$ and $1Rv$ are connected to one of these output conductors and windings $2Ru$ and $2Rv$ to the other.

Winding $1Ru$ is traversed by a current when the result of the numbers defined in the A and B groups of this denomination row is less than five. When this result is between 5 and 9, the current passes through $1Rv$. When the sum is equal to ten or more, the current leaves the first denomination row by the other output conductor, passing across $2Ru$ if the result is between 10 and 14, and across $2Rv$ if the result is between 15 and 19.

When the current is fed in at $ge1$, the result indicated by relays R is increased by a unit as compared to the result of the addition of the numbers defined by the contacts of the A and B groups.

Denomination rows 2 and 3 are identical with the first denomination row and the two input conductors of a denomination row are connected to the two output conductors of the preceding denomination row. Denomination rows 4, 5 and 6 are similar to denominating rows 1, 2 and 3, but have only the contacts of the B group, no multiple-contact wiper or slider (A group) being provided for these denomination rows, since the keyboard of the machine has only three decimal places. All the denomination rows are connected in series one after the other, so that the current arriving at $ge$ or $ge1$ goes through them all before leaving by $ga$. If the sum of the two digits defined by the A and B groups in a denomination row is more or less than ten, the current leaves by one or the other of the output conductors of this denomination row, respectively producing or not producing the supplementary addition of a 1 in the next denomination row.

By passing through the windings of certain relays of the R group, as has been indicated above, the current causes the closure of the contacts of these relays, which are part of the transfer circular shown in FIG. 20. Each relay of the R group has two condacts $ri$ and $ri^*$ which make it possible to direct the current through the windings of certain relays of the B group. Depending on the direction of the current during the calculation phase, that is, the current passing through the calculation circuit of FIG. 19, the windings of relays R will be traversed in one direction or the other and cause contacts $ri$ or $ri^*$ to make. Referring to FIG. 20, it will be seen that the contacts $ri$ of a denomination row are connected to the control windings of relays B of the same denomination row; contrariwise, the contacts $ri^*$ of a denomination row are connected to the control windings of relays B of the next denomination row.

Contacts $ri$ or $ri^*$ of a denomination row are connected to the windings of relays B of the same denomination row or of the next decimal place, respectively, in such a way as to make the current pass, during a transfer phase, through the windings of those relays of the B group that define the same digit as do relays R.

By reversing the direction of the current during the transfer phase, that is, by having it enter by $fa$ and leave by $fe$, I obtain the closure of those contacts of the B group that define the nine's complement of the number defined by the contacts of the R group. Finally, the transfer circuit comprises a second, independent circuit, with an input conductor $f0e$ and an output conductor $f0a$, which comprises all the windings $3B0$ and $3Bu$. If instead of sending the current by way of $fe$ and $fa$ it is sent by way of $f0e$ and $f0a$, a zero or a nine is introduced into each denomination row of the B group, depending on the direction of the current.

The different operating possibilities of the circuits according to FIGS. 19 and 20 are outlined below:

By sending a current through the calculation circuit of FIG. 19, a calculation phase is carried out. The addition of the numbers defined in the A and B groups is performed, and if the current is sent across ge1 instead of ge, a 1 is added to the sum at the same time. Depending on the direction of the current during this calculation phase, that is, depending on whether the current goes from ge to ga or reversely from ga to ge, contacts ri or ri* are closed. This makes it possible to transfer this result to the contacts of the B group by sending a current by way of fe, fa. This transfer takes place without change of denomination row if it is contacts ri that are closed, but with a shift to the next denomination row, on the other hand, if it is contacts ri* that are closed. If the current goes from fe to fa during the transfer phase, those contacts of the B group are closed that define the same number as the one that is in the R group; if the current passes from fa to fe, those contacts of the B group are closed that define the nine's complement of the number that is in the R group. Finally, if the current is sent by way of f0e and f0a during the transfer phase, the number zero or the number nine, depending on the direction of the current, is introduced into each denomination row of the B group. It will be seen later that these various possibilities are made use of to make it possible to perform the four fundamental operations, namely addition, subtraction, multiplication and division, by means of a sequence of calculation phases and transfer phase. In what follows the heading "two-phase elementary operation" or, more briefly, "elementary operation" will be given to the operation made up of a calculation phase and a transfer phase.

*Example of an electrical two-phase elementary operation.*—The operation $$A+B=R$$
$$R \rightarrow B$$

(addition of the numbers A and B and cyclical transfer of the result obtained into the next denomination row to the left) will be explained in the following example, which corresponds to FIGS. 19 and 20

$$000862+852828=853690$$
$$853690 \rightarrow 536908$$

The following digits are set up in wipers or sliders A (biquinary code):

| 5-position wipers or sliders | 2-position wipers or sliders |
|---|---|
| 2 and | $u=2$ |
| 1 and | $v=6$ |
| 3 and | $v=8$ |

In the B group, the following digits are defined and maintained by sending the current through the polarization coils:

| 1b11* | 2b11* | 1bu1* | 2bu1* | 8 |
| 1b22 | 2b22 | 1bu2 | 2bu2 | 2 |
| 1b13* | 2b13* | 1bu3* | 2bu3* | 8 |
| 1b24 | 2b24 | 1bu4 | 2bu4 | 2 |
| 1b05 | 2b05 | 1bu5* | 2bu5* | 5 |
| 1b16* | 2b16* | 1bu6* | 2bu6* | 8 |

During the calculation phase, the direction of the control current in the R group is opposite to that of the polarization current, to make ready for a denomination row shift to the left. This current passes by way of:

ge: 1b11* 2R01 2bu1* 2Ru1 2b22 1R42 1bu2
1Rv2 1b13* 2R13 2bu3* 2Rv3 2s1 2b24
1R34 1bu4 1Ru4 1b05 1R05 1bu5* 1Rv5
1b16* 1R36 1bu6* 1Rv6 D ga and closes contacts r01* ru1* r42* rv2* r13* rv3* r34* ru4*
r05* rv5* r36* rv3* which correspond to the digits 0, 9, 6, 3, 5, 8 (beginning with the units). Next, the control current is shut off, but the contacts remain closed under the effect of the polarization current. On the other hand, the polarization current in the B group is cut off, which causes the opening of the contacts defining the digits 8, 2, 8, 2, 5, 8. Thus, the machine is ready for the transfer phase.

During the transfer phase (FIG. 20), the direction of the control current in the B group is the same as that of the polarization current, in order to get a transfer without forming the complement. This current passes by way of fe r34* 2B15 ru4* 1Bu5 r05* 1B06 rv5* 2Bu6
r36* 2B11 rv6* 2Bu1 r01* 1B02 ru1* 1Bu2
r42* 2B03 rv2* 2Bu3 d* 2s2 r13* 1B14
rv3* 2Bu4 fa and closes contacts 1b15* 2b15* 1bu5 2bu5 1b06 2b06 1bu6* 2bu6*
1b11* 2b11* 1bu1* 2bu1* 1b02 2b02 1bu2
2bu2 1b03* 2b03* 1bu3* 2bu3* 1b14 2b14
1bu4* 2bu4* which correspond to the digits 8, 0, 9, 6, 3, 5 (beginning with the units). These contacts are held in their closed positions by the polarization current, despite the breaking of the control current. The polarization current in the R group is shut off, the contacts that define the digits 0, 9, 6, 3, 5, 8 are open and a new elementary operation can begin.

*Impulse diagram.*—As has been said with reference to FIGS. 19 and 20, a current must be sent by way of fe and fa during the transfer phase, while contacts ri and ri*, respectively, are still closed. Contacts bi and bi*, respectively, which then close, are to remain closed when the said contacts ri and ri*, as the case may be, reopen to allow a new calculation phase. The attracted contacts of the B and R groups should thus be maintained in their positions in some way after the end of the calculation and transfer phases. In the calculation machine described, which is equipped with relays with at least three positions and electromagnetic polarization, the contacts can be kept attracted in a very convenient way by means of the polarization windings. The ampere-turns of these windings need only be chosen in such a way that the excitation of these windings be not enough, in itself, to cause the attraction of an armature, but yet be enough to keep it in the attracted position.

FIG. 24 represents as a function of the time an impulse diagram that makes it possible to perform a sequence of calculation and transfer phases while insuring that the armatures of the R group are held in position during the transfer phase and those of the B group during the calculation phase.

At the moment the diagram begins, it will be assumed that the contacts of the B group define a number and are held in position by a polarization impulse BP, the multiple-contact wipers or sliders of the A group being also so positioned as to define a number. The relays of the R group then receive a control impulse RM and a polarization impulse RP, which begin practically at the same time. At the end of impulse RM, the contacts of the R group have assumed their positions and are maintained there by impulse RP, which lasts longer than RM. Just after the end of RM, impulse BP is broken and the contacts of the B group all return to their rest positions. It is to be noted that the opening of these contacts occurs when RM has come to an end, so that the current no longer passes across the contacts of the B group at that moment. While the contacts of the R group are maintained in their positions by polarization impulses RP, the relays of the B group receive a control impulse BM and a polarization impulse BP that begin practically at the same time. The contacts of the B group then assume positions that depend on the positions of the contacts of the R group. At the end of impulse BM, the contacts of the R group have assumed their positions and are maintained there by polarization impulse BP, which is of longer duration. After the end of impulse BM, the contacts of group B are no longer energized and impulse RP is interrupted so that the contacts of the R group return to their rest positions. The contacts of the B group are held in their positions by impulse BP while new impulses RM and RP begin. The cycle of impulses begins again, but this time their polarity is reversed. Impulses RM will thus be alternately positive and negative, along with impulses RP; likewise for impulses BM and BP. This kind of alternation has no effect on the control of the electrical apparatus, for it occurs at the same time in the control coils and in the polarization coils of the relays. These polarity changes are even advantageous, since the interruptions between two successive polarization impulses, RP or BP as the case may be, can be made shorter. As a matter of fact, if the impulses always had the same polarity, this interruption would have to last longer than the relay release time, in order to allow the armatures that were no longer in use in the electrical groups to return to their rest positions. In the diagram depicted, there takes place not merely an interruption of the current but also a demagnetization phase that causes a forced release of the armatures. This calls for decreasing the slope of the sides of these impulse diagrams, as shown in FIG. 24, by well-known means, by condensers for instance, in order to prevent the magnetic field from recovering too rapidly and attracting the armatures again before their complete release.

FIG. 25 schematically represents a collector commutator that makes it possible to supply impulses according to FIG. 24. The commutator has an input portion X and two outputs Y and Z, all shown side by side in FIG. 25 for clarity's sake, but actually situated coaxially one behind the other on a rotating shaft. The input portion X has two input brushes 111 and 110 in contact with two collector rings 108 and 109, which are connected to sectors 112, 113, 114, 115 of portions Y and Z. Polarization impulses RP and BP are taken off at brushes 116, 117 and 118, 119, and control impulses RM and BM at brushes 120, 121 and 122, 123. The shaft of the commutator is turned by an electric motor.

*Mechanical portion for introducing numbers and reading out results.*—The principle of exploring a value introduced into a machine by depressing the keys of a keyboard, by means of a movable part coming up against stops set at intervals and actuating a number wheel, is well known in the construction of mechanical calculating machines. In the embodiment described, the positioning of the multiple-contact wipers or sliders of the A group is not effected directly by actuating the keys on the keyboard, but through the intermediary of a mechanical apparatus driven by a motor. In this way the touch on the keyboard may be gentle, for the keys do not actuate the aforesaid wipers or sliders.

The principle of exploring the result is similar to that of exploring the value introduced in the keyboard, the armatures of the read-out relays corresponding to the keys of a keyboard, the exploration being made with the help of parts connected to number wheels. Because of the use of the biquinary system to represent the numbers, the arrangement of the read-out armatures does not correspond to the decimal system and a mechanical means has to be provided to transpose the result of the biquinary system into the decimal system at the time of reading-out. Moreover, the number introduced in the keyboard on the decimal system must be transposed into the biquinary system in order to be usable in the electrical part of the calculation.

Figures 22, 23:
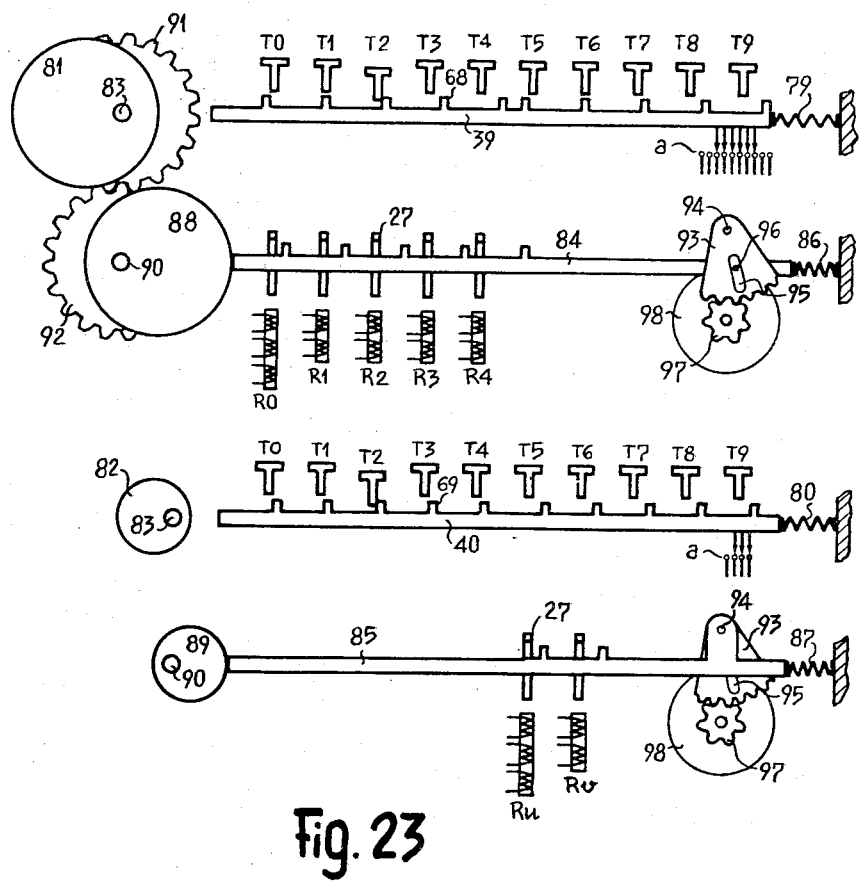
FIGURES 22 and 23 are schematic representations of mechanical means for introducing numbers and for reading them out.

FIGS. 22 and 23 schematically represent the introduction and exploration for one denomination now. As the representation of a digit on the biquinary system is deduced from the positions of two relays, one of which belongs to a set of five relays and the other to a set of two relays, the mechanical portion for introducing and exploring the digits comprises two sets of parts, one cooperating with the set of five relays and the other with the set of two relays. The mechanical portion coacting with the set of five relays corresponding to the five points of the biquinary system is shown in FIG. 22, while the part cooperating with the set of two relays that corresponds to the two points of the biquinary system is found in FIG. 23.

The machine comprises a keyboard with keys for introducing into the machine the numbers entering into the operations to be performed, hereinafter referred to as "calculation keys," as well as keys controlling the initiation of an operation, such as multiplication or division, hereinafter referred to as "operation keys." The calculation keys are arranged in several rows. Each row corresponds to a decimal place and has ten keys numbered from zero to nine and designated as T0, T1, ... T9. In FIGS. 22 and 23 these keys have been depicted twice in order to make the drawings easier to understand, but it is obvious that the keyboard has only one row of keys per decimal place. Two sliding bars 39 and 40 (FIGS. 22 and 23 respectively) are situated parallel to each other under these keys, and bear stops 68 and 69, respectively. Bar 39 is integral with the movable contact members of a five-position multiple-contact wiper or slider a, while bar 40 is integral with a two-position multiple-contact wiper or slider a. Bars 39 and 40 are each subject to the action of a spring, 79 and 80 respectively that urges it towards the left. Two eccentrics 81 and 82 mounted on a shaft 83 are provided to push the aforesaid bars back toward the right, against the action of their springs.

Below bars 39 and 40 are situated two other sliding bars 84 and 85, one end of each of which is likewise subject to the action of a spring, 86 or 87, respectively. Two eccentrics, 88 and 89 respectively, are attached to a shaft 90 and have the function of shifting bars 84 and 85 against the action of their springs. Shafts 83 and 90 are angularly integrated with each other by cog-wheels 91 and 92 and the eccentrics are fastened on shafts 83 and 90 in such a way that when bars 39 and 40 are pushed back against the action of their springs, bars 84 and 85 are not, and vice versa.

Bars 84 and 85 also bear stops, spaced at intervals, and capable of coacting with indicator parts consisting of the levers 27 of the relays of the R group. These relays are of the type of the one shown in FIGS. 12 and 13. A sector-gear 93 is hinged on bar 85 at 94. This sector 93 has a slot 95 that receives a pin 96 integral with bar 84. Sector-gear 93 drives a number wheel 98 through a pinion gear 97.

In the position depicted in the drawings (FIGS. 22 and 23), bars 84 and 85 are pressed against the action of their springs 86 and 87, while bars 39 and 40 are urged by their springs 79 and 80, their positions being determined by stops 68 and 69 cooperating with key T2 of the keyboard, which is depressed. The two multiple-contact wipers or sliders of this denomination row of the A group thus occupy the positions in which they define, on the biquinary system, the number struck on the keyboard according to the decimal system.

The stops of bars 84 and 85 are clear of read-out levers 27, so that the relays of the R group can function freely. The machine thus is in calculating position. When this calculation is completed, levers 27 are manipulated as has been described in connection with FIGS. 12 and 13, so that the ends of those levers 27 of those relays that have a reading are in the way of stops of bars 84 and 85. Eccentrics 81, 82, 88 and 89 then perform a rotation of 180° so that bars 39 and 40 are pushed to the right against their springs, while springs 86 and 87 urge bars 84 and 85 to the left until one of their stops encounters the indicator lever 27 corresponding to the digit to be read out. The distance between the stops, the gear ratios and the positions of turning points 94 and 96 of sector 93 are so arranged that the distance that bar 84 goes through from one stop to the next causes the number wheel to turn by two units by making the sector turn around point 94, while the distance that bar 85 goes through from position u to v causes the sector to turn around point 96 and number wheel to turn by one unit. This number wheel is numbered in the order 0 5 1 6 2 7 3 8 4 9, and so set that when bar 85 is in u position it showh the underlined digits, and in v position the non-underlined digits.

It should be remarked that because of the force exerted by bar 84 or 85, respectively, on lever 27, which is in read-out position and with which the bar is engaged, the lever can not return to its rest position under the effect of its spring 29 (see FIG. 12). Thus the result is mechanically held in the read-out mechanism, and this locking does not depend on the supply of electrical energy to the machine. This is an advantage, for if the result of a calculation were held electromagnetically in the contacts of the B or R group, it would be lost in the event of an interruption in the current.

In the four fundamental arithmetical operations, namely addition, subtraction, multiplication and division, the operation is performed on two numbers to obtain the result. In the description that follows, these two numbers will be indicated as the first and second members of the operation, respectively.

To perform an operation, the first member of the operation is first sent into the indicating mechanism by means of the calculation keys. This operation will be described in detail later. This first member is thus mechanically held in position, and its value is defined by the different levers 27 that are in contact with a stop on the indicator bars 84 or 85. After the second member of the operation has been introduced on the keyboard, whose calculation keys are kept in depressed position by a well-known mechanical device that is not shown, and an operation key corresponding to the operation desired has been actuated, the contacts of the B group should be set in the positions defining the first member, while the contacts of the A group are so set as to define the second member. To perform the transfer of the number set up in the indicating mechanism into the B group, this embodiment of the invention makes use of the properties of the read-out relays according to FIGS. 12 and 13. These last have a relay sensing feeling device cooperating directly with the armatures and consisting of a pivoting lever 27, which is swung, against the action of a spring 29, by an actuating part 30 that acts simultaneously on all the relays so as to permit free play to the armatures during the course of the electrical calculations. At the end of the calculation, actuating parts 30 shift in the direction of arrow 31 and levers 27 sense the positions of armatures 2. After this operation the eccentrics (FIGS. 22 and 23) are set in motion and the read-out bars transmit to the number wheels the result indicated by levers 27, meanwhile mechanically holding these levers in their positions. After the read-out operation is completed, the general current supply is cut-off and all the armatures 2 return to their rest positions. To replace armatures 2, at the beginning of a new calculation operation, in the positions they occupied before the sensing, these armatures 2 are held against their core by some means. No current can pass through the relays in which lever 27, which is made of insulating material, is between the armature and the core, while those relays for which lever 27 is inclined permit the current to pass, these relays being those whose positions define the number set up in the read-out mechanism. The simplest means of holding these armatures against their cores is electromagnetically, by sending reinforced polarization impulses through the corresponding polarization windings. The positions of contacts R can then be transferred to B in a transfer phase, and are held there by a prolonged polarization impulse. Next, the eccentrics of FIGS. 22 and 23 make a half-turn again, so that bars 84 and 85 are pushed back toward the right against the action of their springs 86 and 87, and take the positions indicated in the drawings, releasing the levers 27 they were in contact with. At the same time rod 30 (FIG. 12) is operated to swing levers 27 so that their lower ends may not interfere with the action of armatures 2. The effect of the half-turn made by the eccentrics (FIGS. 22 and 23) is to let the springs of bars 39 and 40 bring them back to the left until a depressed calculation key of the keyboard stops a stop 68 or 69. The multiple-contact wipers or sliders then define, by their positions, the number introduced in the keyboard, so that the machine is ready to perform the desired operation.

As has been said, the calculation operations could be performed by the machine by means of a succession of two-phase elementary operations, that is, by an alternating sequence of calculation phases and transfer phases. FIG. 26 represents, very schematically, the feeding of the calculation and transfer circuits by a generator Ig supplying impulses RM, RP, BM and BP in accordance with the diagram of FIG. 24. Within each denomination row the contacts of the B group are designated as BKo, those of the A group as AKo and those of the R group as RKo. The control windings of the R relays are designated as RMa and those of the B group as BMa. The polarization windings of the B and R groups are indicated by BPo and RPo, respectively. The contacts of the A, B and R groups and their control and polarization windings are shown only for the first two denomination rows of the machine, the other denomination rows being analogous. This diagram shows that at each calculation phase an impulse RM passes in succession through all the denomination rows of the machine, within each denomination row passing through contacts of the B and A groups and then windings of the R group. At the same time, the polarization windings RPo of the relays of the R group receive an impulse RP lasting longer than the impulse RM, in such a way as to maintain the contacts of the R group in their positions, while an impulse BM passes in succession through the contacts RKo of the R group and the windings BMa of the B relays in each denomination row. In the same way, windings BPo receive a longer polarization impulse to maintain the contacts of the B group in their positions during the succeeding RM impulse. It was seen, in connection with FIGS. 19 and 20, that the various functions of the calculation and transfer circuits, namely A+B addition with or without denomination row shift, and transfer, either direct or as a complement, could be controlled by the direction of the current during the calculation and transfer phases. The machine thus comprises a control mechanism that makes it possible to change the direction of the currents during the transfer and calculation phases, dependent on the operation to be performed. This control mechanism is very schematically depicted in FIG. 27. It comprises contacts SBKo to control the direction of the current during the calculating phase and contacts SRKo to control the direction of the current during the transfer phase, in such a way as to produce the sequence of additions, denomination row shifts and direct or complementary transfers required for the performance of the operations to be effected. A portion at least of these contacts SBKo or SRKo are controlled by relays with at least three positions with control windings SRMa or SBMa and polarization windings SRPo or SBPo, respectively. The RM and BM impulses supplied by impulse generator Ig are sent through windings SRMa and SBMa, respectively, and are then brought to the calculating and transfer circuits by means of contacts SBKo and SRKo, which are designed to function as inverters. Polarization impulses RP and BP go through polarization windings SRPo, RPo and SBPo, BPo, respectively. Impulse generator Ig is driven by a motor Mo. By means of a secondary shaft 99, the motor drives a coupling K that is electromagnetically controlled and disengages automatically after a half-turn. This coupling is also controlled by contacts of groups SRK*o* and SBK*o*, and drives eccentrics 81, 82, 88 and 89 (FIGS. 22 and 23) to control the mechanical operations of introducing numbers in the A group and reading out the result. While the mechanical parts are in motion, the impulse generator is still driven, but the impulses it delivers are shut off by relays of the control group in order that the electrical calculation operations may be suspended during this phase. At the end of the read-out operation, drive motor M*o* is declutched.

*Complete course of a calculation operation.*—In the machine's rest position, its mechanical parts are in a position where the eccentrics are turned by 180° compared to FIGS. 22 and 23, indicator bars 84 and 85 in each decimal place being in contact with levers 27 of the indicator relays. Bars 39 and 40 of the keyboard are pressed against their springs 79 and 80 and permit keys T0 to T9 to be easily shifted. The indicating mechanism is assumed to contain the first member of the operation to be performed. After having introduced the second member into the keyboard, the operation key is actuated. A calculation operation is composed of four partial operations:

(1) Initial operation
(2) Mechanical operation of introducing a number
(3) Electrical calculation operation
(4) Read-out operation.

(1) *Initial operation.*—This operation begins with a strong impulse in the polarization windings of the right half of the relays of the R group as illustrated in FIG. 13. This impulse is strong enough to attract all the right-hand armatures 2 of relays R, that is, the armatures controlling contacts *ri*, while the armatures 2*a* corresponding to contacts *ri*\* remain in rest position. Armatures 2 are then held in their attracted positions by an impulse of normal strength. At this moment, only those of armatures 2 that define the number set up in the indicator mechanism can establish contact with cores 1, for their corresponding levers 27 are held in the inclined position by indicator bars 84 or 85, respectively. For the other armatures 2, their levers 27 are in the vertical position under the action of springs 29, so that their lower ends, which are of insulating material, are situated between armatures 2 and cores 1 and prevent the electrical contact from being established. A transfer phase is effected next, in order to have this number transferred into the B group, in which the number is kept by a prolonged polarization impulse BP, while coupling K (FIG. 27) is engaged.

(2) *Mechanical operation of introducing numbers.*— Eccentrics 81, 82, 88, 89 (FIGS. 22, 23) make a half-turn, the keyboard is explored, the indicator bars free levers 27 of the read-out relays. The said levers are next moved against the action of their springs 29 by bar 39 (FIG. 12) in such a way that they swing and allow free movement to armatures 2.

(3) *Electrical calculation operation.*—The B group now contains that one of the numbers of the operation that was in the indicator mechanism, while the wipers or sliders of the A group contain the other number, which was introduced in the keyboard: the electrical groups of the machine are now ready to perform the electrical calculation operations. The windings of the multiple wipers or sliders (see FIGS. 15 and 16) are energized, the impulse generator, which has been running on no load hitherto, is engaged, so that a first calculation phase is performed. The initiation of the impulses is controlled by a check relay, not shown, at the moment that the impulses are in the desired phase. At the same time, the prolonged polarization impulse is shut off and the normal sequence of operations makes it possible to perform the two-phase elementary operations required to give the final result, the number of these elementary operations being determined by the calculation operation to be performed.

(4) *Read-out operation.*—This begins at the same time as the last calculation phase that defines the final result by a set of positions of the armatures of the R group. The impulse generator is declutched after this calculation phase, while a prolonged polarization impulse RP is supplied by a relay of the control mechanism, so as to hold the armatures indicating the result in place. Then transverse bar 30 of the read-out relays, which up to now had held back all the read-out levers 27 in order not to interfere with the action of the armatures, is now drawn back, so that the said levers 27 respond to the action of their springs 29 and their lower ends come between cores 1 and armatures 2 or come up against the latter, depending on whether the armature is in rest or in operating position. Next, the electromagnetic clutch is engaged again and the indicator bars feel the position of armature 2 through the intermediary of indicator levers 72 and transpose it of the biquinary system into the decimal of the system by means of sectors 93 and number wheel 98, so that the result may be read directly. After this operation the general current supply of the machine is switched off and the armatures assume their rest positions, while indicator levers 27 deep their positions despite the action of their springs 29, since they are held by bars 84 and 85 (FIGS. 22 and 23).

*Control portion of the calculating machine.*—In order to be able to perform arithmetical operations, the machine has operation keys cooperating with relays of the control portion, so that by pressing down one of these keys a predetermined sequence of two-phase elementary operations is ordered. All of these operations taken together, including the mechanical operations of introduction and reading out, will be designated as a calculation operation. In general, the performance of an arithmetical operation requires several calculation operations of the machine; thus, for example, in order to effect the addition of two numbers, it is necessary to efface the indicator result and to actuate the addition key of the machine twice.

In the embodiment described, the following calculation operations have been provided for: (1) addition; (2) introduction of the dividend; these two first calculation operations being performed by means of a single calculation phase; (3) clearing the result; (4) subtraction; (5) tabulation to the left; (6) tabulation to the right; (7) introduction of the multiplier; these operations 3 to 7 are being effected by means of a succession of elementary operation with a fixed control; (8) non-automatic and automatic division; (9) automatic multiplication; these two calculation operations 8 and 9 being carried out by a sequence of elementary operations whose control depends at least in part on the numbers contained in the machine; (10) clearing the keyboard; this last operation being purely mechanical. By tabulation to the left or to the right (operations 5 and 6), a denomination row shift of one or more rows to the left or to the right is understood.

With the exception of operation 10, which can be effected mechanically without initiating a sequence of electrical operations in the machine and which is well known in the technology of calculating machines, the calculation operations take place in a fixed rhythm and only the number and the kind of the two-phase elementary operations between the first mechanical phase (setting of A contacts) and the second mechanical phase (reading out) vary. The control of the general course of operations, which is the same for all the operations, is had by means of a control mechanism through relays that is constructed according to well-known principles. On the other hand, the control of the various elementary operations, depending on the operation keys actuated, has new characteristics that will be described in detail.

As has already been said, in describing the two-phase elementary operations, it is possible to obtain two variants of each partial operation by choosing the direction of the current; for the calculation phase these will be:

(1) Addition with preliminary ordering of a transfer in the same denomination row during the following transfer phase (current in the positive direction).
(2) Addition with preliminary ordering of a transfer to the next denomination row to the left during the following transfer phase (current in the negative direction).

For the transfer phase:

(1) Transfer of the result to the B group (positive current direction).
(2) Transfer of the result to the B group together with conversion of it into its nine's complement (negative current direction).

Since different calculation operations can be obtained from the machine by a suitable combination of these variants of the partial operations, the role of the control portion is limited to determining the direction of the current in the calculation groups. To this end, this control portion has relays that are assembled in two control groups B and R and that can well consist of three-position relays acting as two-pole switches. In addition, three groups of calculation operations are to be distinguished. The calculation operations of the first group are the simplest and have only a single calculation phase between the first and the second mechanical operations. The calculation operations of the second group (fixed control) each include a given number of electrical elementary operations in a given sequence of current directions during the calculation and transfer phases, which are universally determined by the relevant operation key. The calculation operations of the third group (control depending on the numbers) comprises a sequence of elementary operations that depend not only on the function key, but also on the numbers involved in these operations. It is possible, nevertheless, that under a control depending on the numbers, certain operations should follow each other according to a set program.

The initial operation, which has been mentioned above and which makes it possible to introduce into the B group the number set up in the read-out mechanism, or its nine's complement, is especially important. This operation is initiated at the same time as the first mechanical phase, and its control consists of a sort of fixed control.

To explain the type of control employed in this case, the principle of fixed control will first be shown, without any particular application to a given calculation operation.

Figures 28, 29:
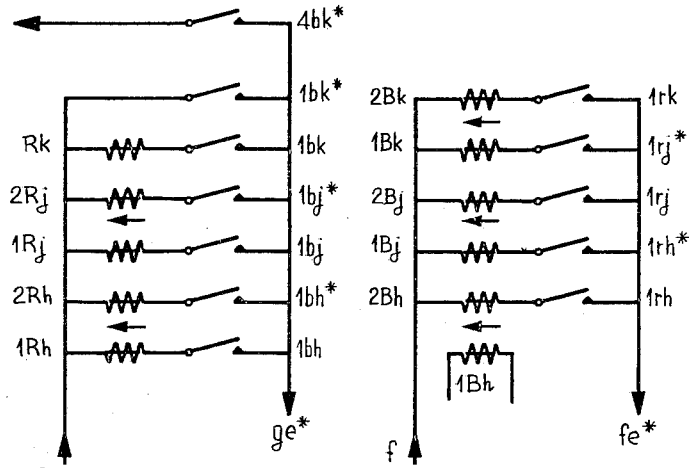
FIGURES 28 to 31 show the different parts of a fixed control device.
Figure 30:
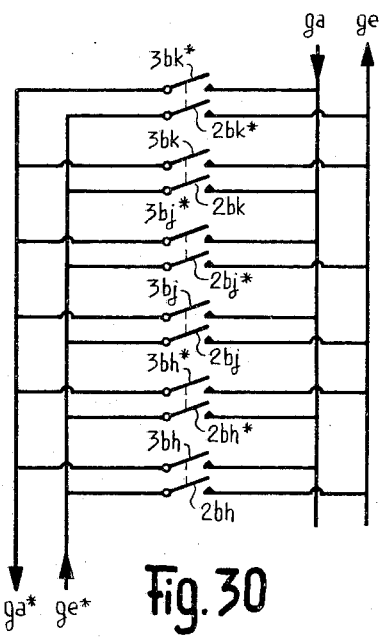

*Principle of fixed control.* — The number $i$ of relays needed in the control portions of the B and R groups depends on the number $n$ of elementary operations that it is desired to perform by means of the fixed control, as well as on the number of positions $Q$ ($o$, I, II etc.) of the relays used. Each control part should have $$i = \frac{n}{Q-1}$$

relays, whose function it is to change the direction of the current in conformity with a given calculation plan. These relays are so connected as to become operative successively for each of their different switching positions during the course of the calculation. FIGS. 28 to 31 represent, by way of example, a diagram with $n=6$ and $Q=3$, and hence $i=3$. In each of groups B and R, three relays are used, designated by the indices $h$, $j$, $k$. The three relays of the B group each have three positions, and two control windings and three contacts for each of positions I and II (FIGS. 28 and 30). The R group relays with $h$ and $j$ indices are likewise three-position relays and each has two control windings and three contacts for each of positions I and II (FIGS. 29 and 31), while the relay with index $k$ has two positions and only one winding $Rk$ and three contacts $1rk$, $2rk$, $3rk$ that are closed for one of the said positions and open for the other.

Figure 31:
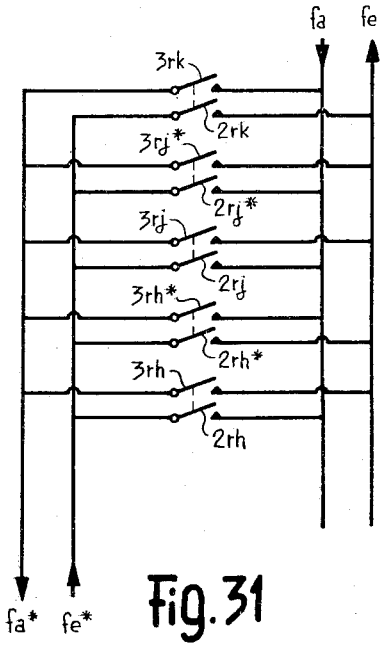

The circuit of FIG. 28 is connected through $g$ to an output terminal of the impulse generator delivering the RM impulses, and through $ge^*$ to input conductor $ge^*$ of FIG. 30. Connections $ge$ and $ga$ of this illustration are connected to the input and output terminals of the calculation circuit according to FIG. 19. Finally, end $ga^*$ is connected to the return binding-post of the impulse generator. The circuits according to FIGS. 29 and 31 are cut in in the same way between the transfer circuit of FIG. 20 and the terminals of the impulse generator that supply the BM impulses. The fixed control shown makes it possible to perform six successive elementary operations. During the introduction of the result of a first calculation into the B group, completing the initial operation, a voltage is put across winding $1Bh$ so as to close contacts $1bh$, $2bh$, $3bh$.

During the mechanical operation phase that follows the initial operation, contacts $1bh$, $2bh$, $3bh$, as well as contacts $bi$ defining the number taken from the read-out mechanism, are kept closed by a prolonged polarization impulse. During the first calculation phase, with which the electrical calculation operations begin, the current passes through $g$, $1Rh$, $1bh$, $ge^*$, $2bh$, $ge$ (FIGS. 28 and 30) in circuit R according to FIG. 19, and leaves it by way of $ga$, $3bh$, $ga^*$. The contacts of the R group (FIG. 20) and contacts $1rh$, $2rh$, $3rh$ are closed. The direction of the current is "positive," since input conductor $g$ is connected to input conductor $ge$ of the calculation circuit and output conductor $ga^*$ to output conductor $ga$ of the calculation circuit.

During the first transfer phase output conductor $fe^*$ of FIG. 29 is connected to $fe^*$ of FIG. 31; $fe$ of FIG. 31 is connected to $fe$ of circuit B in FIG. 20; $fa$ of the said circuit B is connected to $fa$ of FIG. 31; the output of the current is through $fa^*$. In the first transfer phase, the current passes through $f$, $2Bh$, $1rh$, $fe^*$, $2rh$, $fa$ in the B circuit of FIG. 20 and leaves the latter by way of $fe$, $3rh$, $fa^*$. Contacts $1bh^*$, $2bh^*$ and $3bh^*$ are closed. It will be seen that the current enters the B circuit through $fa$ and leaves it through $fe$; it passes in the opposite direction, that is, in the negative direction. The direction of the current in the polarization coils remains the same for all phases, both in the R and in the B groups.

During the second calculation phase $1bh^*$, $2bh^*$, $3bh^*$ are closed, the direction of the current is negative, $1rh^*$, $2rh^*$, $3rh^*$ are closed. During the second transfer phase the current is positive and $1bj$, $2bj$, $3bj$ are closed.

During the third calculation phase the direction of the current is positive and contacts $1rj$, $2rj$ and $3rj$ are closed. During the third transfer phase the current is negative and $1bj^*$, $2bj^*$, $3bj^*$ are closed, and so forth up through the fifth operation.

The following table shows the sequence of these controls:

| Calculation phase | Control | Transfer phase | Control |
|---|---|---|---|
| 1 | + | 1 | − |
| 2 | − | 2 | + |
| 3 | + | 3 | − |
| 4 | + | 4 | − |
| 5 | − | 5 | + |
| 6 | [1] + | | |

[1] Special control.

The sixth calculation phase comprises, over and above the normal control of the direction of the current by $2bk^*$, $3bk^*$, a special operation, for example reading-out, by means of a supplementary contact $4bk^*$. It is even possible for this last to be already made ready during the fifth transfer phase. The table above shows that the sixth two-phase elementary operation is not complete, since it comprises only a calculation phase. It is for this reason that the relay with index $k$ of the R group has only one control winding and shows only one set of three contacts for one switching position. Obviously, if the sixth calculation phase were to be followed by a sixth transfer phase, the latter could be ordered by replacing relay $k$ by a relay with two windings and three positions similar to the relays with indices $h$ and $j$.

It is evident that any sequence of positive and negative currents can be obtained, in any number, by choosing the number of relays and of the contacts they control. The control described, by means of elements with three positions 0, I, II . . . has the advantage, compared with a succession of controls by means of ordinary relays, that the number of relays needed can be divided by $Q-1$ ($Q$=number of positions of the relays). On the same principle, it would also be possible to carry out such a calculation plan cyclically and have it repeated several times recommencing with the first relay, every time a certain relay was excited. Different fixed controls are obtained, with the diagram described, with different sequences of positive and negative currents and in these cases it is possible that during the calculation phase the input of current should take place through $ge1$, $ga$ instead of $ge$, $ga$ (FIG. 19) (addition of a 1 in the first denomination row of the machine, which will be indicated if need be by the notation $ge1$ in the current direction tables hereinafter). It is also possible, during the transfer phase, to feed the current in by $f0e$ and $f0a$ instead of $fe$ and $fa$, in the B circuit of FIG. 20 (introduction of a 0 or a 9 in all the denomination rows of the B group, which will be indicated if need be by $f0e$, $f0a$ in the aforesaid tables).

In the circuits of FIGS. 28, 31, windings $1Rh$ to $Rk$ and $1Bh$ to $2Bk$ may be placed directly in the predetermined-control circuits of FIGS. 30 and 31, and thus do away with contacts $1bh$ to $1bk*$ or $1rh$ to $1rk*$, respectively. For example, $1Rh$ is cut in directly before or after $2bh$ (or $3bh$) and the same for the other windings of the circuits of FIGS. 28 and 29. The diagram indicated in FIGS. 28 to 31 can be used generally, for it also allows other variations by the separation of the predetermined-control circuits and those controlled by a program, in which the fixed functional connections between the pre-control contacts (for example $1bj$) and the contacts acting on the direction of the current (for example, $2bj$, $3bj$) are broken and replaced by another connection (for example, a control depending on the numbers).

These sorts of control come in at the time of the denomination row shifts in connection with automatic multiplication and division. The description of the fixed calculation operations can therefore be reduced to an indication of the table of current directions for each calculation function.

Numerical examples will be given below for the calculation control; in these examples, instead of indicating the direction of the current, we have indicated on the decimal of the system the value of the number that appears in the biquinary system at the end of the calculation and transfer phases in the respective groups of contacts. For indicating numbers in the R group, an asterisk next to the number has been used where needed to indicate when contacts $ri*$ are closed. Account is given of the operation of the keyboard and the read-out mechanism at the beginning of the numerical example. The route of the current, which leads to a corresponding series of numbers in the electrical groups, is no longer specially indicated; it can be followed with the aid of the table of current directions and the diagrams of electrical elementary operations and of general calculation operations.

*Initial operation.*—For the initial operation, the number in the indicator is first introduced into the R group by means of the indicator relays, as has already been said above. After this, a transfer phase goes on in the B group, for which three possibilities exist, depending on the operation key actuated.

Transfer phase:
   (a) Positive $f0e$, $f0a$
   (b) Positive
   (c) Negative

In case (a), a 0 is introduced into the B group instead of the number set up in the indicator, by means of special windings whose input conductors are connected to $f0e$, $f0a$ (FIG. 20). In this case, the transfer of the indicator number into the R group is superfluous and is only retained in order to have a uniform working method for all the initial operations. In case (b), the number is transmitted directly, and in case (c) its nine's complement is transmitted to the B group.

The control of the transfer phase depends on the calculation operation performed. The simplest form of control is not to connect the contacts of the relevant elements of the R group directly to the input conductors of FIG. 20 but to insert switches or commutator that are actuated by the operation keys and produce the connections needed for the operations desired.

Figure 32:
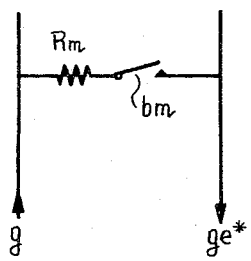
FIGURE 32 is an explanatory view and FIGURE 33 shows a possible modification of the device according to FIGURES 28 to 31.
Figure 33:
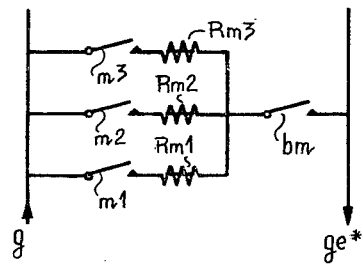

These switches may of course be replaced by relays actuated by contacts or corresponding operation keys, and the three possibilities (a), (b), (c) can be controlled by means of the three switching positions of these relays determined by the corresponding operation keys. In the last two cases, the operation keys have fewer contacts than the first case. FIG. 32 represents any one of the windings of the circuit of FIG. 28. This winding is designated as $Rm1$ and is connected in series to a contact $bm$; FIG. 33 shows how this diagram can be modified to make the choice possible between the three possibilities (a), (b), (c) cited above for the initial operations. Instead of winding $Rm1$, three windings $Rm1$, $Rm2$ and $Rm3$ are provided to control contacts that make it possible to obtain the different current directions necessary for these three possibilities. When $bm$ becomes operative, the current direction for the next transfer, is only defined when one of the three contacts $m1$ to 3 is closed. The selection of these contacts is made by means of an operation key.

Numerical example:
  Keyboard value _____ 054
  Indicator value _____ 078453

| Calculation phase | Transfer phase |
|---|---|
| Nothing | (a) 000000. <br> (b) 078453. <br> (c) 921546. |

A value has been shown for the keyboard in order to show that the keyboard can do so, but clearly this value does not enter into the initial operation, since the purpose thereof is to transfer into the B group the result set up in the indicating mechanism.

In the following description, only the last transfer phase of the initial operation will be indicated by giving the selected direction of current (a), (b), or (c). The first mechanical phase takes place immediately after this datum.

Calculation operations performed by means of a single calculation phase (1) *Addition.*—To perform an addition, the number set up in the indicating mechanism must be introduced into the B group and the value introduced in the keyboard must be brought into the A group. A single calculation phase is then required to get the result of the addition into the R group, this calculation phase being followed immediately by the read-out operation. The current direction diagram is given below. It is followed by a numerical example showing the sum $$078453 + 054 = 078507$$

Pattern:

| Calculation phase | Transfer phase |
|---|---|
| ------------------ | (b) Positive. |
| First mechanical operation; the keyboard value is introduced into the A group | |
| Positive, read-out. | |

Numerical example:
Keyboard value ---------------------------------- 054
Indicator value -------------------------------- 078453

| Calculation phase | Transfer phase |
|---|---|
| ------------------ | (b) 078453. |
| First mechanical phase | |
| 078507, reading out. | |

(2) *Introduction of the dividend.*—This introduction can be performed as a simple addition when the previous result has been cleared. When the clearing and addition operations are combined, a special dividend introduction operation is obtained. This last should be introduced on the keyboard leaving its last denomination row to the left free.

Pattern:

| Calculation phase | Transfer phase |
|---|---|
| ------------------ | (a) Positive $f0e, f0a$. |
| First mechanical operation; the keyboard value is introduced into the A group | |
| Positive, reading out. | |

Numerical example:
Keyboard value ---------------------------------- 071
Indicator value -------------------------------- 023045

| Calculation phase | Transfer phase |
|---|---|
| ------------------ | (a) 000000. |
| First mechanical phase | |
| 000071, reading out. | |

Calculation operations composed of successive fixed-control elementary operations (3) *Clearing the result.*—The form hereinafter described of clearing the result is intended for the case in which the A group can not be set at zero by a special mechanical operation, principally when this group can not contain more than one value during the entire calculation operation, as in the embodiment described.

Pattern:

| Calculation phase | Transfer phase |
|---|---|
| ------------------ | (a) Positive $f0e, f0a$. |
| First mechanical operation; the keyboard value is introduced into the A group | |
| Positive. Positive $ge1$, reading out. | Negative. |

Numerical example:
Keyboard value ---------------------------------- 764
Indicator value -------------------------------- 003784

| Calculation phase | Transfer phase |
|---|---|
| ------------------ | (a) 000000. |
| First mechanical phase | |
| 000764. 1:000000, reading out. | 999235. |

The one to the left of the colon in the result (seventh denomination row) is not read out, since it is beyond the machine's capacity. When the same thing occurs in the succeeding numerical examples for different calculation operations, it will be indicated in the same manner.

(4) *Subtractions.*—A special new control is provided for the general course of the calculation for all the calculation operations containing subtractions, and hence for subtraction itself. Now in this case the subtrahend is not converted into its complement, as is usually done, but the minuend is converted into its complement. This makes it necessary to perform a greater number of electrical operations, but saves a number of parts needed for the conversion of the number in the A group into its complement, this transformation into the complement being necessary, however, in the B group, but being obtained in a very simple manner, as explained hereinbefore. Thus, it is possible to retain the number set up in the A group throughout the length of any combined calculation whatever, so that only one control operation is necessary to set the contacts of the A group, and can therefore be relatively slow.

Moreover, since the calculation operation immediately preceding the read-out operation can only be an addition, a subtraction must be performed twice in a row before that, by way of compensation.

Pattern:

| Calculation phase | Transfer phase |
|---|---|
| ------------------ | (c) Negative. |
| First mechanical phase; the keyboard value is introduced into the A Group | |
| Positive. Positive. Positive, reading out. | Positive. Negative. |

Numerical example:
$$621 - 576 = 045$$
Keyboard value ---------------------------------- 576
Indicator value -------------------------------- 000621

| Calculation phase | Transfer phase |
|---|---|
| ------------------ | (c) 999378. |
| First mechanical phase | |
| 999954 1: 000530 1: 000045, reading out. | 999954. 999469. |

(5) *Tabulation to the left.*—The machine described has a set of tabulation keys that make it possible to order in advance a decimal shift of a given number of denomination rows by depressing one of the said keys. In addition, this tabulator becomes operative during the control of operations depending on the numbers, as during division and multiplication, where it ends the calculation operation when the quotient or the result has been shifted a certain number of denomination rows. The control part of the tabulator has two groups:

(1) The tabulator (2) The denomination row shift control

The tabulator proper is a relay register that advances one step at each denomination row shift and that interrupts the calculation operation after a certain number of steps. The various keys of the tabulator make it possible to change the number of steps requisite for this interruption.

In the machine described, a denomination row shift is controlled by a negative current in the R group, which causes contacts $ri^*$ to close. The register of the tabulator thus reacts to the reversals of current in the R group by advancing one step.

In the control depending on the numbers, as in division and multiplication, the order of denomination row shift is given by this control itself and consists in a fixed, cyclical calculation control operating according to the following pattern:

| Calculation phase | Transfer phase |
|---|---|
| Negative. | Negative. |
| Positive. | Negative. |

This denomination row shift pattern requires two elementary operations per denomination row, but has the advantage that the A group can retain any number, which cannot affect the tabulation. This is so because of the principle that the keyboard value is added and subtracted alternately during the elementary electrical operations. The diagram of the tabulator proper requires a special explanation, for it is not constructed according to the general principles of the fixed control described above.

FIG. 34 represents the tabulator circuit in the R group, and FIG. 35 the same circuit in the B group. The circuit according to FIG. 35 is situated before the inverters that determine the current direction in the B group, so that the direction of the current is always the same in this part of the circuit. The circuit according to FIG. 34, on the other hand, is placed directly in the calculation circuit of the machine and can have positive or negative currents going through it. During the transfer phase of the initial operation, winding 3B$a$ is excited, which engages the tabulator. The excitation of winding 3B$a$ causes contact $ba$ to close. When the next calculation phase takes place with a positive current direction (no denomination row shift), R$a$ is passed through positively and closed $ra$. The current passing through $ra$ passes positively through 1B$a$ at the time of the succeeding transfer and again closes $ba$. Any reversal of the current direction in the B group that may occur thus has no effect on this engagement, since the partial circuit of FIG. 35 is by definition located before the inverter contacts of the control portion. If a positive calculation phase occurs once more, the action of these contacts is repeated and contacts $ba$ and $ra$ close alternately. When there is a negative current direction in R, contact $ra^*$ closes, and $ba^*$ closes at the time of the next transfer. The tabulator has advanced one step and remains in that position until a new denomination row shift makes the current pass across R$c$. At a succeeding denomination row shift, the tabulator comes to its last graduation and the current passes through R$d$, so that the relays bearing windings R$t$ and 2B$t$ are excited and lead up to an interruption of the calculation in the R and B groups, respectively.

Reversing contacts $t1$ to $t3$ are controlled by the tabulator keys. When contact $t2$, for example, is brought into the reverse position to that shown in the drawing, the first impulse that goes through $ra^*$ passes directly through winding 2B$b$ instead of winding 2B$a$, so that the tabulator orders the end of the operation two decimal places sooner. This takes place in a similar way for the other invert relay contacts.

Tabulation to the left during a calculation operation is analogous to the cyclical denomination row shift described above. This tabulation is obtained by means of a fixed control that determines the positive and negative current directions in the groups. As an example, a three-order tabulation to the left is shown in a pattern, with a numerical example.

Pattern:

| Calculating phase | Transfer phase |
|---|---|
| -------------------- | (c) Negative. |
| First mechanical phase; the keyboard value is introduced into the A group | |
| Positive. | Negative. |
| Negative. | Negative. |
| Positive. | Negative. |
| Negative. | Negative. |
| Positive. | Negative. |
| Negative. | Negative. |
| Positive. | Negative. |
| Positive, read out. | |

Numerical example:
Keyboard value _____ 007
Indicator value _____ 000084

| Calculating phase | Transfer phase |
|---|---|
| -------------------- | (c) 999915. |
| First mechanical phase | |
| 999922. | 000077. |
| 000084*. | 999159. |
| 999166. | 000833. |
| 000840*. | 991599. |
| 991606. | 008393. |
| 008400*. | 915999. |
| 916006. | 083993. |
| 084000, read out. | |

(6) *Tabulation to the right.*—As has already been described above, the circuit of FIG. 20 makes it possible to perform denomination row shifts of one row toward the left, with a transfer of the digit in the last denomination row to the left into the last denomination row to the right. By this cyclical denomination row shift, the denomination row shift of $i$ rows to the right can be obtained, in a machine of $u$ denomination rows, by performing a denomination row shift to the left of $u-i$ places.

(7) *Introducing the multiplier.*—For the automatic multiplication operations that will be described hereinafter, the multiplier must be set up in the R group, beginning with the next to the last denomination row to the left. Since the keyboard has only three denomination rows and hence can only act upon the three denomination rows on the right of the calculation circuit, preparing to multiply makes it necessary to clear the result of the preceding calculation, to introduce the multiplier into the keyboard, leaving the last denomination row on the left clear, to transfer it into the R group by an addition and finally to shift it three denomination rows to the left.

These three operations can be combined into a single one, which is set in motion by a definite operation key.

Diagram:

| Calculation phase | Transfer phase |
|---|---|
| ------- | (a) Positive f0e, f0a. |
| First mechanical phase; the keyboard value is introduced into the A group | |
| Negative. | Negative. |
| Positive. | Negative. |
| Negative. | Negative. |
| Positive. | Negative. |
| Negative. | Negative. |
| Positive. | Negative. |
| Positive, reading out. | |

Numerical example:
Keyboard value_____ 084
Indicator value_____ 074035

| Calculation phase | Transfer phase |
|---|---|
| ------- | (a) 000000. |
| First mechanical phase | |
| 000084*. | 999159. |
| 999243. | 000756. |
| 000840*. | 991599. |
| 991683. | 008316. |
| 008400*. | 915999. |
| 916083. | 083916. |
| 084000, read out. | |

It will be seen that the tabulator mechanism described can be used to effect this calculation control.

*Calculation operations composed of successive elementary operations controlled according to the numbers*

For any control depending on the numbers, the determination of the current directions, as well as the number of calculation operations, depends on the numbers that are used in the calculation. Contrary to the fixed control, the calculation circuit itself (in which the numbers are set up) must control contacts of the control mechanism, so as to react upon the arrival of certain numbers (multiplication) or the transmission of a carry (division). In the control depending on the numbers, the sequence of operations can not be given in the form of a set table, since it varies according to the numbers given. An example with numbers will therefore be given at the same time as the calculation scheme. The controls depending on the numbers are always combined with fixed controls. The latter, for example, control the initial operation and generally an intermediate operation as well, before the read-out operation, to perform certain corrections of the calculation result. In addition, a tabulation is performed at the same time as the control depending on the numbers, to order the termination of the calculation after obtaining a certain number of denomination rows in the result.

(8) *Division.*—(a) *Non-automatic.*—FIG. 36 represents the diagram of FIG. 19, in simplified form, with the connections within the denomination rows eliminated. The three denomination rows to the right are designated as R$i$1–3 and the three to the left as R$i$4–6. It is assumed that in consequence of a preceding operation of dividend introduction the dividend is set up in the right half of the machine (denomination rows 1 to 3). The left half of the machine (denomination rows 4 to 6) has the function of registering the quotient and serves as a counter. To this end, the double switch 1$s$1, 2$s$1 (FIG. 36) is set in the position opposite to that of the drawing in order to switch over upon entry "with a ten's carry" into the fourth denomination row so that at each operation of the machine a 1 is added in that denomination row. In addition, an indicating instrument L is at the exit of the third denomination row that would normally lead to a ten's carry in the fourth decimal place. For operations other than addition, this instrument is short-circuited by 2$s$1, but for division, because of the setting of 1$s$1, 2$s$1, it receives a current when a ten's carry from the third denomination row occurs. This indication has the same use as the bell device to warn when the machine's capacity is exceeded, as is well-known for mechanical calculating machines, and can be used to carry out non-automatic divisions, in which successive subtractions of the divisor are performed until the said instrument becomes operative, then an addition of the divisor is performed before causing a denomination row shift of one place to the left and operations begin over again until the result is obtained. At all events, this non-automatic division has no interest in the machine according to the invention, since the speed of electrical calculation operations does not make it possible in practice for the operator to alter their sequence.

(b) *Automatic.*—In the diagram for automatic division, switch 1$s$1, 2$s$1 (FIG. 36) is replaced by a switch $s$1$d$ (FIG. 37), while instrument L is replaced by two relays with coils 1R1$d$ and R2$d$ and whose double contacts $r$1$d$, $r$1$d$* and $r$2$d$ are operative in the control mechanism of the B group. When there is a ten's carry from the third denomination row, these contacts order the addition of a divisor and the denomination row shift.

While the calculation circuit of FIG. 19 is kept without change, except for the addition of the above relays with windings 1R1$d$ and R2$d$ and the replacement of 1$s$1, 2$s$1 by $s$1$d$ (FIG. 37), the transfer circuit (cricuit B) shows differences from that of FIG. 20. These differences must be present, for it must be possible to change the direction of the current in one or more denomination rows of the B group to enable the current to go through the denomination rows partly in the positive direction and partly in the negative direction during a transfer phase. Invert relay contacts are provided to produce these current reversals and are composed of contacts of the relays of the control portion that will be described hereinafter with reference to FIGS. 40 and 41.

FIG. 39 represents the B circuit of FIG. 20 with the adjuncts necessary for automatic division and multiplication. A double switch 1$s$2, 2$s$2 will be noted at once, connected between denomination rows 3 and 4 and cooperating with contacts $d$ and $d$*. These elements were illustrated in FIG. 20, by the way, but have not yet been mentioned in the description.

In the position that contacts 1$s$2 and 2$s$2 occupy in FIGS. 20 and 39, they do not produce any alteration in the transfer phase. Contacts $d$ and $d$* are actuated by a relay whose control winding D is in the calculation circuit (FIG. 19), just before output $ga$. When the current is positive during the calculation phase, D controls the closure of $d$; on the contrary, if the current is negative, it controls the closure of $d$*. It is seen that in the position occupied by 2$s$2 in the drawing, contact $d$ links the same circuit contact members, as does $d$* in series with 2$s$2, so that contacts $d$ and $d$* do not affect the transfer circuit. When contacts 1$s$2 and 2$s$2 are in their other position, it is seen that they have no particular effect in a transfer without denomination row shift (contacts $ri$ closed, $ri$* open), but that in the case of a transfer with denomination row shift ($ri$* closed), they control the introduction of a nine in the fourth denomination row, when the transfer current is positive, or of a zero if it is negative, this irrespective of the position of the contacts $ri$* of the third denomination row.

The diagram of FIG. 39 comprises a set of contacts 1$r$3$d$, 2$r$3$d$, 1$r$3$d$* and 2$r$3$d$* which are employed in case of division. Contacts 1$r$3$d$ and 2$r$3$d$ can be shunted by switches 1$s$3 and 2$s$3. Contacts 1$r$3$d$ and 2$r$3$d$ are so connected that when they are closed, the connections between the sixth denomination row and the first denomination row are like those of FIG. 20. On the other hand, when contacts 1$r$3$d$ and 2$r$3$d$ are open and contacts 1$r$3$d$* and 2r3d* are closed, the circuit is modified in such a way that during the transfer phase the passage of the current in the first denomination row is in the direction opposite to the current's passage in the other denomination rows.

Another set of contacts has been provided to make it possible to reverse the direction of the current in denomination rows 1 to 3 as compared to denomination rows 4 to 6. This group comprises contacts 1r4d, 2r4d, 1r4d* and 2r4d*. Closure of contacts 1r4d and 2r4d sets up connections like those of FIG. 20, while closure of contacts 1r4d* and 2r4d* causes reversal of the current direction in denomination rows 1 to 3 compared to the rest of the transfer circuit. Switches s7 and s8 make it possible to shunt contacts 1r4d and 2r4d.

The circuit of FIG. 39 comprises adjuncts required for automatic multiplication. In particular, a set of contacts 1r1p, 2r1p, 1r1p* and 2r1p* is provided to make it possible to reverse the transfer current direction in the sixth denomination row, compared to the rest of the B circuit, by the closure of contacts 1r1p* and 2r1p*. When contacts 1r1p and 2r1p are closed, the connection between the fifth and the sixth denomination rows are the same in FIG. 20. Switches s5 and s6 are provided to shunt contacts 1r1p and 2r1p and are closed during divisions. Further, contacts 1r6p, 1r7p and 2r6p, 2r7p, respectively, are connected in parallel to contacts s7 and 2s3, while contacts 1r6p*, 2r6p* and 1r7p*, 2r7p*, respectively, are provided to cause the introduction of a zero or a nine, respectively, in the first denomination row instead and in place of the number set up in the sixth denomination row at the time of a denomination row shift controlled by the closure of the ri* type contacts. These contacts 1r6p, 1r7p, 2r6p, 2r7p and 1r6p*, 1r7p*, 2r6p* 2r7p* all remain open during the performance of a division.

Division control portion circuit

The circuit is shown in FIGS. 40 and 41. FIG. 40 indicates the calculation circuit diagram and FIG. 41 that of the transfer circuit. The circiuts of FIGS. 19 and 20, which are provided with modifications in conformity with FIGS. 37 and 39, are schematically represented in FIGS. 40 and 41 and are designated by R (6, 5, 4, 3, 2, 1) and B (6, 5, 4, 3, 2, 1); input conductors ge and ga, fe and fa, respectively, are connected by the contacts of the control portion to the terminals of the impulse generator RM (ge* and ga*) and BM (fe* and fa*), respectively.

A tabulator according to FIGS. 34 and 35 is used for division. The portion of it shown in FIG. 34 is in the sixth denomination row R circuit (FIG. 40), where it is indicated by T$ab$, so that the direction of the current is the same there as for the calculation phases. The portion of it shown in FIG. 35 is likewise indicated by T$ab$ and is located between the impulse generator and the control part of FIG. 41, so as not to be affected by the direction of the current during the transfer phases. This tabulator makes possible a maximum denomination row shift of four columns, and keys t1, t2, t3 make it possible to reduce its capacity to 1, 2, 3 denomination rows, respectively. In the division example described below, it is to be taken that t3 is closed.

This tabulator is like the one represented in FIGS. 34 and 35, and comprises a relay carrying windings 1Bt and 2Bt, which is intended to cause the machine to stop when the division has been performed. This relay has double contacts 1bt (position I) and 1bt* (position II), which are part of the control circuit of FIG. 40. This relay comprises still other contacts, which are useful for multiplication and will be described at the same time as the latter.

Circuit R of the division control portion (FIG. 40) comprises three relays, one of them with winding R3d, whose contacts 1r3d, 2r3d (position I) and 1r3d*, 2r3d* (position II) are in the circuit of FIG. 39, another with windings 1R4d, 2R4d, whose contacts 1r4d, 2r4d and 1r4d*, 2r4d*, respectively, are shown in FIG. 39, and a third relay with windings 1R5d and 2R5d, whose contacts r5d and r5d*, are located in the control portion of FIG. 41. In addition, one of the two relays between the third and fourth denomination rows of FIG. 37 comprises 1R1d (FIG. 37) and a contact r1d or r1d*, respectively (FIG. 41), and the other has a winding R2d (FIG. 37) and a double contact r2d (FIG. 41).

Circuit B (FIG. 41) has two relays for division, one with windings 1B1d, 2B1d, 3B1d (FIG. 41) and double contacts 1b1d or 1b1d*, respectively, and 2b1d*, respectively (FIG. 40), the other with windings 1B2d, 2B2d (FIG. 41) and double contacts b2d and b2d* (FIG. 40).

*Course of a division operation.*—The functioning of the control portion will be explained with reference to the division example 71:30=2.36, remainder=0.20.

In this example, the sequence of current directions for the calculation and transfer phases takes place according ot the following pattern:

Keyboard value ............................................................................................. 030
Indicator value ............................................................................................. 000071

| Calculation phase | Transfer phase |
|---|---|
| ------------------ | (c) 6—4 positive (r4d*) <br> 3—1 negative. |
| First mechanical phase; the keyboard value is introduced into the A group | |
| (1) Positive. | Positive. |
| (2) Positive. | Positive. |
| (3) Positive. | Negative. |
| (4) Negative. | 6—2 negative, 1 positive (r3d*). |
| (5) Positive. | Positive. |
| (6) Positive. | Positive. |
| (7) Positive. | Positive. |
| (8) Positive. | Negative. |
| (9) Negative. | 6—2 negative, 1 positive (r3d*). |
| (10) Positive. | Positive. |
| (11) Positive. | Positive. |
| (12) Positive. | Positive. |
| (13) Positive. | Positive. |
| (14) Positive. | Positive. |
| (15) Positive. | Positive. |
| (16) Positive. | Negative. |
| (17) Positive. | 6—4 positive, 3—1 negative (r4d*). |
| (18) Positive. | Negative. |
| (19) Positive, read-out. | |

To the beginning of the operation, the dividend begins in the second denomination row of the R group and the divisor begins in the second denomination row of the keyboard. In the course of the calculation the following intermediate results are obtained in the B and R groups, defined by the closure of contacts in the corresponding denomination rows.

| Calculation phase | Transfer phase |
|---|---|
| ------------------ | (c) 000928. |
| First mechanical phase | |
| (1) 001 958. | 001 958. |
| (2) 002 988. | 002 988. |
| (3) 003 018. | 996 981. |
| (4) 997 011*. | 020 889. |
| (5) 021 919. | 021 919. |
| (6) 022 949. | 022 949. |
| (7) 023 979. | 023 979. |
| (8) 024 009. | 975 990. |
| (9) 976 020*. | 230 799. |
| (10) 231 829. | 231 829. |
| (11) 232 859. | 232 859. |
| (12) 233 889. | 233 889. |
| (13) 234 919. | 234 919. |
| (14) 235 949. | 235 949. |
| (15) 236 979. | 236 979. |
| (16) 237 009. | 762 990. |
| (17) 763 020. | 763 979. |
| (18) 764 009. | 235 990. |
| (19) 236 020, read out. | |

The course of these operations can be followed with the help of FIGS. 40 and 41. In the last transfer phase of the initial operation, contacts 1r4d*, 2r4d* are closed for a positive current direction in the B group, so that columns 1 to 3 are transmitted as complements and columns 4 to 6, directly. The closure of contacts 1r4d* and 2r4d* is schematically indicated by (r4d*) in the table of current indications. At the same time, windings 2Ba and 2B1d are energized, so that contact ba (tabulator, FIG. 40) and double contact 1b1d (FIG. 40) are closed, so that the calculation phase, which follows the first mechanical operation to take place, is prepared. The closure of contacts 1r4d*, 2r4d* and the potential across windings 2Ba and 2B1d are ordered directly by the division control operation key.

This operation key also has the effect of putting switches s1d (FIG. 37) and 1s2 and 2s2 (FIG. 39) in the reverse position to that shown in the drawing. Moreover, switches 1s3, 2s3, s7 and s8 of FIG. 39 are open, while switches s5, s6 (FIG. 39) and s9 (FIG. 41) are closed.

At the time of the first calculation phase the direction of the current is positive, for double contact 1b1d is closed. Since no carry occurs in the third denomination row, R2d (FIG. 37) is energized and closes contact r2d (FIG. 41). At the same time R3d and 1R4d have a potential across them and close contacts 1r3d, 2r3d and 1r4d, 2r4d (FIG. 39). During the first transfer phase the current flows in the positive direction through double contact r2d across fe and fa, 1B1d being energized, which once more closes double contact 1b1d. As a result of the closure of contacts 1r4d, 2r4d and 1r3d, 2r3d, the current goes through all the denomination rows in the same direction. The second calculation and transfer phases are exactly similar. At the third calculation phase, 1b1d is closed again. Since there is a ten's carry in the third column 1R1d is energized and r1d closed. As a result of the closure of r1d, the direction of the current is negative during the third transfer phase and there is a potential across 2B1d, so that the two double contacts 1b1d* and 2b1d* are closed.

At the last transfer phase of the initial operation, winding 3Ba of the tabulator is energized and ba is closed for the first time, while Ra is energized during the first calculation phase, as a result of the positive passage of the current, closing ra. During the first transfer, there is a potential across 1Ba, which closes ba. This series of engagements is repeated in the two succeeding calculation and transfer phases. In addition to 1Ba, 1Bt is also energized at the time of each transfer and closes double contact 1bt in the division control mechanism.

During the fourth calculation phase, the current goes across double contacts 1b1d* and 1bt of the control mechanism, which are connected in series and closed, and flows in the negative direction via ge, ga. 1R4d is crossed positively and R3d negatively, so that contacts 1r4d, 2r4d and 1r3d*, 2r3d* are closed. At the same time, a potential is put across winding Ra of the tabulator (FIG. 34) by closed contact ba, so that contact ra* is closed. A negative passage of the current during this calculation phase controls a denomination row shift, and at the same time the tabulator advances by one step. As a result of the carry in the third denomination row, 1R1d (FIG. 37) is energized at the same time, and because of the negative direction of the current in the denomination rows, closes r1d*.

During the fourth transfer, the current flows via the double contact r1d* and traverses fe, fa in the negative direction. 1B1d is energized, which closes double contact 1b1d. In the transfer circuit of FIG. 39, d* is closed and contacts 1s2 and 2s2 occupy the position opposite to that shown in the drawing, which gives a zero in the fourth denomination row irrespective of the digit in the third row, for there is a denomination row shift.

Moreover, in the same circuit 1r3d*, 2r3d* and 1r4d, 2r4d are closed, which is indicated schematically by (r3d*) in the current table, and all the denomination rows, with the exception of the first, are traversed in the negative direction. This makes it possible for the digit of the last denomination row to the left to be transmitted directly to the right after the dividend. In the example described, this digit is a nine (complement of a 0), but the left portion of the machine could still contain some denomination rows of the dividend that could be successively relocated to the right at each denomination row shift. In the example of a six-column machine that has been described, the dividend could contain four figures at the most, and in the general case of a machine with $u$ denomination rows, it could contain $u-2$ figures, for the last denomination row of the left half of the machine must be free to receive the first figure of the quotient and the first denomination row to the left in the right half of the machine must likewise remain free. In the course of the calculation, the left digits of the dividend are successively wiped out and the denomination rows that are freed are successively open to receive the different figures of the quotient. These arrangements make it possible to get by without a revolution counter proper.

At the fourth transfer phase, winding 2Ba of the tabulator (FIG. 35) is energized thanks to closed contact ra*, which closes ba*.

The fifth, sixth and seventh calculation and transfer phases are like the first and second phases and this cycle is repeated because of the absence of a third column carry. The eighth calculation phase is like the third one, because a third column carry occurs, and the eighth transfer, ninth calculation and ninth transfer are like the third transfer, fourth calculation and fourth transfer. From the fifth transfer to the eighth calculation phase, the tabulator is located between two positions, for which winding 2Ba and Rb are alternately under positive potential, but at the ninth calculation phase there is a negative potential across Rb through contact ba*, and it closes rb*.

On our initial assumption, t3 is in the position opposite to that shown in FIG. 35, windings 2Bb, 2Bt are energized through rb* and t3 at the time of the ninth transfer and close contact bb* (FIG. 34) of the tabulator and double contact 1bt* (FIG. 40) of the control portion. Double contact 1bt* makes ready the stopping of the calculation and the read-out operation.

The tenth to fifteenth calculation and transfer phases are, then, like the first and second, for double contact 1b1d is closed during the calculation phase, as is contact r2d during the tranfer, and they cause the current to be in the positive direction during the calculation and transfer phases. In the tabulator Rd or 2Bb and 2Bt, respectively, are alternately energized and from the tenth calculation phase the double contact 1bt* is closed at each calculation phase, but has no effect as yet, since it is in series with a double contact 2b1d* that is open.

In the sixteenth calculation phase a carry occurs in the third denomination row, so that 1R1d is energized and r1d closed. In the sixteenth transfer, the current flows negatively via contact r1d across fe, fa, traverses 2B1d and closes the two double contacts 1b1d* and 2b1d* and, in the tabulator, traverses windings 2Bb and 2Bt via closed contact rd, causing the closure of bb* (tabulator FIG. 34) and 1bt* (control portion FIG. 40). In the 17th calculation phase, the current passes through contacts 2b1d* and 1bt* as well as windings 2R4d, 1R5d, 2R1d, R3d, and winding 1R1d in the R circuit (FIG. 37, third column ten's carry).

Thus, contacts 1r4d*, 2r4d*, 1r3d, 2r3d of the B circuit (FIG. 39) are closed. In the control circuit (FIG. 41) double contact r5d is closed, while the currents passing through coils 1R1d and 2R1d are of opposite polarities, so that the action of one cancels the action of the other and the contacts of this relay are not closed.

In the 17th transfer, the current passes negatively through denomination rows 1 to 3 and positively through denomination rows 4 to 6 because of closed contacts 1r3d, 2r3d, 1r4d\* 2r4d\* and double contact r5d, and closes double contact b2d by the action of winding 1B2d.

In the 18th calculation phase, the current flows positively at ge, ga across contact b2d and goes through windings 1R4d, 2R5d, R3d, 2R1d, as well as 1R1d (FIG. 37). In the B circuit (FIG. 39), contacts 1r3d, 2r3d, 1r4d, 2r4d are closed, as well as r5d\* in the control circuit (FIG. 41). The magnetic forces of windings 1R1d and 2R1d, which are traversed in opposite directions, cancel each other.

In the 18th transfer, the current passes through double contact r5d\* negatively to fe, fa and closes double contact b2d\* by crossing 2B2d. During this transfer phase, the succeeding operation is made ready, for example the disengagement of the impulse generator, the mechanical read-out operation, etc. To do this a relay of the general control circuit may be used that is schematically represented by the sign A (FIG. 41).

In the 19th calculation phase, the current goes positively through ge, ga by double contact b2d\* and at the same time the read-out is performed.

Examining the successive results in the sequence of calculation phases, we see that after the 15th calculation phase, the result of the division is already set up in the R group, the left three columns indicate the quotient while the value of the remainder is set up as a nine's complement in the three right columns. It is not till after the 16th calculation phase, nevertheless, that the end of the division is indicated by the excitation of winding 1R1d. From the 17th calculation phase on, the operations are for the purpose of correcting the result and are the same for all divisions, irrespective of the numbers involved therein. The 17th calculation phase makes it possible to add the divisor, which had been subtracted once too many in the 16th calculation phase, so that this time the remainder is indicated in three right columns, while the three left columns contain the complement of the quotient. During the 17th transfer only denomination rows 1 to 3 are converted into their complements, so that the quotient and the remainder are indicated as complements. To transfer this result to the B group as a direct value, we need a calculation phase with addition of the number set up in the A group (multiple-contact wipers or sliders) and then a transfer as complement, followed by a new calculation phase with addition of the number of the A group. The quotient and the remainder are then indicated as direct values in the three left and the three right denomination rows, respectively. The example describes the calculation for a quotient with three figures. The division may be interrupted, however, in this same example after calculating two denomination rows or only one. To do this, we need only close contact t2 or t1 instead of t3. When t2 is actuated, the fixed calculation control, which was effected from the 17th calculation phase on through the 19th, begins after the 9th transfer. If it is t1 that is closed, this fixed calculation control begins only after the third calculation operation.

The control mechanism, according to FIGS. 40 and 41, does not vary with the number of the machine's denomination rows; it is merely necessary that the tabulator according to FIGS. 34 and 35 comprise enough positions to be able to advance one step at each possible denomination row shift.

(9) *Automatic multiplication.*—To perform automatic multiplication, it is advisable to convert the multiplier into its complement and set it into the left half of the machine, the multiplicand being introduced into the keyboard. Successive additions are then controlled and continuously add the keyboard value in the right portion of the machine, while a 1 is successively added in the column to the extreme left of the machine until a nine appears in it. Then a denomination row shift to the left makes it possible to bring the succeeding digit of the multiplier into the last column, at the same time that the result is also shifted one column, the successive additions being performed again until a nine is obtained in the last column to the left, which controls a new denomination row shift, this action continuing until the multiplier is exhausted. In this case, too, we can eliminate a special counter for the elementary operations, equivalent to the revolution counter of mechanical calculating machines, since the registered multiplier disappears progressively from the calculation circuits and frees denomination rows that can receive the digits of the result. The additions of 1 can easily be obtained by using the entries for the transfer of carries.

It is seen at once that the number of additions needed per denomination row is obtained by the means that have been described. If the number in question of the multiplier is 7, its nine's complement is 2, so that seven additions of 1 are needed to obtain 9.

One way of obtaining the denomination row shift proper is repeated additions and subtractions; another way is to combine it with an addition in the course of the succeeding calculation phase. This second method has the advantage of not requiring an additional phase, for the denomination row shift is combined with an addition which is required in any case. This method can only be used, however, when the next digit of the multiplier is at least equal to 1. When this digit is 0, the first method must be used. It is however advisable to use the second way as a general thing, and to use the first along with it in those cases where there is a 0 in the multiplier so that a denomination row shift alone must be performed, as the second method makes it possible to save two complete calculation operations.

A further economy in calculation operations can be secured when the calculation is shortened, namely when the digits below 5 are added but the digits of 5 and more control a supplementary addition in the preceding denomination row, so that they may be subtracted. This procedure is generally known for manual multiplication and is applied in various ways on certain automatic machines.

Multiplication circuits may be developed in various ways to make it possible to obtain this property. Hereinafter an embodiment has been described whose object it is to make it possible to perform multiplications with as limited a number of elementary operations as possible.

To perform these multiplications supplementary relays must be provided in the calculation circuits which cooperate with the control circuit relays proper, and will be explained hereinafter. In the circuit of FIG. 19, contacts b1p and b1p\* of a relay, as shown schematically in FIG. 38, have been inserted between the fifth and sixth denomination rows. Contact b1p takes care of the normal connection between denomination rows 5 and 6; in this, a carry can only be transmitted to the sixth denomination row when the number obtained in the fifth is at least equal to 10. If b1p is open and b1p\* is closed, a ten's carry occurs at each calculation operation and brings about successive additions of 1 in the sixth denomination row. These contacts b1p and b1p\* are controlled by a relay that has three control windings, two of which, 1B1p and 2B1p, are located in the multiplication control circuit (FIG. 43), while the third, 3B1p, is a starting winding that becomes operative at the time of the last transfer of the initial operation. For other operations than multiplication, this relay is inoperative and a switch p1 is provided to short-circuit contact b1p, this switch p1 of course being open during multiplication.

FIGS. 42 and 43 represent the control portions for multiplication. As for division (FIGS. 40 and 41), the multiplication control comprises two circuits intended to determine the current direction during the calculation and transfer phases, these circuits being provided in the first case between the calculation circuit (FIG. 38) and output conductors ge* and ga* of the generator supplying impulses RM, and in the other between the transfer circuit (FIG. 39) and output conductors fe* and fa* of the generator supplying impulses BM. The tabulator shown in FIGS. 34 and 35 cooperates with these control circuits and is connected as for division, that is, in such a way as to be sensitive to reversals of the current in the R circuit but insensitive to those of the B circuit.

The circuits of FIGS. 42 and 43 comprise contacts whose positions are determined as functions of the numbers set up in the calculation and transfer circuits. The circuit of FIG. 42 comprises double contacts 3b06, 3b06*, 3b16, 3b16*, 3b26, 4b06* and 4b16*, which are controlled by relays of the last denomination row to the left, that is, the sixth denomination row. This circuit also comprises quadruple contacts 3bu5 and 3bu5*, which are controlled as functions of the digit in the next to the last denomination row of the B group, namely the fifth. Closure of contact 3bu5 means that that digit is less than 5, and closure of contact 3bu5* that that digit is at least equal to five.

The multiplication control contacts that depend on the number set up in the sixth denomination row determine at what moment the series of additions should be interrupted by a denomination row shift, while the multiplication control contacts that are in the fifth denomination row determine whether the next digit of the multiplier contains a number smaller or at least equal to 5 (positions u and v, respectively) and whether a supplementary addition must be performed before this denomination row shift, with a change-over to subtraction in the next decimal place. As we see, the biquinary system used in the machine is especially advantageous for shortened multiplication, but it is clearly understood that multiplication can also be obtained with decimal or odd-even system, by means of appropriate connections, so that the bequinary system is not an essential characteristic of the multiplication control that is described. What is important is that the connections be made in such a way that the multiplication control contacts of FIG. 43 are always subject to the same digits or groups of digits (for example, the digits below and above 5). In this way, digits below 5 never come to the sixth denomination row of the machine, since in virtue of the shortened calculation principle this denomination row of the multiplier is always so arranged, with a corresponding formation of the complement, that at most five additions take place up to the succeeding denomination row shift, that is, the digit in the six denomination row must always be at least to 5.

It has already been seen, with references to FIG. 39, that the B or transfer circuit comprises supplementary elements as compared to FIG. 20, in order to permit automatic multiplication. Contacts 1r1p, 2r1p, 1r1p* and 2r1p* (FIG. 39) make it possible to reverse the direction of the current in the sixth denomination row during a transfer phase with pre-controlled decimal shift, which makes it possible to convert into its complement that digit of the multiplier that must be introduced into the sixth denomination row. This progressive conversion of the multiplier into its complement is preferable to the conversion of the entire multiplier at once. Moreover, this conversion into the complement can be done away with when a 9 is added in the sixth denomination row of the machine instead of a 1. At all events, this modification requires a larger number of relays than the simple connection of the ten's carry across b1p* in conformity with FIG. 38.

The circuit of FIG. 43 likewise comprises contacts whose positions depend on the value of the digits that appear during the calculation. These are contacts 2ru5, 2ru5*, 2rv5 and 2rv5*, which indicate whether the number set up in the fifth denomination row after a calculation phase is smaller than or at least equal to 5. The control portion may be broken down into three groups which, to be more easily understandable, have been separated from each other by broken lines x and y (FIG. 43) and x' and y' (FIG. 42). The group to the left of x or x', respectively, constitutes the fixed calculation control, which introduces the first digit of the multiplier into the sixth denomination row of the machine. The center group (between x and y, or x' and y', respectively), constitutes the control depending on the numbers in the multiplier, and the last group (to the right of y or y', respectively), whose becoming operative is controlled by the tabulator, comprises a fixed calculation control for correcting the result after all the multiplier has been exhausted and for controlling the read-out and termination of operations.

During multiplication, a universal tabulator according to FIGS. 34 and 35 is operative, as for division, and breaks off the calculation after a certain number of denomination rows, according to the position of keys t1 to t3. The control circuit (FIG. 43) has a winding 3Bt of a tabulator relay, which comprises windings 1Bt, 2Bt, 3Bt as well as four double contacts 1bt, 1bt* (FIG. 40) and 2bt, 2bt* (FIG. 42).

Course of a multiplication

Since the course of a multiplication is in part effected with the help of contacts depending on the digits in the fifth and sixth denomination rows, its performance can only be explained, as in the case of division, by a numerical example. The final operations of the calculation may be different according to whether the last digit of the multiplier is a number smaller or larger than 5 or is equal to 0 or to 9; there are thus four different cases of fixed calculation controls before the read-out. A current direction scheme for each case, followed by a numerical example, will be given hereinafter. After these examples, and with reference to them, we shall explain first the general principle of the machine's operation for each of these cases, and then indicate in detail the action of the various relays.

In each case, before performing the calculation, the multiplier is set up in the R group, in such a way that the last denomination row to the left is free. For, when the multiplier begins with a digit greater than 5, the multiplication must start off with a supplementary addition in the higher denomination row, so that the latter should not be taken up by the multiplier. The multiplicand may be introduced at any place in the keyboard provided that the capacity of the machine is not exceeded in the course of the calculation.

In the first two of the four examples described hereinafter, the multiplier has two digits; in the tabulator (FIG. 35), key t3 is depressed so that the final operations are ordered when the tabulator reaches its third position. In the other two examples, the multiplier has three digits (in the third example the second and third denomination rows have the number 0) and no tabulator key is depressed, so that the final operations take place when the tabulator has reached its fourth position.

In the following four multiplication examples, a table first shows the calculation and transfer current directions and then the corresponding numerical example is given. In the numerical examples, those numbers have been underlined whose appearance brings about determined operation controls and the sign "−" has been used to separate the digits belonging to the multiplier and those belonging to the product. In addition, separation lines x and y have been provided to indicate the moment at which the different groups of relays of the control part become operative, these groups of relays being separated in a corresponding fashion in FIGS. 42 and 43 by lines $x'$ and $y'$ and $x$ and $y$, respectively.

First example:
Indicator value ............................................. 073–000
Keyboard value ............................................. 900

| Calculation phase | Transfer phase |
|---|---|
| ---------------- | (c) Negative. |
| First mechanical operation; the keyboard value is introduced into the A group ||
| (1) Positive. | Negative. |
| (2) Positive, without an addition of a 1 in the 6th denomination row. | Positive. |
| $x$ ---------------- | ---------------- |
| (3) Negative. | Rows 1–5 negative. Row 6 positive. |
| (4) Positive. | Positive. |
| (5) Positive. | Positive. |
| (6) Negative. | Rows 1–5 negative. Row 6 positive. |
| (7) Positive. | Positive. |
| (8) Positive. | Positive. |
| $y$ ---------------- | ---------------- |
| (9) Positive. | Negative. |
| (10) Positive, without an addition of a 1 in the 6th denomination row. | Negative. |
| (11) Positive, read-out. | |

Example 1 with numbers:

| Calculation phase | Transfer phase |
|---|---|
| ---------------- | (c) 9 2 6–9 9 9. |
| First mechanical phase ||
| (1) 0 2 7 8 9 9. | 9 7 2 1 0 0. |
| (2) 9 7 3–0 0 0. | 9 7̲ 3–0 0 0. |
| $x$ ---------------- | ---------------- |
| (3) 0 7̲ 3–9 0 0*. | 7 6–0 9 9 9. |
| (4) 8 6–1 8 9 9. | 8 6̲–1 8 9 9. |
| (5) 9 6–2 7 9 9. | 9 6̲–2 7 9 9. |
| (6) 0 6̲–3 6 9 9*. | 6–6 3 0 0 0. |
| (7) 7–6 3 9 0 0. | 7–6 3 9 0 0. |
| (8) 8–6 4 8 0 0. | 8̲–6 4 8 0 0. |
| $y$ ---------------- | ---------------- |
| (9) 9–6 5 7 0 0. | 0–3 4 2 9 9. |
| (10) 0–3 5 1 9 9. | 9–6 4 8 0 0. |
| (11) 0–6 5 7 0 0, read-out. | |
| Result 900×73=65700 ||

Second example:
Indicator value ............................................. 077–000
Keyboard value ............................................. 900

| Calculation phase | Transfer phase |
|---|---|
| ---------------- | (c) Negative. |
| First mechanical phase ||
| (1) Positive. | Negative. |
| (2) Positive, without an addition of a 1 in the 6th denomination row. | Positive. |
| $x$ ---------------- | ---------------- |
| (3) Negative. | Rows 1–5 negative. Row 6 positive. |
| (4) Positive. | Positive. |
| (5) Negative. | Rows 1–5 positive. Row 6 negative. |
| (6) Positive. | Positive. |
| $y$ ---------------- | ---------------- |
| (7) Positive. | Positive. |
| (8) Positive. | Positive. |
| (9) Positive, without an addition of a 1 in the 6th denomination row. | Negative. |
| (10) Positive, read-out. | |

Example 2 with numbers:

| Calculation phase | Transfer phase |
|---|---|
| ---------------- | (c) 9 2 2–9 9 9. |
| First mechanical phase ||
| (1) 0 2 3 8 9 9. | 9 7 6 1 0 0. |
| (2) 9 7 7–0 0 0. | 9 7̲ 7–0 0 0. |
| $x$ ---------------- | ---------------- |
| (3) 0 7̲ 7–9 0 0*. | 7 2–0 9 9 9. |
| (4) 8 2–1 8 9 9. | 8̲ 2–1 8 9 9. |
| (5) 9 2̲–2 7 9 9*. | 7–2 7 9 9 9. |
| (6) 8–2 8 8 9 9. | 8̲–2 8 8 9 9. |
| $y$ ---------------- | ---------------- |
| (7) 9–2 9 7 9 9. | 9–2 9 7 9 9. |
| (8) 0–3 0 6 9 9. | 0–3 0 6 9 9. |
| (9) 0–3 1 5 9 9. | 9–6 8 4 0 0. |
| (10) 0–6 9 3 0 0, read-out. ||
| Result 900×77=69300 ||

Third example:
Indicator value ............................................. 0200–00
Keyboard value ............................................. 090

| Calculation phase | Transfer phase |
|---|---|
| ---------------- | (c) Negative. |
| First mechanical phase ||
| (1) Positive. | Negative. |
| (2) Positive, without an addition of a 1 in the 6th denomination row. | Positive. |
| $x$ ---------------- | ---------------- |
| (3) Positive. | Negative. |
| (4) Negative. | Rows 1–5 negative. Row 6 positive. Positive. |
| (5) Positive. | Rows 1–5 positive. Row 6 negative. |
| (6) Negative. | Negative. |
| (7) Positive. | Rows 1–5 negative. Row 6 positive. |
| (8) Negative. | |
| $y$ ---------------- | ---------------- |
| (9) Positive. | Negative. |
| (10) Positive. | Positive. |
| (11) Positive, without an addition of a 1 in the 6th denomination row. | Negative. |
| (12) Positive, read-out. | |

Example 3 with numbers:

| Calculating phase | Transfer phase |
|---|---|
| ---------------- | (c) 9 7 9 9–9 9. |
| First mechanical phase ||
| (1) 0 8 0 0 8 9. | 9 1 9 9 1 0. |
| (2) 9 2 0 0–0 0. | 9̲ 2 0 0–0 0. |
| $x$ ---------------- | ---------------- |
| (3) 0 2 0 0–9 0. | 9 7̲ 9 9–0 9. |
| (4) 0 7̲ 9 9–9 9*. | 7 0 0–0 0 0. |
| (5) 8 0 0–0 9 0. | 8 0̲ 0–0 9 0. |
| (6) 9 0̲ 0–1 8 0*. | 9 0̲–1 8 0 0. |
| (7) 0 0–1 8 9 0. | 9 9̲–8 1 0 9. |
| (8) 0 9–8 1 9 9*. | 9̲–1 8 0 0 0. |
| $y$ ---------------- | ---------------- |
| (9) 0–1 8 0 9 0. | 9–8 1 9 0 9. |
| (10) 0–8 1 9 9 9. | 0–8 1 9 9 9. |
| (11) 0–8 2 0 8 9. | 9–1 7 9 1 0. |
| (12) 0–1 8 0 0 0, read-out. ||
| Result 90×200=18000 ||

Fourth example:
Indicator value_____ 0199-00
Keyboard value_____ 090

| Calculation phase | Transfer phase |
|---|---|
| ---- | (c) Negative. |
| First mechanical phase | |
| (1) Positive. | Negative. |
| (2) Positive, without an addition of a 1 in the 6th denomination row. | Positive. |
| x | |
| (3) Positive. | Negative. |
| (4) Negative. | Rows 1-5 negative. Row 6 positive. |
| (5) Positive. | Positive. |
| (6) Negative. | Rows 1-5 negative. Row 6 positive. |
| (7) Positive. | Negative. |
| (8) Negative. | Rows 1-5 negative. Row 6 positive. |
| y | |
| (9) Positive. | Positive. |
| (10) Positive, without an addition of a 1 in the 6th denomination row. | Negative. |
| (11) Positive, read-out. | |

Example 4 with numbers:

| Calculating phase | Transfer phase |
|---|---|
| ---- | (c) 9 8 0 0-9 9. |
| First mechanical phase | |
| (1) 0 8 0 1 8 9. | 9 1 9 8 1 0. |
| (2) 9 1 9 9-0 0. | 9 1 9 9-0 0. |
| x | |
| (3) 0 1 9 9-0 0. | 9 8 0 0-0 9. |
| (4) 0 8 0 0-9 9*. | 8 9 9-0 0 0. |
| (5) 9 9 9-0 9 0. | 9 9 9-0 9 0. |
| (6) 0 9 9-1 8 0*. | 9 0-8 1 9 9. |
| (7) 0 0 0-8 2 8 9. | 9 9-1 7 1 0. |
| (8) 0 9-1 8 0 0*. | 9-8 1 9 9 9. |
| y | |
| (9) 0-8 2 0 8 9. | 0-8 2 0 8 9. |
| (10) 0-8 2 1 7 9. | 9-1 7 8 2 0. |
| (11) 0-1 7 9 1 0, read-out. | |
| Result 90×199=17910 | |

*General principle of operation for multiplication*

Before indicating in detail the operation of the various relays of the control portions of FIGS. 42 and 43, the general principle of the machine's operation is described for the four examples above.

*Example No. 1.*—The multiplier is equal to 73, so that it will be converted into 100—30+3, on the principle of shortened multiplication. The last phase of the initial operation is a transfer as a complement, the three figures on the left, 926, being the complement of 073. The first mechanical phase, during which the keyboard value is introduced into the multiple-contact wipers or sliders of the A group, is followed by two elementary operations whose purpose is to convert the 0 of the sixth denomination row into its complement 9. These first two elementary operations can be avoided by introducing this 9 directly in a different way at the initial operation.

After the second transfer phase, the number in the last three denomination rows is 973. The presence of the digit 9 in the sixth denomination row and that of a digit at least equal to 5 in the fifth row determine the control of a negative current for the third calculation phase. This calculation phase thus corresponds to an addition that will be followed by a denomination row shift during the following transfer. The direction of the current during this third transfer is negative, and is determined by the fact that the digit 7 that is in the fifth row after the third calculation phase is greater than 4. For, this digit being at least equal to 5, the subsequent operations must be subtractions and the 7 is shifted directly to the sixth row, while the other figures are converted into their complements, a 9 being introduced into the first denomination row by contacts 1r7p* and 2r7p*.

When the sixth place contains a 5, a 6 or a 7 after a transfer phase, the succeeding calculation phase takes place with a current of positive direction. It is the same when the sixth row contains an 8 and the fifth a digit at least equal to 5. Moreover, when the calculation phase does not have any denomination row shift, the current is positive during the succeeding transfer. The calculation and transfer phases of the fourth and fifth elementary operations therefore take place with positive currents. After the fifth transfer the sixth denomination row contains a 9 and the fifth a 6, (>4), so that the control is like the one that followed the second transfer phase.

At the sixth calculation phase, the multiplicand is added for a third time to the complementary number obtained as the result of the third transfer, and a denomination row shift is controlled. The control is like the one that followed the third calculation phase, for the digit contained in the fifth denomination row is greater than 4. The succeeding transfer is therefore negative, so that the intermediate result (considered in the B group), which is reversed for the second time, is once more defined by its direct value. At the same time, a zero is introduced into the first denomination row by contacts 1r6p* and 2r6p* (FIG. 40). This result (63000) is equal to the product of the multiplicand (900) by 70 (=100—30). The following calculation and transfer phases are positive, up to the eighth transfer. At that time an 8 appears in the sixth denomination row. The digit in the fifth denomination row belongs to the result and not to the multiplier, and should not have any effect on the further operations. This is managed by means of the tabulator, which indicates that the last digit of the multiplier has been reached and introduces a fixed control to put an end to the multiplication.

The ninth calculation phase is positive and brings on the result of the multiplication, preceded by a 9 in the sixth denomination row. The subsequent operations are aimed at replacing this 9 by a zero. They are composed of a transfer with a reversal, followed by a positive calculation phase without addition of a 1 in the sixth denomination row, and then by a new negative transfer and a positive calculation phase with the addition of a 1 in the sixth denomination row.

In the other three examples, the first two elementary operations are identical to those of the first example and have the purpose of getting a 9 before the multiplier.

*Example No. 2.*—The value of the multiplier is 77 and the multiplication will take place on the scheme 100—20—3=77. The first four elementary operations are like those of the first example. After the fourth transfer, the sixth denomination row contains an 8 and the fifth place a 2 (<5). This last digit means that a conversion to the complement will not take place for those operations that will be ordered when this digit has been transferred to the sixth denomination row. Hence, it is not necessary to perform a supplementary addition or subtraction before ordering the denomination row shift. The appearance of an 8 in the sixth denomination row, followed by a number less than 5, therefore controls a negative direction of the current for the succeeding calculation phase. After this calculation phase, the digit of the fifth denomination row being less than 5, the transfer is made without inversion for all the denomination rows except the sixth.

The sixth calculation phase is positive, as is the sixth transfer, and after the latter an 8 appears in the sixth denomination row. The appearance of this 8, which is the last digit of the multiplier, as the tabulator indicates, evokes a series of fixed-control elementary operations whose function it is to bring the multiplication to a close. These elementary operations are composed of two calculation phases and two transfer phases, all positive, so that after the eighth transfer the result of the multiplication is defined by its complement and is preceded by a zero. The ninth calculation phase is positive, without addition of a 1 in the sixth denomination row; it is followed by a negative transfer and then by a positive calculation phase with addition of a 1 in the sixth row, so that the result of the multiplication is obtained and can be indicated by the read-out mechanism.

*Example No. 3.*—The first two elementary operations are always the same. The value of the multiplier is 200 and after the second transfer the sixth row has a nine and the fifth place a digit less than 5. This signifies that a decimal shift is required to bring into the sixth denomination row the digit set up in the fifth row, but that this denomination row shift must not be preceded by an addition. A nine in the sixth denomination row, followed by a digit less than 5, controls a positive calculation phase followed by a transfer as a complement. After these two phases, that is, after the third transfer, for the example being considered, the nine of the sixth denomination row is followed by a digit greater than 4; this controls a calculation phase with negative current, as has already been seen in the preceding examples. After the fourth calculation phase, the number defined corresponds to the complement of the number defined after the second transfer. The following operations take place in a similar way to the operations already described. After the eight calculation phase, the last denomination row shift takes place, and since the digit (9) in the fifth denomination row is greater than 4, the transfer phase is effected with a current of negative direction. After this transfer phase there is a nine in the sixth denomination row at the same time that the tabulator shows that the last row of the multiplier has been reached. These two indications, coupled with the fact that the number set up in places 1 to 5 is defined by its direct value, signify that the last digit of the multiplier is a zero. The result of the multiplication is thus already defined in the B group by its direct value after this eighth transfer, and the purpose of the subsequent operations is to set it up in the contacts of the R group while introducing a zero in the sixth denomination row. Since each calculation phase necessarily is accompanied by an addition, the result after the ninth calculation phase has one addition too many, so that a conversion to the complement followed by two successive additions is required. A 1 is not added to the sixth row during the second of these additions, so that all that is necessary thereafter to get the result of the multiplication into the R group and enable the indicator to operate is to perform a conversion to the complement followed by a normal addition.

*Example No. 4.*—The different controls depending on the numbers that occur up to the eighth transfer have already been seen in the preceding examples and do not require special explanation. After the eighth calculation phase, the last denomination row shift occurs and, since the digit (9) in the fifth denomination row is greater than 4, the transfer stage is performed with an inversion. After this transfer phase, there is a nine in the sixth denomination row at the same time that the tabulator shows that the last denomination row of the multiplier has been reached. These two indications, coupled with the fact that the number set up in rows 1 to 5 is defined by its complement, signify that the last digit of the multiplier is a nine and that a subtraction still has to be made. The fixed control therefore comprises a positive calculation phase, so that the result of the multiplication is obtained as a complement. To obtain the direct value of the result and put a zero in the sixth denomination row, it is now necessary merely to perform a positive transfer, and then a positive calculation phase without the addition of a 1 in the sixth row, followed by a negative transfer and a last positive calculation phase. The read-out mechanism can then be made operative.

Summing up, the control mechanism for multiplication is designed to perform multiplications in three successive stages. The first and the third stages depend on a series of fixed controls, while the second stage depends on the number that constitutes the multiplier. This second stage is effected with the help of relays whose contacts are so connected as to control successive additions of the multiplicand to the number set up in the B group while adding a 1 each time in the multiplier's last denomination row to the left. Some of these relays are sensitive to the appearance of an 8 or a 9 in the multiplier's last row to the left in the B group, as well as to a digit less than 5 or greater than 4 in the next to the last row to the left (fifth row) so that they react as follows:

(a) When the last denomination row contains an 8 and the next to the last row a digit at least equal to 5, the mechanism controls, for the succeeding calculation phase, an addition of the multiplicand and the addition of a 1 in the said last row, without change of order, (b) When the last denomination row contains an 8 and the next to the last row a digit smaller than 5, the mechanism controls, for the succeeding calculation phase, an addition of the multiplicand with a shift of one denomination row to the left, (c) When the last denomination row contains a 9 and the next to the last row a digit at least equal to 5, the mechanism controls, for the succeeding calculation phase, an addition of the multiplicand with a shift of one denomination row to the left.

(d) When the last denomination row contains a 9 and the next to the last row a number smaller than 5, the mechanism controls an addition of the multiplicand during the succeeding calculation phase, without a denomination row shift, followed by the conversion of the number obtained into its nine's complement during the succeeding transfer phase.

Other relays are sensitive to digits at least equal to 5 and less than 5 in the next to the last row of the multiplier to the left in the R group, as well as to the denomination row shift control, so that they control a transfer as complement of all the denomination rows with the exception of the last one to the left when the contacts of the R group, which define a digit at least equal to 5 and determine a denomination row shift, are closed. These relays control a direct transfer, when the said digit is at least equal to 5 but no denomination row shift takes place. This transfer always occurs in direct fashion when the said digit is less than 5.

The third stage, which makes it possible to bring the multiplication to a close, is composed of a series of fixed-control operations, but this series varies according to the numbers set up in the B group at the moment that it begins. The control mechanism comprises relays that are sensitive to the appearance of an 8 or a 9 in the last denomination row to the left, and are designed to act differently according to whether the intermediate multiplication result is defined by its direct or its complementary value. Because of these relays, the third stage can be effected in four different ways:

(a) When the intermediate product is defined directly and the digit 8 appears in the last row of the multiplier, the mechanism controls an addition of the multiplicand, then a transfer as complement, then three final phases followed by the read-out, these three phases consisting of a supplementary addition without addition of a 1 in the last denomination row, and then a transfer as complement and finally a new addition accompanied by an addition of 1 in the last denomination row to the left, (b) When the intermediate product is defined by its nine's complement and the digit 8 appears in the last row of the multiplier, the mechanism controls an addition of the multiplicand, then a direct transfer followed by a new addition and a direct transfer, then the three final phases followed by the read-out, (c) When the intermediate product is defined directly and the digit 9 appears in the last row of the multiplier, the mechanism controls an addition of the multiplicand, then a transfer as complement followed by a new addition and a direct transfer, then the three final phases followed by the read-out, (d) When the intermediate product is defined by its complement and the digit 9 appears in the last row of the multiplier, the mechanism controls an addition of the multiplicand, then a direct transfer followed by the three final phases and the read-out.

*Detailed operation for multiplication*

The detailed course of multiplication is described below for the first multiplication example, with reference to FIGS. 42 and 43.

In the last transfer phase of the initial operation, the current goes through windings 3B$a$, 3B1$p$, 1B2$p$, 3B5$p$. 3B5$a$ causes the closure of contact $ba$ (FIG. 34) and hence the engagement of the universal tabulator. 3B1$p$ closes contact $b1p$* (FIG. 38) which is provided for the addition of 1 in the sixth denomination row. 1B2$p$ closes $b2p$ and allows the multiplication to get under way, while 3B5$p$ closes contacts 1$b$5$p$* and 2$b$5$p$*.

Contacts 1$b$5$p$ and 1$b$5$p$* makes sure that windings R6$p$ and R7$p$, respectively, are energized; the latter control contacts 1$r$6$p$, 2$r$6$p$, 1$r$6$p$*, 2$r$6$p$*, 1$r$7$p$, 2$r$7$p$, 1$r$7$p$* and 2$r$7$p$* (FIG. 39) to cause a zero or a 9 to be introduced into the last denomination row to the right upon a denomination row shift. Contacts 2$b$5$p$ and 2$b$5$p$* control the passage of the current through the two windings 1R5$p$ and 2R5$p$, respectively (FIG. 42), of a relay bearing contacts 1$r$5$p$, 1$r$5$p$* and 2$r$5$p$, 2$r$5$p$* (FIG. 43). Contacts 2$r$5$p$ and 2$r$5$p$* are connected to the right of line $y$ and become operative at the end of the operation, while contacts 1$r$5$p$ and 1$r$5$p$* insure that windings 1B5$p$ and 2B5$p$ are energized. These last windings are connected between the B circuit and the control circuit of FIG. 43, so that they are sensitive to reversals of current during the transfer phases, while windings 1R5$p$ and 2R5$p$ are located between the impulse generator and the control circuit of FIG. 42, so as to be insensitive to current reversals during the calculation phases.

As in the initial operation, winding 3B5$p$ is energized, contacts 1$b$5$p$* and 2$b$5$p$* are closed, while the keyboard value is defined by its complement. At the time of a transfer with the current in the negative direction, contacts 1$b$5$p$* and 2$b$5$p$* remain open, while contacts 1$b$5$p$ and 2$b$5$p$ close. These contacts close at each transfer phase thereafter and cause the closure of contacts 1$r$5$p$ and 2$r$5$p$ at each calculation phase, until a new transfer with negative current takes place.

Thus, when the intermediate result in the course of a multiplication is defined directly, contacts 1$b$5$p$, 2$b$5$p$ and 1$r$5$p$, 2$r$5$p$ are closed alternately, whereas when this result is defined by its complement, contact 1$b$5$p$*, 2$b$5$p$* and 1$r$5$p$*, 2$r$5$p$* close alternately. As windings R6$p$ and R7$p$ are energized by contacts 1$b$5$p$ and 1$b$5$p$* respectively, we thus have a zero introduced in the last denomination row to the right when the intermediate result is defined by its direct value, and a nine introduced when it is defined by its complement.

In the first calculation phase, the current goes positively through the calculation circuit, with addition of a one in the sixth denomination row, via 2$b$5$p$*, 2R5$p$, $b2p$ 1R2$p$, 1$b$5$p$*, R7$p$, R1$p$. Contacts 1$r$5$p$*, 2$r$5$p$*, $r2p$ (FIG. 43), 1$r$7$p$, 2$r$7$p$ (FIG. 39) are closed. In the universal tabulator, through which the current passes at the same time, contact $ra$ is closed as a result of the excitation of winding R$a$.

During the first transfer phase, the current goes negatively through the transfer circuit, passing through 1B1$p$, $r2p$, 2B2$p$, 2B5$p$, 1$r$5$p$*. Contacts $b2p$*, 1$b$5$p$ are closed, along with $ba$, 1$bt$ and 2$bt$ of the tabulator, because of windings 1B$a$ and 1B$t$.

In the second calculation phase, the current is positive in the calculation circuit, but does not cause the supplementary addition of a 1 in the sixth denomination row, for it is contact $b1p$ that is closed; the current passes through 2$b$5$p$, 1R5$p$, $b2p$*, 2R2$p$, 1$b$5$p$, R6$p$, R1$p$. Contacts 1$r$5$p$, 2$r$5$p$, $r2p$* (FIG. 43), 1$r$6$p$, 2$r$6$p$, 1$r$1$p$, 2$r$1$p$ (FIG. 39) are closed, together with contact $ra$ of the tabulator (FIG. 35) by the action of winding R$a$.

In the second transfer the current is positive and passes by way of 2B1$p$, B3$p$, $r2p$*, 1$r$5$p$, 1B5$p$. It closes contacts $b1p$*, $b3p$, 1$b$5$p$, 2$b$5$p$ as well as contact 1$bt$ and 2$bt$ of the tabulator as a result of the action of winding 1B$t$, as well as $ba$ by way of winding 1B$a$.

From the third calculation phase on, the control depending on the numbers becomes operative.

In the third calculation phase the current is negative in the calculation circuit (FIGS. 19, 38) and in the tabulator (FIG. 34), where it crosses $ba$; it then goes via 2$b$5$p$, 1R5$p$, 1R3$p$, $b3p$, 3$b$06* (for the digit nine is in the sixth denomination row), 3$bu$5* (for the digit in the fifth place is greater than 5), 2$bt$, passes positively through the calculation circuit and then negatively across R1$p$, R6$p$ via 1$b$5$p$. Contacts 1$r$5$p$, 2$r$5$p$, $r3p$, 1$r$6$p$*, 2$r$6$p$*, 1$r$1$p$*, 2$r$1$p$* are closed, together with contact $ra$* of the tabulator because of the passage of the current in the negative direction in winding R$a$.

In the third transfer phase, the current passes across 2B1$p$, B3$p$, $r3p$, 2$rv$5*, goes negatively through the transfer circuit (FIG. 39), crosses 1B5$p$ negatively via 1$r$5$p$, and 2B$a$ and 1B$t$ of the tabulator positively via $ra$* (FIG. 35). In the calculation circuit, the current goes negatively through denomination rows 1 to 5 and positively through decimal place 6, as contacts 1$r$1$p$*, 2$r$1$p$* are closed.

Moreover, as a result of the closure of contacts 1$r$6$p$*, 2$r$6$p$* (negative direction of current, FIG. 39), the digit 9 is introduced into the first denomination row. Contacts $b1p$*, $b3p$, $b3$–, 1$b$5$p$*, 2$b$5$p$* as well as $ba$*, 1$bt$ and 2$bt$ in the tabulator are closed.

In the fourth calculation phase, the current passes via 2$b$5$p$, 2R5$p$, 1R3$p$, $b3p$, 3$b$26* (for the digit 7 is set up in the sixth denomination row) and goes positively through the calculation circuit via 1$b$5$p$*, R7$p$ and R1$p$. A 1 is added in the sixth row, for $b1p$* (FIG. 38) is closed. Winding R$b$ is passed through positively in the tabulator (FIG. 34) because of the closure of $ba$*. Contacts 1$r$5$p$*, 2$r$5$p$*, $r3p$, 1$r$7$p$, 2$r$7$p$, 1$r$1$p$, 2$r$1$p$ as well as $rb$ in the tabulator (FIG. 35) are closed.

In the fourth transfer, the current crosses 2B1$p$, B3$p$, $r3p$, 2$rv$5 (for the fifth denomination row has a digit greater than 5) and passes positively via 1$r$5$p$* through 2B5$p$ and the transfer circuit (FIG. 39) by closed contacts 1$r$7$p$, 2$r$7$p$ and 1$r$1$p$, 2$r$1$p$ as well as by contact $rb$ via 2B$a$ and 1B$t$ in the tabulator (FIG. 35). Contacts $b1p$*, $b3p$, 1$b$5$p$*, 2$b$5$p$* and contacts $ba$*, 1$bt$ and 2$bt$ of the tabulator are closed.

In the fifth calculation phase, the current passes via 2$b$5$p$*, 2R5$p$, 1R3$p$, $b3p$, 3$b$16* (for the sixth denomination row has the digit 8), 3$bu$5* (for the fifth row has a digit greater than 5), and goes positively through the calculation circuit via 1$b$5$p$*, R7$p$ and R1$p$. A 1 is added to the sixth row because $b1p$* is closed. In the tabulator, winding R$b$ is passed through positively by reason of the closure of $ba$*. Contacts 1$r$5$p$*, 2$r$5$p$*, $r3p$, 1$r$7$p$, 2$r$7$p$, 1$r$1$p$, 2$r$1$p$ and, in the tabulator, $rb$ are closed.

The fifth transfer phase resembles the fourth exactly.

In the sixth calculation phase, the current goes via 2$brp$*, 2R5$p$, 1R3$p$, $b3p$, 3$b$06* (for the sixth row contains the digit 9), 3$bu$5* (for the fifth row has a digit greater than 5), 2$bt$, then negatively through the calculation circuit and R1$p$, R7$p$ via 1$b$5$p$*, contact $b1p$* being closed (addition of a 1 in the sixth denomination row)

and negatively through R$b$ of the tabulator via $ba^*$. Contacts 1$r$5$p^*$, 2$r$5$p^*$, $r$3$p$, 1$r$7$p^*$, 2$r$7$p^*$, 1$r$1$p^*$, 2$r$1$p^*$ and, in the tabulator, $rb^*$ are closed.

During the sixth transfer, the current passes via 2B1$p$, B3$p$, $r$3$p$, 2$rv$5$^*$ (for the digit in the fifth denomination row is greater than 5) and goes negatively through the transfer circuit, as well as 2B5$p$ via 1$r$5$p^*$, then through the windings 2B$b$ and 2B$t$ of the tabulator, too, by way of $rb^*$, along with switch $t$3 which is closed, by assumption (the corresponding key of the tabulator is depressed). In the calculation circuit, the current passes positively through the sixth denomination row, since contacts 1$r$1$p^*$ and 2$r$1$p^*$ are closed. At the same time a 0 is introduced into the first denomination row, since switches 1$r$7$p^*$ and 2$r$7$p^*$ are closed (negative current direction in denomination rows 1 to 5). Contacts $b$1$p^*$, $b$3$p$, 1$b$5$p$, 2$b$5$p$ as well as $bb^*$, $b$1$t^*$, 2$bt^*$ of the tabulator are closed.

By reason of the closure of contact 2$bt^*$ of the tabulator instead of 2$bt$, which means that the last denomination row of the multiplier has been reached, the current passes via contacts 4$b$16$^*$ and 4$b$06$^*$, respectively, instead of contacts 3$b$16$^*$ and 3$b$06$^*$, once the digit of the sixth denomination row is equal to 8 or 9. This new current path causes the excitation of 1R8$p$ and 2R8$p$, respectively, which engages a fixed control to perform the necessary corrections and then order the read-out operation.

The seventh and eighth elementary operations make it possible to complete the work of the multiplier in conformity with the general multiplication pattern:

In the seventh calculation phase, the current passes across 2$b$5$p$, 1R5$p$, 1R3$p$, $b$3$p$, 3$b$16 (for the digit 6 is in the sixth denomination row), then across 1$b$5$p$ positively through R6$p$ and R1$p$ and the calculation circuit. In the tabulator, the current passes positively in windings R$d$ and R$t$. Contacts 1$r$5$p$, 2$r$5$p$, $r$3$p$, 1$r$6$p$, 2$r$6$p$, 1$r$1$p$, 2$r$1$p$, $rt$, and $rd$ (tabulator) are closed.

In the seventh transfer phase, the current goes via 2B1$p$, B3$p$, $r$3$p$, 2$rv$5. Contacts 2$rv$5 are closed, since the fifth denomination row has a number greater than 5. However, contacts 2$rv$5 have no very well defined task, for when the digit is smaller than 5 (contact 2$ru$5), the series of connections leads to the same result. This is normal, as the digit 6 of the fifth denomination row no longer belongs to the multiplier, but to the product of the multiplication, and hence should have no effect on the operations. A control function depending on digits less or greater than 5 in the fifth row can only be made through contacts 2$ru$5$^*$ and 2$rv$5$^*$, but these last contacts can no longer close, for, at the tabulator's last step (after the sixth transfer in our example), no more denomination row shifts are controlled. After passing across 2$rv$5, the current goes positively through 1B5$p$ via 1$r$5$p$, as well as the transfer circuit (FIG. 39) by way of closed contacts 1$r$1$p$, 2$r$1$p$, and 1$r$6$p$, 2$r$6$p$ and via 2B$b$ and 2B$t$ in the tabulators across $rd$. Contacts $b$1$p^*$, $b$3$p$, 1$b$5$p$, 2$b$5$p$ and contacts $bb^*$ and 2$bt^*$ of the tabulator are closed.

The eighth calculation phase is similar to the seventh, with this difference, that the current goes via 3$b$26 instead of 3$b$16, since the sixth denomination row contains the digit 7 instead of the digit 6. The two contacts connect the input conductors $ge$, $ga$ of circuit R in a similar way.

The eighth transfer is exactly like the seventh.

At the ninth calculation phase, the current first passes, as it has up to now, across 2$b$5$p$ and 1R5$p$. The route via 1R3$p$, $b$3$p$ is broken even though 3$b$16 is closed (the number 8 occurring in the sixth denomination row), for 2$bt$, by which the current coming from 3$b$16$^*$ and 3$b$06$^*$ would have been connected to input conductors $ge$ and $ga$ or circuit R, is open. On the other hand, the current can pass by way of 2$bt^*$ and 4$b$16$^*$, then 1R8$p$ and positively through 1$b$5$p$ to R6$p$, R1$p$, and circuit R. A 1 is added in the sixth denomination row because of the closure of contact $b$1$p^*$. In the tabulator, windings R$d$ and R$t$ are passed through positively because of $bb^*$. Contacts 1$r$5$p$, 2$r$5$p$, $r$8$p$, 1$r$6$p$, 2$r$6$p$, 1$r$1$p$, 2$r$1$p$, $rd$, $rt$ are closed.

In the ninth transfer, the route via $r$3$p$ is broken, because $r$3$p$ is open. The current then passes through 1B1$p$, 2B4$p$, $rt$, $r$8$p$, 2$r$5$p$, passes negatively through the B circuit and 1B5$p$ via 1$r$5$p$ to emerge finally at 3B$t$. In circuit B (FIG. 39), contacts 1$r$1$p$, 2$r$1$p$, 1$r$6$p$ and 2$r$6$p$ are closed and the current goes through windings 2B$b$ and 2B$t$ of the tabulator via $rd$. Contacts $b$1$p$, $b$4$p^*$, 1$b$5$p^*$, 2$b$5$p^*$ are closed, while contacts 1$bt^*$, 2$bt^*$ and 1$bt$, 2$bt$ are open, since windings 2B$t$ and 3B$t$ are passed through at the same time in opposite directions, so that their action is zero.

In the tenth calculation phase, the current goes across 2$b$5$p^*$, 2R5$p$, $b$4$p^*$, 2R9$p$ and passes positively through R7$p$ and R1$p$ via 1$b$5$p^*$ along with the calculation circuit. There is no addition of 1 in the sixth denomination row, for $b$1$p$ is closed. Windings R$d$ and R$t$ of the tabulator are gone through because of the closure of $bb^*$. Contacts 1$r$5$p^*$, $r$9$p^*$, 1$r$7$p$, 2$r$7$p$, 1$r$1$p$, 2$r$1$p$, $rd$, $rt$ are closed.

During the tenth transfer, the current passes via 2B1$p$, $r$9$p^*$, B6$p$, goes negatively through the B circuit and 2B5$p$ by $r$5$p^*$ and then 3B$t$. At the same time, a beginning is made in preparing to break off calculation operations for the succeeding calculation phase, together with preparing for the read-out operation. These preparations are made by means of a control group schematically indicated as A$z$, which will not be described in detail. The current passes to 2B$b$ and 2B$t$ of the tabulator by $rd$. Contacts $b$1$p^*$, $b$6$p$, 1$b$5$p$, 2$b$5$p$ and $bb$ are closed, while 1$bt$, 2$bt$ and 1$bt^*$, 2$bt^*$ remain open, because windings 2B$t$ and 3B$t$ are traversed in opposite directions.

In the eleventh calculation phase, while the read-out operation takes place at the same time, the current passes via 2$b$5$p$, 1R5$p$, $b$6$p$, 1$b$5$p$, R6$p$, R1$p$ and then positively in the calculation circuit.

Since $b$1$p^*$ (FIG. 38) is closed, a 1 is added in the sixth denomination row. The eleventh calculation phase is the last operation of the multiplication and the result of the multiplication is indicated in the read-out mechanism, beginning with the next to the last denomination row to the left.

For the other three examples, only those calculation and transfer phases will be given in detail whose control is different from the controls described for the first example.

In the second example, we start by giving the positions of the contacts at the end of the second transfer phase, which are exactly like positions of the contacts at the end of the second transfer phase in the first example, because of the fixed control: contacts $b$1$p^*$, $b$3$p$, 1$b$5$p$, 2$b$5$p$, 1$bt$ (FIG. 40) (not used for multiplication), 2$bt$ and $ba$ (FIG. 34) are closed.

In the third calculation phase, the current passes via 2$b$5$p$, 1R5$p$, 1R3$p$, $b$3$p$, 3$b$06$^*$ (since the digit 9 is set up in the sixth denomination row), 3$bu$5 (since the fifth denomination row has the digit 2) and goes positively through the R calculation circuit, passing through windings R4$p$, 2R3$p$ (control windings for denomination row shifts solely) by 2$bt$, 1$b$5$p$, R6$p$ and R1$p$. In the tabulator, winding R$a$ is gone through positively because of the closure of $ba$. Contacts 1$r$5$p$, 2$r$5$p$, $r$4$p$, 1$r$6$p$, 2$r$6$p$, 1$r$1$p$, 2$r$1$p$ are closed, as is $ra$ in the tabulator. Contact $r$3$p$ is not closed, for windings 1R3$p$ and 2R3$p$ are gone through simultaneously in opposite directions.

At the third transfer phase, the current passes via 2B1$p$, B3$p$, $r$4$p$, then in a negative direction in the B circuit and 1B5$p$, 1$r$5$p$. In the tabulator, 1B$a$ and 1B$t$ are energized because of the closure of $ra$. Contacts $b$1$p^*$, $b$3$p^*$, 1$b$5$p^*$, 2$b$5$p^*$, 1$bt$, 2$bt$ are closed, as is $ba$ in FIG. 35.

In the fourth calculation phase the current passes across 2$b$5$p^*$, 2R5$p$, 1R3$p$, $b$3$p$, 3$b$06$^*$ (for the digit 9 is in the sixth denomination row), 3$bu$5$^*$ (for the fifth row has the digit 7, greater than 4), 2$bt$, then negatively through the calculation circuit and R1*p*, R7*p*, 1*b*5*p**. In the tabulator, R*a* is passed through positively because of the closure of *ba*. Contacts 1*r*5*p**, 2*r*5*p**, *r*3*p*, 1*r*7*p**, 2*r*7*p**, 1*r*1*p**, 2*r*1*p** are closed, as is *ra** in the tabulator.

During the fourth transfer, the current goes through 2B1*p*, B3*p*, *r*3*p*, 2*rv*5* and then negatively in the transfer circuit and then 2B5*p* and 1*r*5*p**. Since 1*r*1*p** and 2*r*1*p** are closed (FIG. 39), the sixth denomination row is passed through positively, and since 1*r*7*p**, 2*r*7*p** are closed, the digit 0 is introduced into the first denomination row. Windings 2B*a* and 1B*t* of the tabulator are energized because of the closure of *ra**. Contacts *b*1*p**, *b*3*p*, 1*b*5*p*, 2*b*5*p*, 1*bt*, 2*bt* are closed, as is *ba** of FIG. 35.

Thus, the denomination row shift is completed and the rest of the calculation goes on in a way similar to that indicated in the first example, up to the sixth transfer phase.

After the sixth transfer phase, the digit 8 appears in the sixth denomination row and contact 2*bt**, controlled by the tabulator, is closed, while 2*bt* is open, for the last row of the multiplier has been reached.

In the seventh calculation phase, the current passes by way of 2*b*5*p**, 2R5*p*, 2*bt**, 4*b*16*, 1R8*p*, then positively in the R circuit via 1*b*5*p**, R7*p*, R1*p*. Contacts 1*r*5*p**, 2*r*5*p**, *r*8*p*, 1*r*7*p*, 2*r*7*p*, 1*r*1*p*, 2*r*1*p* are closed. Since no further denomination row shifts occur during the succeeding calculation phases, contacts *rd* (FIG. 35) and *rt* (FIG. 43) of the tabulator are close and contact *bb** is closed during the transfer phases. Because of the operation of 3B*t*, contacts 1*bt** and 2*bt** stay open.

In the seventh transfer phase, the current passes by way of contacts *rt*, *r*8*p*, 2*r*5*p** and windings 2B1*p*, 1B4*p*, then positively in the transfer circuit through 1*r*5*p**, 2B5*p* and finally 3B*t*. Contacts *b*1*p**, *b*4*p*, 1*b*5*p**, 2*b*5*p** are closed, while 2*bt** is open by reason of the excitation of 3B*t*.

In the eighth calculation phase, the current passes by way of 2*b*5*p**, 2R5*p*, *b*4*p*, 1R9*p*, then positively in the R circuit by way of 1*b*5*p**, R7*p*, R1*p*. Contacts 1*r*5*p**, 2*r*5*p**, *r*9*p*, 1*r*7*p*, 2*r*7*p*, 1*r*1*p*, 2*r*1*p* are closed.

During the eighth transfer, the current passes by way of 1B1*p*, 2B4*p*, *r*9*p*, then positively in the B circuit by way of 1*r*5*p**, 2B5*p* and finally 3 B*t*. Contacts *b*1*p*, *b*4*p**, 1*b*5*p**, 2*b*5*p** are closed.

In the ninth calculation phase, the current passes by way of 2*b*5*p**, 2R5*p*, *b*4*p**, 2R9*p* then positively in the R circuit via 1*b*5*p**, R7*p*, R1*p*. Contacts 1*r*5*p**, 2*r*5*p**, *r*9*p**, 1*r*7*p*, 2*r*7*p*, 1*r*1*p*, 2*r*1*p* are closed. During this phase the digit 1 is not added to the sixth denomination row, because *b*1*p* is closed.

In the ninth transfer phase, the current passes by way of 2B1*p*, *r*9*p**, A*z*, B6*p*, then negatively in the B circuit, then via 2B5*p*, 1*r*5*p**, and finally 3B*t*. Contacts *b*1*p**, *b*6*p*, 1*b*5*p*, 2*b*5*p* are closed and the read-out is prepared by A*z* and will take place in the tenth calculation phase.

In the tenth calculation phase, the current passes by way of 2*b*5*p*, 1R5*p*, *b*6*p*, then positively through the R circuit via 1*b*5*p**, R6*p*, R1*p*. The calculation comes to an end with this phase, and the read-out operation is started.

In the third example, the third stage of the multiplication begins as soon as the tabulator has reached its last position. For, the last digit of the multiplier is a zero and it is its complement, namely 9, that appears in the sixth denomination row, while the intermediate result is defined by its direct value. The third stage thus commences with the ninth calculation phase.

In the ninth calculation phase, the current passes by way of 2*b*5*p*, 1R5*p*, 2*bt**, 4*b*06*, 2R8*p*, then goes positively through circuit R passing across 1*b*5*p*, R6*p*, R1*p*. Contacts 1*r*5*p*, 2*r*5*p*, *r*8*p*, 1*r*6*p*, 2*r*6*p*, 1*r*1*p*, 2*r*1*p* are closed.

In the ninth transfer phase, the current goes through 2B1*p*, 1B4*p*, *rt*, *r*8*p**, 2*r*5*p*, then negatively through the B circuit and finally 1*r*5*p*, 1B5*p*, and 3B*t*. Contacts *b*1*p**, *b*4*p*, 1*b*5*p**, 2*b*5*p** are closed.

In the tenth calculation phase, the current goes through 2*b*5*p**, 2R5*p*, *b*4*p*, 1R9*p*, then positively through the R circuit via 1*b*5*p**, R7*p*, R1*p*. Contacts 1*r*5*p**, 2*r*5*p**, *r*9*p*, 1*r*7*p*, 2*r*7*p*, 1*r*1*p*, 2*r*1*p* are closed.

In the tenth transfer, the current goes through 1B1*p*, 2B4*p*, *r*9*p*, then positively through the R circuit via 1*r*5*p**, 2B5*p* and finally 3B*t*. Contacts *b*1*p*, *b*4*p**, 1*b*5*p**, 2*b*5*p** are closed.

In the eleventh calculation phase, the current goes through 2*b*5*p**, 2R5*p*, *b*4*p**, 2R9*p*, then positively through the R circuit via 2*b*5*p**, R7*p*, R1*p*. Contacts 1*r*5*p**, 2*r*5*p**, *r*9*p**, 1*r*7*p*, 2*r*7*p*, 1*r*1*p*, 2*r*1*p* are closed. No. 1 is added in the sixth denomination row since *b*1*p* is closed.

During the eleventh transfer, the current passes through 2B1*p*, *r*9*p**, A*z*, B6*p*, then negatively in the B circuit and by way of 1*r*5*p**, 2B5*p* and 3B*t*. Contacts 2*b*1*p**, *b*6*p*, 1*b*5*p*, 2*b*5*p* are closed and the read-out is prepared by A*z*.

In the twelfth calculation phase, the current goes through 2*b*5*p*, R5*p*, *b*6*p*, then positively through the R circuit via 1*b*5*p**, R7*p*, R1*p*. The read-out is then effected.

In the fourth example, the third stage of the multiplication commences as soon as the tabulator has reached its last position, as in the third example. In this case, the last digit of the multiplier is a 9. At the time of the last denomination row shift, this 9 occupies the sixth denomination now while the intermediate result (places 1 to 5) is defined by its complement. The third stage commences with the ninth calculation phase.

In the ninth calculation phase, the current passes by way of 2*b*5*p**, 2R5*p*, 2*bt**, 4*b*06*, 2R8*p*, then positively in the R circuit via 1*b*5*p**, R7*p*, R1*p*. Contacts 1*r*5*p**, 2*r*5*p**, *r*8*p**, 1*r*7*p*, 2*r*7*p*, 1*r*1*p*, 2*r*1*p* are closed.

During the ninth transfer, the current passes by way of 1B1*p*, 2B4*p*, *rt*, *r*8*p**, 2*r*5*p**, then positively in the B circuit via 1*r*5*p**, 2B5*p* and finally 3B*t*. Contacts *b*1*p*, *b*4*p**, 1*b*5*, 2*b*5*p** are closed.

In the tenth calculation phase, the current passes by way of 2*b*5*p**, 2R5*p*, *b*4*p**, 2R9*p*, then positively in the R circuit via 1*b*5*p**, R7*p*, R1*p*. Contacts 1*r*5*p**, 2*r*5*p**, *r*9*p**, 1*r*7*p*, 2*r*7*p*, 1*r*1*p*, 2*r*1*p* are closed. No. 1 is added in the sixth denomination row, since *b*1*p* is closed.

In the tenth transfer, the current goes through 2B1*p*, *r*9*p**, A*z*, B6*p*, then negatively through the B circuit and via 1*r*5*p**, 2B5*p* and 3B*t*. Contacts *b*1*p**, *b*6*p*, 1*b*5*p*, 2*b*5*p* are closed and the read-out is prepared by A*z*.

In the eleventh calculation phase, the current passes by way of 2*b*5*p*, 1R5*p*, *b*6*p*, then positively in the R circuit via 1*b*5*p*, R6*p*, R1*p*. The readout is then effected.

*Description of the machine as a whole*

FIGURES 45, 46, 47 and 48 give a very schematic total representation of the various parts of the calculating machine that have been described hereinbefore.

FIG. 45 shows the various parts connected between the transfer circuit BM*a*—R*ko* and the impulse output BM of the impulse generator.

FIG. 46 also represents the parts located between the calculation circuit RM*a*—BK*o*—AK*o* and the impulse generator output for the RM impulses.

FIGS. 47 and 48 represent the connections between the polarization windings BP*o* and RP*o*, respectively, and the corresponding output conductors of the impulse generator.

In FIG. 45, 1B, 2B . . . 9B, 10B have been used to denote the parts of the control mechanisms that affect the direction of the current during the transfer phases, while in FIG. 46 1R, 2R . . . 9R, 10R represent the parts of the control mechanisms that affect the direction of the current during the calculation phases. In the diagrams of FIGS. 45 and 46, no connection has been shown as linking parts 1B and 1R, 2B and 2R, . . . 10B and 10R, respectively, but it is clear that these parts function alternately, contacts of one part being controlled by windings of the other part and vice versa, as has already been seen for the division and multiplication control mechanisms, as well as for the fixed controls (FIGS. 28 to 31). Parts 2B to 10B (FIG. 45) are each controlled by an operation key, and part 1B, which is a fixed control to perform the initial operation, is controlled by all these keys.

Control parts 1B, 1R to 8B, 8R are all fixed controls, part 9B, 9R constitutes the division control shown in FIGS. 40 and 41 and part 10B, 10R the multiplication control shown in FIGS. 42 and 43.

In FIGS. 45 to 48, the connections in unbroken lines are those that transmit the impulses RM, BM, RP or BP. To make the diagrams clearer, the connections provided for direct current have been shown as broken lines.

The operation keys are the following: the first at the top is marked "+" and is provided for addition. The second, bearing the sign ":", controls the introduction of the dividend. The third bears the marking "0" and controls the setting of the indicating mechanism at zero. The fourth key controls subtraction. The fifth and sixth keys are marked "←" and "→" and control denomination row shifts to the left and to the right, respectively. The seventh key, marked "×," controls the positioning of the multiplier. The eighth key has the marking ":=" and controls division, while the ninth key has the marking "×=" and controls multiplication.

When the machine is at rest, but energized, the motor is stopped, so that the generator does not deliver any impulse. By depressing any of the operation keys, the direct feeding current is sent through two relays designated as Rel. Mo and Rel. I, respectively, the first of which controls the starting of the motor, while the other closes contacts 1i, 2i, 3i and 4i to feed the collectors of the impulse generator. The first BM impulse that is delivered by the generator is then sent through 1B because of the depressed key, and the corresponding initial operation begins. As has already been described, the initial operation has a strong impulse RP in one half of the polarization windings, which is followed by a transfer phase with positive or negative current, or with a shunt of impulse BM through windings 3B0, so as to introduce the number zero into the B group, according to the three cases a, b, and c defined hereinbefore. The number introduced into the B group is maintained there by means of a prolonged polarization impulse, while a first mechanical phase makes it possible to introduce the keyboard value into the A group.

This first mechanical operation is controlled by the control mechanism of the initial operation, which sends a direct current through a group of relays ReT (FIG. 45). It will be noted that group ReT is connected to parts 1B to 10B, as well as to parts 1R to 10R of FIG. 46, by direct current connections. Terminal xk in FIG. 46 is connected to line xk of FIG. 45. This ReT group of relays clutch K and provides automatic disengagement after a half-turn, to actuate the mechanical portion. This group also contains relays Q and W. At the time of the first mechanical phase, relay Q is energized to cause the closure of two contacts 3q and 4q and the opening of two contacts 1q and 2q (FIG. 47), in order to send the long-duration impulse BP through the polarization coils of the B group.

When the mechanical operation is over, the control portion selected by the operation key that has been depressed becomes operative and orders the sequence of calculation and transfer phases required to obtain the result. These calculation and transfer phases, which are determined by a fixed control, or by a control depending on the numbers, according to the operation, have already been described hereinbefore and are not explained again.

When the result is obtained, the control portion sends a direct current to relay ReT, and relay W is energized in order to send a long-duration RP impulse through polarization coils RPo of the R group, by means of contacts 1w, 2w, 3w and 4w (FIG. 48), while electromagnetically-controlled clutch K is engaged once more to effect the mechanical phase necessary for the read-out. The operation is then at an end, the motor can be stopped and contacts 1i to 4i can be opened.

To control the stoppage of the motor, the actuated operation key could be locked in its depressed position and then automatically unlocked at the end of the second mechanical phase. In this case, the key can return to its rest position and the feeding of relays Rel. Mo and Rel. I is cut off, which causes the stoppage of the motor and the opening of contacts 1i to 4i.

The tabulator of FIGS. 34 and 35 is connected in the same manner as was described with reference to FIGS. 40 and 41 for division and FIGS. 42 and 43 for multiplication, so that it is energized for all the operations. However, it has no effect on the operations that take place without denomination row shifts, such as addition, subtraction and setting at zero. It is used, on the contrary, for denomination row shifts to the left or to the right, and for division and multiplication. For these operations, it is thus possible to determine the number of denomination row shifts that should precede the read-out by depressing one of the keys TA represented in FIG. 46, before depressing the desired operation key.

It is clearly understood that many variations could be made in the embodiment of the invention that has been described. In the diagram of FIG. 19, the two input conductors ge and ge1 could be replaced by a single input conductor ge connected to a switch controlled by a relay and designed to cause or not to cause the addition of a 1 in the first denomination row. The embodiment described had only 6 denomination rows, in order not to overcrowd the drawings, but it is clear that this calculating machine could have any number of decimal places or denomination rows. Moreover, increasing the number of denomination rows will not entail any important change in the control circuits for multiplication and division, only the number of relays in the tabulator needing to be increased in a corresponding way. Likewise, each decimal place or denomination row was designed to define ten digits and thus make it possible to carry out operations belonging to the decimal system, but it is clear that machines could be constructed to perform operations belonging to other systems, such as machine to calculate times in hours, minutes and seconds, or accounting machines for non-decimal monetary systems. It will be seen that in the present description the expression "decimal place" denomination row has been given a very broad connotation, which includes as well the case where the number of digits definable in an order is different from ten.

Moreover, the representation of the digits in the biquinary system is very practical for performing short multiplication, but is not by any means indispensable. For, it is only necessary to provide contacts depending on the number set up in the B and R groups connected in such a way as to bring about the same operations as those indicated hereinbefore.

In addition, a machine could very well be designed in which the representation of the numbers takes place on the decimal system, as is indicated hereinafter.

*Second embodiment*

FIG. 49 represents the calculation circuit of a machine in a second embodiment of the invention, comprising four denomination rows and operating on the decimal system.

FIG. 50 represents the corresponding transfer circuit.

FIG. 51 shows in detail the contacts and windings of the relays of a denomination row of the B group.

FIG. 52 illustrates the mechanical portion for introducing the numbers into the A group and the read-out mechanism provided for this machine.

This machine operates on the decimal system and its keyboard shows four denomination rows, that is, the same number as the R group. The calculation circuit of FIG. 49 is similar to that shown in FIG. 19 for the first embodiment of the invention. Each denomination row of this group has two input conductors and two output conductors, making possible the ten's carry. The first denomination row has two input conductors ge and ge1, in connection with ten double contacts 1b0, 2b0, 1b1, 2b1, 1b2, 2b2, 1b3, 2b3, 1b4, 2b4, 1b4*, 2b4*, 1b3*, 2b3*, 1b2* 2b2*, 1b1*, 2b1*, 1b0* and 2b0*, corresponding by pairs to the digits 0, 1, 2, . . . 8, 9, respectively. These double contacts belong to the B group and are connected to eleven movable contact members of a multiple ten-position wiper or slider of the A group. This wiper or slider comprises twenty fixed contact members that are connected to twenty windings, the first ten of which, 1R0, 1R1 . . . 1R8, 1R9 are connected to first of the aforesaid output conductors, the second winding group 2R0, 2R1 . . . 2R8, 2R9 being connected to the second output lead.

The principle of the connections is the same as for FIG. 19, and when a current impulse is sent via ge, the current goes through the winding of the R group that defines the number corresponding to the addition of the numbers defined by the contacts of the B group and by the position of the multiple-contact wiper slider of the A group.

In the circuit according to FIG. 49, the different denomination rows are connected in series so as to allow the ten's carry at the same time as the calculation phase. The circuit has two input conductors ge and ge1 and one output conductor ga. The normal input is ge; when the current is brought in via ge1, we get the supplementary addition of a 1 in the first denomination row. This input may be used to count the number of elementary two-phase operations in the combined operations, or to convert a nine's complement into a ten's complement. The direction of the current that is sent via ge or ge1, as the case may be, and ga, determines whether contacts ri or ri* of FIG. 50 should be closed during the calculation phase. A warning device L may be provided to give notice when the capacity of the machine has been exceeded during a calculation, a device that may be used during division, for instance. In machines with an arrangement for non-automatic division, the warning device is replaced by a relay of the control mechanism.

FIG. 50 represents the B circuit. The current enters by fe and leaves by fa, or vice versa. A current impulse brings about the transfer of the result of the preceding calculation, held in contacts ri or ri*, as the case may be, to the contacts bi or bi*, respectively, of FIG. 49.

As is seen from FIG. 50, a transfer takes place in the same denomination row when the contacts of the ri group are closed and a transfer to the following row when the contacts of the ri* group are closed. This transfer circuit is not designed for the cyclical denomination row shift, like that in FIG. 20. When a decimal shift takes place, the digit set up in the fourth denomination row disappears, for this denomination row has no ri* contacts, while a zero is introduced into the first denomination row. This introduction of a zero is obtained by means of a relay with a winding D connected near output ga of the calculation circuit of FIG. 49 and contacts 1d, 1d* and 2d*.

When a calculation phase is performed with a positive current direction, contact 1d is closed, while contacts 1d* and 2d* are open, and the following transfer is made without a denomination row shift. When a calculation phase is performed with a negative current direction, however, contacts 1d* and 2d* are closed instead of 1d and the transfer occurs with a denomination row shift, the contact 1d* making the current pass through winding 1B0 of the first denomination row and to introduce a zero into it.

As in the first embodiment of the invention, the direction of the current during the transfer phase makes it possible to transfer to the B group the number defined in the R group, or its nine's complement.

FIG. 51 represents the B relays of a denomination row and their contacts, so as to show how the formation of the complement is obtained. Every denomination row comprises five relays with electromagnetic polarization and two switching positions, with a double contact for each switching position. The digits of an order of ten are defined by the closure of the following contacts:

| | | |
|---|---|---|
| 1b0 | 2b0 | 0 |
| 1b1 | 2b1 | 1 |
| 1b2 | 2b2 | 2 |
| 1b3 | 2b3 | 3 |
| 1b4 | 2b4 | 4 |
| 1b4* | 2b4* | 5 |
| 1b3* | 2b3* | 6 |
| 1b2* | 2b2* | 7 |
| 1b1* | 2b1* | 8 |
| 1b0* | 2b0* | 9 |

It is seen from this pattern that a reversal of the current direction makes contacts bi close instead of contacts bi*, and vice versa, producing the formation of a nine's complement. Moreover, each relay comprises two windings 1Bi, 2Bi, wound in opposite directions. These windings are connected to the ri and ri* contacts and are provided for the formation of complements.

As is shown in FIGS. 50 and 51, the relays of the B group that correspond to the digit 0 are equipped with a supplementary or auxiliary winding 3B0. These windings make it possible to introduce a 0 or a 9, depending on the direction of the current, into all the denomination rows. In the embodiment described, these windings become operative at the beginning of each new calculation operation in connection with the mechanical operation of intoducing the numbers.

The positions of the contacts of the circuits shown in FIGS. 49 and 50 correspond to the operation:

$$3534+1382=4916$$
$$4916 \rightarrow 5083$$

The positions of the multiple-contact wipers or sliders correspond to the number 3534 and those of the contacts of the B group to the number 1382. The transfer must me made without a denomination row shift, so that the current direction of the RM impulse must be positive during the calculation phase. The current enters via ge (FIG. 49). The direction of the current will be negative, however, during the transfer phase, since the result of the addition must be converted into its nine's complement.

It will be noted, further, that during the transfer phase, the current does not pass through the denomination rows in their numerical order. In fact, the various denominational rows may be connected in any order so far as the passage of the current is concerned, since there is never a ten's carry during the transfer. It is sufficient that the direction of the current be the same in all the denomination rows.

FIG. 52 shows schematically, for one denomination row, one embodiment of the mechanical introduction and read-out portions, adapted to the embodiment of the calculating machine that operates on the denomination row system.

The introduction portion comprises keys T0 to T9 of a keyboard that are explored in a well-known manner by a bar 132 for each decimal place coupled to movable wiper or slider 139 of multiple-contact wiper or slider a. For reading-out, a bar 134 is designed to cooperate with the sensing parts indicated schematically by 136, the positions of which depend on the positions of relays R0, R1 . . . R8, R9 of the R group. These relays and their sensing parts can correspond to any of the embodiments represented in FIGS. 10 to 14. To form a definite idea, it will be assumed that sensing parts 136 consist of the parts 26 of the relays shown in FIGS. 10 and 11.

Bars 132 and 134 are subject to the action of springs 146 and 143, respectively, which urge them to the left against eccentrics 141 and 142, respectively. The right ends of these bars are bent into elbows so that they can pull slide 139, which is urged toward the right by a spring 145 that is weaker than either of springs 143 or 146. The exploration of the keys of the keyboard or of the armatures of the R relays by bars 132 and 134 respectively is done on the principle indicated for FIGS. 22 and 23. Bar 132 for introducing the keyboard value into the A group, or bar 134 for effecting the read-out, as the case may be, is pushed by its eccentric against the action of its spring, and then released in such a way that its spring pushes it back toward the left until one of its stops, 133 or 135 respectively, comes up against a depressed key or a sensing part 136. Obviously, the bar in question pulls slide 139 along to the left, so that the number defined by the position of the said bar is set up in the A group at the same time. The indicator bar 134 has a toothed rack engaged with a pinion attached to a number wheel 140, making it possible to read directly the digit defined by its position.

The two eccentrics can well be rotated by means of two electromagnetically-controlled clutches. For, such an arrangement makes it possible to push bars 132 and 134 simultaneously back against the action of their springs, 146 and 143 respectively, and thus to set wiper or slider 139 in its extreme position, corresponding to zero. It is thus possible to introduce the number zero into the contacts of the A group independently of the number introduced in the keyboard. It is clearly understood that the actuation of bars 132 and 134 could be obtained by means of elements other than eccentrics.

With the mechanical device for introducing numbers and for reading-out that has just been described, the initial operation is different from that described with reference to FIGS. 22 and 23. For, in the rest position bars 134 keep their positions defining the result of the preceding operation, since their springs 143 keep them with one of their stops 135 against a relay sensing part 136, so that the latter too is locked in its position. The multiple-contact wipers or sliders of the A group are in positions corresponding to the said result. To introduce this result into the B group, the number zero must first be introduced into the B group by means of a transfer phase in special windings 3B0; then a calculation phase must be performed with a current of positive polarity, giving $A+B=R$, that is, the number set up in the A group is transferred into the R group. A transfer phase now makes it possible to bring this result, or its complement, depending on the direction of the current, into the B group. It is held there by a prolonged polarization impulse BP, while a mechanical phase makes it possible to set the multiple-contact wipers or sliders as functions of the number introduced into the keyboard. During this mechanical phase, bars 134 are pushed against the action of their springs 143 and springs 146 urge bars 132 back toward the left. This sort of initial operation makes it possible to set up a 9 in the last denomination row to the left at the outset of the multiplication, as was pointed out at the beginning of Example No. 1 in the section entitled "General principle of operation for multiplication" that follows directly after the four numerical multiplication examples. For we need only provide for the introduction of a 9 instead of a zero in the sixth denomination row during the first transfer operation of the initial operation in which a 0 is introduced into all the denomination rows of the B group by means of special windings.

FIG. 44 represents a simple diagram that makes it possible to obtain this result by using two contacts $1ud$ and $2ud$ so that the current may be reversed in the 0 winding of the sixth denomination row, thus converting the 0 in the B group into its complement and causing the B group to contain the number 900000 after the first phase of the initial operation. The calculation phase $A+B=R$ of the initial operation then takes place followed by the final transfer into the B circuit, with positive current direction. Thus, by the end of the initial operation the number has already been obtained that was only reached after two elementary operations in the multiplication examples given above. These two operations are thus eliminated, as well as the contacts and windings of the relays located to the left of the line $x$ or $x'$ of FIGS. 42 and 43, respectively. During the last transfer phase of the initial operation it is then necessary to close contacts $b1p^*$ (FIG. 38), $b3p$, $1b5p$, $2b5p$ (FIG. 42) by means of corresponding special windings, along with contacts $ba$ (FIG. 34), $1bt$ (FIG. 40) and $2bt$ (FIG. 42) of the tabulator.

When sensing parts as in FIG. 14 are used instead of those in FIGS. 10 and 11, as has been assumed up to now, all the indicating slides 47 are drawn upwards during this mechanical phase, by virtue of a shift upward of guides 48 and 49. Thus, the indicating slides 47 that indicated the result of the preceding calculation and were already in their upper positions, keep that position while the other slides are returned to their rest positions, so that springs 50 now are no longer between the armatures and the cores, and thus can not hinder the operation of the corresponding relays. After this mechanical operation, the windings of the multiple-contact wipers or sliders are energized in order to obtain a stable contact between the fixed contact members and the movable contact members.

Except for the initial operation, all the other calculation operations can be identical with those described for the first embodiment, which was based on the biquinary system. The various control mechanisms described above can therefore be used unchanged, except for the control mechanism for short multiplication. For, since the B and R groups no longer contain relays defining a number smaller than or at least equal to five in each denomination row, it is necessary, when the numbers are not defined on the biquinary system, to provide supplementary relays in the next-to-the-last denomination row to the left to indicate whether the digit in this row is smaller than or at least equal to five.

Because of the fact that the multiple-contact wipers or sliders of the A group can be set in their positions defining zero irrespective of the value introduced in the keyboard, certain calculation operations can be simplified.

Thus, the operation of clearing the result can be simplified, since it is sufficient first to choose case (a) of the initial operation to obtain the number zero in the B group at the end of that operation, and second to introduce a zero into the A group during the first mechanical phase, and third to perform a calculation phase in order to perform the addition $0+0=0$. The number zero is then set up in the R group and the read-out can be effected.

The pattern of current directions is as follows.

Clearing the result:

| Calculation phase | Transfer phase |
|---|---|
|  | (a) Positive via $f0e, f0a$. |
| First mechanical phase; the number zero is introduced into the A group | |
| Positive, read-out. | |

It is to be noted that the extreme position of slider 139 need not necessarily correspond to zero, for it can also define the digit 9. In this case clearance of the result is obtained by introducing the number zero in the B group, placing the sliders of the A group in their extreme positions and controlling a calculation phase with the current input via ge1, in order to add a supplementary 1. The operation 1+9999+0000=1: 0000 is then effectuated, the digit 1 located to the left of the ":" sign being beyond the machine's capacity, which amounts to setting the indicator at zero.

The operation of introducing the multiplier can also be simplified, for the machine in its second embodiment comprises the same number of denomination rows in the A group as in the B and R groups. All that is needed is to introduce the multiplier on the left in the keyboard, leaving the last denomination row to the left free, however, the introduction of the multiplier is then obtained by an initial operation of the (a) type (introduction of zero into the B group), a mechanical phase to set the multiplier up in the A group, and a calculation phase with positive current, followed by a read-out. The multiplier is then set up in the R group.

The operation of tabulation to the left can also be considerably simplified. The machine has a certain number of tabulator keys, each of which controls a shift of a certain number of denomination rows, starting with a given denomination row. At most, the machine has as many tabulator keys as there are denomination rows in its capacity; however, for reasons of economy, the number of tabulator keys could be cut in half, in which case the denomination row shifts of more than half the machine's number of denomination rows would have to be effected in two operations. The sequence of operation in the pattern depends on the number of denomination row shifts determined by the corresponding tabulator key. The example describes a shift of three places for a machine that has four columns.

Pattern:

| Calculation phase | Transfer phase |
|---|---|
| ------------------ | (b) Positive. |
| First mechanical phase; introduction of zero into the A group | |
| Negative. | Positive. |
| Negative. | Positive. |
| Negative. | Positive. |
| Positive, read-out. | |

Numerical example:
Keyboard value_____ 0054
Indicator value_____ 0007

| Calculation phase | Transfer phase |
|---|---|
| ------------------ | (b) 0007. |
| First mechanical phase | |
| 0007*. | 0070. |
| 0070*. | 0700. |
| 0700*. | 7000. |
| 7000, read-out. | |

It is seen from this pattern that a single two-phase elementary operation is required for each denomination row shift. Operations of tabulation to the right have not been provided for in this embodiment.

Third embodiment

FIGS. 53 to 57 relate to a third embodiment differing from the first two principally in the fact that the multiple-contact wipers or sliders are eliminated, being replaced by contacts forming a table of addition, and by the representation of the numbers on a system known as odd-even.

FIG. 53 schematically represents the calculation circuit.

FIG. 54 shows the transfer circuit.

FIG. 55 shows the principle of the formation of the complement.

FIG. 56 schematically represents the read-out mechanism.

FIG. 57 shows an embodiment of the keyboard contacts.

The use of the odd-even system makes it possible to define the ten digits of an order of ten by means of seven switching elements; it is seen that this number of elements is the same as for the biquinary system. These seven elements are divided into two groups: The first group comprises two switching elements that make it possible to determine whether the digit is odd or even, and the second group comprises five elements corresponding to the digits 0, 2, 4, 6, 8. The representation of the digits of an order of ten therefore takes place according to the following table:

| Digit | #1 elements | #2 elements |
|---|---|---|
| 0 | $u$ | 0 |
| 1 | $v$ | 0 |
| 2 | $u$ | 2 |
| 3 | $v$ | 2 |
| 4 | $u$ | 4 |
| 5 | $v$ | 4 |
| 6 | $u$ | 6 |
| 7 | $v$ | 6 |
| 8 | $u$ | 8 |
| 9 | $v$ | 8 |

The diagram of the calculation circuit represented in FIG. 53 is similar to that in FIG. 19, with the exception of the use of the odd-even system and the replacement of the multiple-contact wipers or sliders by sets of contacts (table of addition). This variant embodiment has six denomination rows, three only of which comprise contacts of the A group, in a manner quite similar to the first embodiment. The input conductors ge and ge1 once more correspond to an input with or without addition of a 1 in the first denomination row, respectively.

In each denomination row of the R group, there are seven read-out relays as in FIGS. 12 and 13, with polarization windings in common in which the armatures are used directly to indicate the result. Each relay of the R group has, in the first three denomination rows, two control coils 1R$i$, 2R$i$ and two single working contacts $ri$ and $ri^*$, corresponding to positions I and II respectively, as defined with reference to FIG. 3. The B group comprises four relays in each denomination row, which make it possible to form the complement by reversing the direction of a current. Each of these relays contains two or three windings 1B$i$, 2B$i$, 3B$i$ and a double working contact 1$bi$, 2$bi$, and 1$bi^*$, 2$bi^*$ for each of positions I and II, respectively.

The A group has, in each of the first three denomination rows, five sextuple contacts $a0$, $a2$, $a4$, $a6$, $a8$ as well as a triple reversing contact $au$—$av$, each of the sextuple contacts corresponding to two successive digits of a denomination row. These contacts are actuated directly by the keyboard keys.

FIG. 57 shows the principle on which the keys are coupled with the contacts of the A group. Each denomination row of the keyboard has ten keys corresponding to the digits from zero to nine respectively. Only the keys corresponding to zero and one have been depicted in FIG. 57. Each group of two consecutive keys 0—1, 2—3, 4—5, 6—7, 8—9 actuates a sextuple contact $a0$, $a2$, $a4$, $a6$, $a8$, respectively (FIG. 53). FIG. 57 shows the two keys for 0 and 1, which can actuate the corresponding sextuple contact $a0$ by means of a bent lever 100 in the form of an angle iron. Triple reversing contact $au$—$av$ is actuated by a bent lever 101 likewise in the form of an angle iron, which can be actuated by any key corresponding to an odd digit. With these simple constructions, the result is obtained that the number introduced into the decimal keyboard is converted to the odd-even system, in a similar way to the conversion into the biquinary system in the first embodiment, which was obtained by means of two bars. Moreover, it is of advantage to have levers 100, 101 convert the relatively great displacement of the keyboard keys into a small displacement of the contacts, so that, despite the large number of contacts, the actuation pressure of the keys may be kept fairly low.

The sets of contacts of the A group are designated on the same principle as the contacts of the R group, of course replacing the letter $r$ by the letter $a$, but the sets of sextuple or triple relays are designated as units, while in groups R and B each contact is separately designated.

The B circuit of FIG. 54 is similar to that in FIG. 20, details aside, and its first difference from that figure is the correspondence between elements and digits, which is determined by the odd-even system; a second difference is the new wiping contacts $2ri$ and $2ru$, with five and two switching positions, respectively, and one rest position, and connected in parallel with contacts $ri$ and $ru$, respectively. During electrical calculation operations they are in the positions shown in FIG. 54, and do not affect the calculation. These contacts are controlled by the read-out mechanism so as to make it possible to introduce into the B group the number set up in the indicator.

Finally, FIG. 55 shows the arrangement of contacts and windings in the B group, with an arrangement that makes it possible to form the complement in a simple way by reversing the current. FIG. 55 is similar to FIG. 21, but the correspondence between contacts and digits is altered by reason of the use of the odd-even system. This correspondence follows the pattern below:

|       |         |       |         |       |       |   |
|-------|---------|-------|---------|-------|-------|---|
|       |         | $1b0$ |         | $2b0$ | $1bu$ | $2bu$ | 0 |
|       |         | $1b0$ |         | $2b0$ | $1bu*$ | $2bu*$ | 1 |
|       |         | $1b2$ |         | $2b2$ | $1bu$ | $2bu$ | 2 |
|       |         | $1b2$ |         | $2b2$ | $1bu*$ | $2bu*$ | 3 |
| $1b4$ | $(1b4*)$ | $2b4$ | $(2b4*)$ | $1bu$ | $2bu$ | 4 |
| $1b4$ | $(1b4*)$ | $2b4$ | $(2b4*)$ | $1bu*$ | $2bu*$ | 5 |
|       |         | $1b2*$ |         | $2b2*$ | $1bu$ | $2bu$ | 6 |
|       |         | $1b2*$ |         | $2b2*$ | $1bu*$ | $2bu*$ | 7 |
|       |         | $1b0*$ |         | $2b0*$ | $1bu$ | $2bu$ | 8 |
|       |         | $1b0*$ |         | $2b0*$ | $1bu*$ | $2bu*$ | 9 |

It is seen that a reversal of the direction of the current produces a reversal of contacts $1bi$, $2bi$ with $1bi*$, $2bi*$, and vice versa, which makes it possible to have the nine's complement formed.

Switch $1s2$, $2s2$ in FIG 54 makes it possible to shut off the cyclical denomination row shift between denomination rows 3 and 4, as in FIG. 20. Contacts $d$ and $d*$, respectively, are controlled by relay D (FIG 53) according to the direction of the current and make it possible to determine the path of the current in FIG. 54, according to whether the transfer should be made with or without shift of a denomination row.

The positions of the contacts of the circuits shown in FIGS. 53 and 54 correspond to the operation:

872+715518=716390
716390→163907

The positions of the sextuple contacts and of the triple invert relay contacts of the A group correspond to the number 872 and those of the contacts of the B group to the number 715518. The transfer is to be made with a cyclical denomination row shift, so that the direction of the RM impulse should be negative during the calculation phase. The current enters at $ga$ and leaves at $ge$ (FIG. 53). The direction of the current is positive during the transfer phase, since a conversion to the complement is not desired.

FIG. 56 schematically represents the read-out mechanism for one denomination row.

The seven read-out relays for a denomination row, as in FIGS. 12 and 13, are arranged in series in FIG. 56. For the sake of clarity, only the insulating part 102 common to all the relays of a denomination row has been illustrated in FIG. 56, together with the indicating levers 27 that project from it, while all the other parts of the construction according to FIGS. 12 and 13 have been omitted.

The read-out mechanism comprises a number wheel 103, whose axis is attached to a bar 104 bearing lateral stops 105, 106, 107 capable of cooperating with indicating levers 27. The circumference of this wheel bears three adjacent rings, the first of which has no numbers and the others bearing the digits 0, 2, 4, 6, 8 and 1, 3, 5, 7, 9 respectively. A shift of this wheel along its axis makes it possible to position any one of these three rings opposite a window (not shown).

Attached to number wheel 103 is a pinion 124 meshing with a sector gear 125 attached to the end of a bar 126. This last is able to pivot around its longitudinal axis and bears stops 127 set at graduated angular intervals and designed to cooperate with the ends of levers 27. A spring 128 is provided to draw bar 104 in the direction contrary to arrow 31, while a spring 129 tends to urge stops 127 of bar 126 against levers 27. An actuating part 130 is subject to the action of a spring 131 and can be shifted in the direction opposite to arrow 137, against the action of the said spring, by an electromagnet 138. Part 130 has a projection 144 intended to cooperate with an arm 147 attached to sector 125, and a part 148 in the form of an incline actuating an arm 149 that is attached to bar 104. The slide of contact $2ru$ is attached to this arm 149, while that of contact $2ri$ is attached to arm 147.

FIG. 56 shows the position of the indicating mechanism when part 130 is attracted by electromagnet 138. The indicating mechanism takes this position while electrical calculation operations are being performed. Bar 104 is then in the position opposite to the direction of arrow 31, and its stops 105, 106, 107 shift the indicating levers a little further to the right compared to the position they have in FIG. 12, against the action of their spring 29, so that armatures 2 can move freely and the electrical calculation can take place normally.

In this position of the read-out mechanism, the slides of contacts $2ru$ and $2ri$ are in their extreme position, in which they do not make any contact.

To perform a read-out operation, the current is cut off in electromagnet 138. Part 130 slides in the direction of arrow 137 and frees both bar 104 and arm 147, which are then able to shift under the action of their springs 128 and 129. The movement of bar 104 in the direction of arrow 31 frees indicating levers 27, which are shifted by their springs 29. This takes place, however, only for the indicating levers of those relays whose armatures 2 have not been attracted. When the armature 2 of a relay has been attracted, the corresponding indicating lever is blocked by that armature and remains in its inclined position (FIG. 12).

One of the levers indicated by $u$ and $v$ in FIG. 56 is always in the inclined position. When this is lever $u$, bar 104 can only shift, because of stop 106, until the number ring bearing the digits 0, 2, 4, 6, 8 comes opposite the window, while the purpose of having the bar blocked against lever $v$ by stop 107 is to have the ring with digits 1, 3, 5, 7, 9 come opposite the window. At the same time, an indicating lever corresponding to the digits 0, 2, 4, 6, 8 is also in the inclined position. The rotation of bar 126 by the action of spring 129 is then restricted by that one of stops 105 that comes into contact with the said inclined lever 27. The distances apart of stops 105, the gear ratio between pinion 124 and sector gear 125 and the arrangement of the fixed contacts of contact $2ri$ are so contrived that the digit of the number wheel that appears in the window coincides with the position of those indicating levers that are blocked. At the same time, the control of bar 104 by one of levers $u$ or $v$ makes it possible to convert the value indicated on the odd-even system into the corresponding value in the decimal system, namely that it is either the ring with the digits 0, 2, 4, 6, 8 or the one bearing 1, 3, 5, 7, 9 that is used for reading out. When the read-out has been made, the number indicated is registered by the positions of contacts 2ri and 2ru. These contacts are then connected in parallel with the ri contacts of the R group and can replace them during the initial operation.

Thus, as in embodiments 1 and 2, it is necessary that the positions of these indicating levers be maintained during the read-out operation, for otherwise the armatures would return to their rest positions when the polarization current was shut off, so that the indicating levers would no longer be held in their positions and the numbers indicated would be effaced. The locking means needed is not shown in the schematic FIG. 56 so as not to impair clarity. The simplest way is to combine the locking means with bar 126 in such a way that when the indicating levers have taken their final positions and before the first stop 105 comes into contact with a lever 27, blocking elements are positioned opposite the indicating levers that are held in their inclined positions by armatures, so as to lock them and keep them in their positions when the armatures return to their rest positions after the current is interrupted, which occurs at the end of the read-out operation.

The read-out means in FIG. 56 comprises an electromagnet for each denomination row of the machine. This arrangement is useful because it makes it possible to group the relays of the B and R groups with the read-out means to form a compact element, so that in order to construct a machine with n denomination rows, it is only necessary to arrange that number of denomination rows side by side, these elements being mechanically independent. It is well understood, however, that one electromagnet could be provided to control, by itself, all the denomination rows of the read-out mechanism, by means of a mechanical connection.

The course of a calculation operation is somewhat different as compared to the first embodiment, in particular because of the fact that the number introduced in the keyboard is set up in the A group from the outset of the operation.

When the machine is at rest, electromagnets 138 are not excited and the read-out mechanism is in the position opposite so that shown in FIG. 56, and shows the result converted into the decimal system, by means of number wheels 103. In this position, the result is set up on the odd-even system in slides 2ri and 2ru, respectively (FIGS. 54 and 56).

The course of a calculation operation is again divided into four partial operations that have functions differing in part from the first two embodiments:

(1) Initial operation
(2) Preparatory operation for electrical calculation
(3) Electrical calculation operation
(4) Read-out operation (1) *Initial operation.*—This is very simple, for the value of the preceding result is already set up in contacts 2ri and 2ru, respectively, so that only a single transfer operation in the B circuit is required, this operation being followed by a long-duration polarization impulse BP to hold the contacts of the B group in their positions.

(2) *Preparatory operation for electrical calculation.*— In this third embodiment, there is no operation for introducing the keyboard value by means of bars, etc., as in the first and second embodiments, since the contacts of the A groups are actuated directly by depressing keys of the keyboard. The second member is electrically represented at once, therefore, as soon as operations commence. On the other hand, it is necessary to prepare the read-out means for the read-out of the next result to follow and at the same time to set the indicating levers 27 (FIG. 12) in such positions that the movement of armatures 2 is not interfered with during the electrical calculation and contacts 2ri or 2ru, as the case may be, are open, for otherwise they would interfere with the electrical calculations, being connected in parallel with ri and ru, respectively. All these operations take place as soon as the one or more electromagnets 138 (FIG. 56) are excited. Driving part 130 drives sector 125 by means of stop 144, and bar 104 by means of incline 148, to their extreme positions, so that contacts 2ri and 2ru are open and indicating levers 27 are shifted by stops 105, 106 and 107 in the direction that permits the free action of armatures 2 (FIG. 12).

(3) *The electrical calculation operations.*—Next, the electromagnetic locking of the relays actuating the impulse generator is interrupted and the electrical calculating operation is effected in a sequence of two-phase elementary operations, exactly in the way it was in the first embodiment, since the value set up in the A group remains constant throughout the operation and it is not possible to introduce the digit zero automatically into the A group to perform certain operations.

(4) *Read-out operation.*—This too is very simple. After the result is obtained, and defined by the positions of the ri contacts of the R group, these latter contacts are locked by a prolonged RP impulse and electromagnet 138 is released, so that the read-out operation takes place on the pattern indicated in the description of the mechanical portion of this embodiment. The general current feed is cut off after the read-out.

Other variant embodiments

By reason of the similar functioning of the first two embodiments, their various assemblies may be connected in various ways to give new variants of the calculating machine.

The electrical diagrams of FIGS. 49 and 50 do not differ in principle form of those of FIGS. 19 and 20 except for the system of number representation employed, and hence it is possible to construct a biquinary calculating machine according to the second embodiment using the diagrams of FIGS. 19 and 20. The mechanical portion of FIG. 52 must be modified as follows: instead of single ten-position bars, there must be a system of double bars with five and two positions respectively, each constructed in an analogous way to FIG. 52 and making it possible to convert the biquinary result into the decimal system by means of an arrangement as in FIGS. 22 and 23 (sector gear 93, number wheel 98) or some equivalent arrangement. The sequence of calculation operations and read-out operation can take place according to the pattern of the second embodiment, taking for granted the use of the indicating elements used there. Conversely, the use of the diagrams of FIGS. 49 and 50 can be envisaged for the first embodiment.

In the third embodiment, the contacts of the A group, directly actuated by the keys of the keyboard, could be replaced by electromagnetic relays. In this case, the use of polarized multi-position relays, described hereinbefore, is advisable, since they make it possible to lock the armatures easily. Of course, any other kind of relays could be used, with or without a device for locking the armatures in their positions, the actuation time not playing an important role, since no engagement of the A group should take place during the calculation. The use of electromagnetic relays is especially profitable when the introduction of a number into the A group is to be made not only starting from a keyboard but also starting from registers. A keyboard may be provided at the same time to make it possible to control the said relays in well-known fashion. Such an A group, comprising relays such as have been described, can be used to advantage in calculating machines controlled on a predetermined program.

The use of the odd-even system is equivalent to the use of the biquinary system, so far as the number of relays and contacts required is concerned. As a result, a sort of resemblance will be noted between the electrical groups in embodiments 1 and 3, especially if the circuits are compared in which, for the two systems, group A is provided with multiple-contact sliders or tables of addition. As a supplement, FIG. 58 represents the calculating circuit for one denomination row of the odd-even system, in which multiple-contact sliders (as in FIG. 19) are used instead of tables of addition. Comparison with the circuit of FIG. 19 shows the equivalence of the means employed. The first embodiment can therefore be converted for the odd-even system by a few simple changes. Further, FIG. 59 represents a denomination row on the biquinary system, in which a table of addition has been used. The use of such a diagram in the first embodiment is evidently possible, but leads to less advisable construction solutions for the combination of keyboard and group A contacts, because the use of the odd-even system has certain advantages in the arrangement of the keyboard, by reason of the equivalence of adjacent digits 0-1, 2-3, etc. When the A group is equipped with electromagnetic relays, these advantages disappear and the two systems are equivalent in the material used.

The use of relays with at least three positions in the calculation and transfer circuits, as described heretofore, is of great advantage but by no means indispensable. FIGS. 60 to 63 refer to variant embodiments in which the calculation and transfer circuits are made up with relays that have two positions, one being the working position and the other the rest position.

FIG. 60 illustrates the calculation circuit of a four-denomination-row machine operating on the decimal system.

FIG. 61 shows the diagram of a decimal place of the transfer circuit of this machine.

The calculation circuit represented in FIG. 60 corresponds to the one in FIG. 49, but the relays of the R group are two-position relays, while those of FIG. 49 were three-position relays. The relays of the R group are relays of the usual construction, but it must be possible to lock their contacts in position after the operating current has been broken. This lock can be secured electromagnetically, for instance by means of locking contacts, or mechanically by a suitable mechanism.

Each denomination row of the calculation circuit comprises ten relays in the R group, each equipped with two control windings 1R0, 2R0, 1R1, 2R1, ... 1R9, 2R9. These windings are connected on the one hand to two output conductors of the denomination row and on the other hand to twenty fixed contact members $af$ of a multiple-contact wiper or slider of the A group. This last comprises eleven movable contact members $am$ that are connected to twenty contacts 1B0, 2B0, 1B1, 2B1, ... 1B9, 2B9 coupled in pairs and belonging to ten two-position relays of the B group. These relays should be provided with a locking arrangement, like those of the R group.

The calculation circuit that has been described constitutes an addition circuit and its operation will not be described in detail, since it is like the one described with reference to FIG. 49.

FIG. 61 represents the diagram of a denomination row of the transfer circuit. It is seen that the relays of the R group are each equipped with a triple contact $r0$, $r1$, ... $r8$, $r9$. Group B comprises ten relays, each having a control winding B0, B1 ... B9. The upper contact of each triple contact of the R group is connected to the control winding of the relay of the B group that defines the same digit. Thus, the upper contact of triple contact $r0$ is connected to winding B0, $r1$ is connected to B1, etc. The center contact of each triple contact is connected to the control winding of the group B relay that defines the nine's complement of the digit defined by the said triple contact. The lower contact of each triple contact is connected to the control winding of the group B relay that defines the same digit in the next denomination row. The beginnings of the electrical lines leading to the following denomination row are designated by $ba0$, $ba1$, $ba2$, ... $ba9$, and the input conductors coming from the triple contacts of the preceding denomination row are indicated by $be0$, $be1$, $be2$, ... $be9$.

Three contacts $pk$, $qk$ and $rk$ are so situated as to make it possible to send the current that enters the denomination row at $fe$ to the upper, center or lower contacts of the R group, so as to control a transfer that will be respectively direct, as a complement or with a denomination row shift. When the current has passed through the winding of a group B relay, it goes to the next higher denomination row of the transfer circuit by one of contacts $pk+1$, $qk+1$ or $rk+1$. Each denomination row has three contacts $p$, $q$ and $r$ that correspond to the $pk$, $qk$ and $rk$ contacts of the $k$ denomination row shown in FIG. 61. These contacts $p$, $q$ and $r$ should always be closed at the same time as the triple contacts of the relays of the R group.

The transfer circuit, one denomination row of which is shown in FIG. 61, can well be so designed as to allow a cyclical denomination row shift analogous to the one described with reference to FIG. 20. That makes a denomination row shift to the right possible, so that all the arithmetical operations can be performed.

In principle, the control diagrams outlined in the first embodiment for effecting compound operations can be kept. In the control mechanism, however, the relays that produced the current reversals must be replaced by relays actuating contacts $p$, $q$ and $r$. Since the calculation and transfer circuits have ordinary two-position relays, the relays with at least three positions may also be replaced, in the control mechanism, by two-position relays.

With the transfer circuit of FIG. 61 it is not possible to perform a denomination row shift and a conversion to the complement at the same time, as was the case in the first embodiment. The same result can be obtained, however, by means of two supplementary elementary operations, comprising a transfer with denomination row shift, a calculation phase, a transfer as complement, a new calculation phase and finally a direct transfer. It is obvious that the control pattern must be suitably modified, since two supplementary elementary operations are needed whenever a denomination row shift must take place at the same time as a conversion to the complement.

FIG. 62 represents, as another variant, a denomination row of a transfer circuit corresponding to the one of FIG. 61, but in which each relay of the B group bears three control windings 1B0, 2B0, 3B0, 1B1, 2B1, 3B1, ..., etc. The relays of the R group each have a triple contact, as in FIG. 61, which are provided to permit direct transfer, transfer as a complement and transfer with denomination row shift. The upper contact of each triple contact $ri$ is provided for direct transfer and is connected to winding $3Bi$ of that relay of the B group that defines the same digit in the same denomination row. The center contact of each triple contact $ri$ is designed for transfer with conversion into the complement, and is connected to winding $2Bi$ which defines, in the same denomination row, the digit that is the complement of the digit defined by the said triple contact. Finally, the lower contact of each triple contact $ri$ provides for the transfer with a denomination row shift of one row to the left, and is connected to the winding $1Bi$ of the following denomination row. As before, the beginnings of the electric lines leading to the following denomination row are denoted by $ba0$, $ba1$, ... $ba9$ and the leads coming from the triple contacts of the preceding denomination row are indicated by $be0$, $be1$, ... $be9$.

Each denomination row has three input conductors $pe$, $qe$ and $re$ connected to the upper, middle and lower contacts, respectively, of the triple contacts. Windings $3Bi$, $2Bi$ and $1Bi$ are connected to three output conductors $pa$,

*qa* and *ra*, respectively, that are connected to the three inputs *pe*, *qe* and *re*, respectively, of the next denomination row. It will be seen that with such an arrangement of the transfer circuit only three contacts in all need be provided to send the current impulses to one of the three lines *pe*, *qe* or *re* entering the first denomination row.

FIG. 63 represents the diagram of the first two successive denomination rows of a transfer circuit in another variant, this circuit being designed to allow a transfer with a denomination row shift, and a conversion to the complement at the same time. In this way, complete similarity can be secured with the control diagrams according to the first embodiment. The various connections are carried out in part like those of FIG. 61 and in part like those of FIG. 62. Actually, the relays of the B group each have two windings provided for the conversion to the complement and multiple contacts for the denomination row shifts.

To make FIG. 63 clearer, only those windings of the B group relays and contacts of the R group relays have been shown that are needed to define the digits 0 and 9. Each B group relay has two control windings 1B*i* and 2B*i* and each group R relay has a quadruple contact *ri*. The uppermost contact of each quadruple contact is designed for direct transfer without denomination row shift; the second contact allows transfer with conversion to the complement but without denomination row shift; the third contact provides for direct transfer with denomination row shift, while the fourth contact takes care at once of the denomination row shift and conversion to the complement. There are a double contact *k* and a double contact *l* in each denomination row. The double contact *k* has the function of bringing the current to the two upper contacts of each quadruple contact *ri* of the denomination row, while the double contact *l* makes it possible to energize the two lower contacts. Two contacts *m* and *n* serve to shunt the current arriving from *fe* into two lines corresponding to transfer with or without conversion into the complement. Contact *m* connects *fe*, via the right-hand contact of double contacts *k* and *l*, to those contacts of the R group that allow the direct transfer in the same or the following denomination row. Contact *n* connects *fe*, via the left-hand contact of double contacts *k* and *l*, to those contacts of the R group that provide transfer with conversion into the complement in the same or the following denomination row. It will be seen that the closure of double contacts *k* controls a transfer in the same denomination row, while the closure of double contacts *l* determines a transfer with a denomination row shift of one place to the left. By closing contacts *m* or *n* and double contacts *k* or *l*, it is possible to control the four cases of transfer envisaged in the first embodiment, namely direct transfer to the same denomination row, direct transfer to the following denomination row, transfer as a complement in the same denomination row and transfer as a complement to the following denomination row.

Obviously, it would be possible to increase the number of contacts or lines to obtain still other transfer possibilities, for example transfer to a register, to a printing read-out mechanism, etc. Moreover, the calculation and transfer circuits of the variants having ordinary two-position relays have been represented for a machine operating on the decimal system, but it is clear that they could be adapted for a machine defining numbers on a different system, notably on the biquinary or the odd-even system.

It is clearly understood that many modifications could be introduced into the different embodiments that have been described.

In the event that relays according to FIGS. 10 and 11 are used, especially in conjunction with one of the first two embodiments, a mechanical device could be provided to shift all the armatures 23 in such a way as to close their magnetic circuit, instead of sending a reinforced polarization impulse, as has been described with reference to the said illustrations. This mechanical device should then release these armatures, so that they could return to their rest positions, with the exception of those for which the control winding 5 of the corresponding relay is energized. With such an embodiment, overloading of the circuits because of the reinforced impulse could be avoided. As a variant, armatures 23 could be like those connected with the various relays shown in FIGS. 3 to 9, only with the difference that the path of the armatures should be longer and that they should not actuate any contact, but shift stops for mechanical exploration. The manipulation of these armatures can be effected by a calculation phase for which the impulses should be longer and more intense, because of the greater inertia and smaller sensitivity.

When a relay without any special mechanical part for indication is used (FIG. 14), the read-out operation is still simpler, and the positions of the armatures themselves are sensed mechanically. The electrical control of the read-out phase can be effected in the same manner as that of a normal calculation phase, but the impulse generator must be made operative by means of relays of the control portion, and a long-duration polarization impulse sent through the R group, for example by means of a circuit in parallel. Next, all the springs 53, which are connected to guide 49 to form a general driving part, are shifted down, so that all the indicating slides 47 are lowered except those that correspond to the result, since their spring tongues 50 come up against the attracted armatures and their movement is checked, which causes the said slides to project. An upward shift, only a fraction of the preceding downward shift, permits the free action of the armatures that were attracted, which is necessary, for example, to allow the initial operation when the indicator number is introduced into the A group (FIG. 52) and then added to a zero introduced into the B group.

It is clear that the number of the machine's denomination rows can be chosen at will, and that the number of the keyboard's denomination rows can be equal to or smaller than that of the machine.

It is clearly understood that the keyboard could also have only ten keys designed to be used successively in each denomination row, as is well-known in mechanical calculating machines.

Obviously, combinations of the mechanical parts can also be provided. For example, the action performed by part 130 of FIG. 56 could also be obtained by means of eccentrics or similar elements driven by a motor. Indication as in FIG. 56 could also be used in embodiments 1 and 2, and indication as in the first embodiment could also be provided for by attraction by an electromagnet, as in the case of the third embodiment. Finally, contacts 2*ri* or 2*ru* could be connected with indicator bars as for embodiment 1, so that the mechanical introduction of the indicated value into the electrical portion would be superfluous. Likewise, in the decimal system, it would be possible to connect a ten-position wiper or slider 2*ri* in parallel with contacts *ri* and to couple it with the indicator bars to get the result of the preceding calculation directly into the electrical portion.

It goes without saying that the electrical circuits could also be linked up with mechanical apparatus for introducing and indicating the numbers that would be altogether different from those described hereinbefore. In particular, this would be the case in constructing accounting machines, machines for perforated cards and machines controlled on a predetermined program, instead of the machine for the four operations described in the preceding examples. In that case the electrical circuits described could be used, or equivalent circuits, eliminating the mechanical devices and replacing part of the indicating relays of the R group by relays without indicating devices, like those of the B group, and without important changes in the diagrams.

The machines according to the first three embodiments comprised three-position switching elements. However, elements with more than three positions could be employed with the same principle of construction. FIG. 8 shows a set of relays, each having five positions that can be selected by corresponding connections of the polarization windings. These connection elements can be used to advantage in the more complex electrical machines, such as accounting machines, machines for perforated cards and machines controlled on a predetermined program, etc., for they make it possible to obtain a plurality of connections that simplify the combination of several calculation groups to form a unit. Thus, the replacement of three-position elements by five-position elements in the R group of one of the calculation circuits described would make it possible to obtain four different transfer possibilities instead of two. In the example described, these possibilities comprised:

(1) Preparation of transfer to the B group in the same denomination now,
(2) Preparation of transfer to the B group in the next denomination now to the left.

When relays as in FIG. 8 are used, these two possibilities may be retained, for example, while the other two possibilities are designed, for example, for the preparation of transfer to an electrical indicator, to a printing indicator, to a register, to the B group of a calculation bloc connected in parallel, etc. One of these possibilities may also be provided for tabulation to the right. By suitable connection of polarization windings as in FIG. 8, it is possible to obtain simultaneous switching to several positions, which makes it possible to perform several transfer operations at once.

One of the characteristics of relay calculating machines consists in the representation of the denomination rows, which can be "parallel" or "in series." The embodiments that have been described are all of the "in parallel" type, that is, the same set of calculation elements is provided for each denomination row. Such an arrangement has the well-known advantage of allowing the shortest possible calculation time for a given time-constant of the switching elements. However, it is at once possible to use the diagrams that have been given in the description, for machines "in series," which in general contain calculation circuits for a single denomination now, the successive digits of a calculation being placed in this denomination row one after the other to perform the calculation. In this case it is necessary to provide a register to hold the numbers that are not being used, this register being embodied in such devices as perforated strips, magnetic recording tapes, etc.

The procedure for converting a parallel machine to a machine in series is well known and will therefore not be described in detail. In addition, machines in series have the drawback of being relatively slow.

It is to be noted that all the embodiments described have been so designed that each calculation phase leads to the addition of the numbers set up in the A and B groups. However, it is possible without further ado to connect the elements of the A and B groups on a subtraction pattern, the other operations being equally capable of being performed by successive subtractions, by means of conversion into the complement.

To convert the addition diagram into a subtraction diagram, it is only necessary, for example in FIG. 19, to number the positions of the multiple-contact wipers or sliders in the opposite direction, that is, according to the nine's complement of the numbering shown in that drawing, and to select $ge1$ as the normal input for the first denomination row. Subtraction then is performed by means of a single calculation phase, while addition requires several elementary operations, which exactly correspond, moreover, to the operations that make it possible to perform subtraction when the calculation circuit is an addition scheme.

The division control can remain unchanged, as well as the control portion shown in FIGS. 40 and 41, except for the last transfer phase of the initial operation and the first transfer phase of the fixed control of the end of division, for which the current direction is opposite to that shown in the division example given in the first embodiment. In the diagrams of FIGS. 40 and 41, the only modification consists in crossing the connection between double contact $r5d$ and input conductors $fe$ and $fa$ of the B circuit, in order to reverse the current of the next to the last transfer phase. The conversion into the complement of the divisor at the beginning of the calculation and of the remainder at the end of the calculation is avoided, but on the other hand the first three denomination rows have to be converted into the complement, since the quotient is formed by successive subtractions of one, and not by additions of one as when the R circuit comprises an addition diagram. Referring to the previously cited division example (71:30=2.36, remainder 20), it is seen that up to the seventeenth transfer phase the numbers correspond to the nine's complements of the numbers of the said example. For the seventeenth transfer phase on, the following results are obtained:

| Calculation phase | Transfer phase |
| --- | --- |
| (17) 236 979. | 763 979. |
| (18) 762 949. | 237 050. |
| (19) 236 020, read-out. | |

For multiplication, the last transfer phase of the initial operation should likewise be performed with a current of opposite polarity, when the R circuit comprises a subtraction pattern instead of an addition pattern. To control the course of the multiplication after the first mechanical operation, the control diagrams of FIGS. 42 and 43 can be used, without any other changes than replacing the contacts depending on the digits by other contacts depending on the nine's complement of these digits and a modification consisting in connecting the $1B1p$ and $2B1p$ windings in such a way that eliminating the ten's carry for the last denomination row to the left takes place in the last, instead of the next to the last, calculation phase. Without further ado, this pattern gives a current of negative polarity at the next to the last transfer phase, which is needed to convert into the direct value the result which is set up as the complement.

In the numerical examples, all the intermediate results, with the exception of the four last stages of the final operation, correspond to those indicated in the multiplication examples given with reference to FIGS. 42 and 43, but are in complementary digits. The last phases of the first multiplication example (900×73=65700) would be as follows, when a subtraction pattern is used in the R circuit:

| Calculation phase | Transfer phase |
| --- | --- |
| (9) 0–34299. | 0–34299. |
| (10) 9–33399. | 9–66600. |
| (11) 0–65700, read-out. | |

Finally, the switching elements of the B and R groups need not necessarily consist of electromagnetic relays. It is possible to replace them by electronic tubes. In that case, the A group can be equipped with electromagnetic relays playing the role of "slow" switches, while the electronic tubes are "rapid" switching elements. The limited number of different connection circuits for each element in the B and R groups and the simplification of the diagram are of evident advantage, while the slight increase in the number of calculation operations made necessary by the conversion into the complement in the B group instead of the A group plays only a very small part in the calculation time of the machine.

I claim:

1. An electric calculating machine having a keyboard with a plurality of denomination rows, controlled by current impulses and intended to perform at least addition and subtraction; comprising at least three groups of switching elements, the first of these groups comprising multiple contacts directly operated by said keyboard capable of being closed according to different combinations in order to determine one of the numbers constituting an operand of a calculating operation, the second and third group each comprising multiple contacts, control relays for each respective second and third relay groups, each of these relays comprising at least one control winding and a movable armature, the contacts of the first group and those of the second group being connected together and to the control windings of the relays of the third group to form a calculator circuit, whereby a current impulse sent into the calculator circuit causes, during a calculation phase, the control windings of the relays of the third group to function, which determine a number constituting the result of an operation performed by means of the numbers determined by the closed contacts of the first and second groups; an impulse generator for alternately displacing the resultant number in the said third group in a calculation phase and in said second group in a transfer phase, the contacts of the third group being connected to windings of the relays of the second group so as to form a transfer circuit such that a current impulse sent by said impulse generator during a transfer phase, into this circuit causes the control windings of the relays of the second group to function, which determine a number dependent on the number determined by the closed contacts of the third group of switching elements; the calculator and transfer control windings each comprising several denomination rows; this machine comprising also a group of control members acting on at least one of the calculator or transfer control windings in order to permit changing the result of the operation performed on the basis of the numbers determined by the contacts of the first and of the second group, the possible change consisting in the conversion of the number determined by the contacts of the first and of the second group into the complement number of said last-mentioned control members permitting the operation of an alternating sequence of calculator phases and transfer phases in order for the machine to perform, at will, at least addition and subtraction, without changing the closed position of the contacts of the first group of switching elements or the connections between the contacts of the first and the second group and the windings of the third group of switching elements.

2. An electrical calculating machine according to claim 1, wherein the said first group of multiple contacts consists of multiple contact sliders adapted to assume at least two positions.

3. An electric calculating machine according to claim 1, including a digit viewing window and means for performing subtractions, said means controlling first the closure of those contacts of the second group that define the complement of the first number of the subtraction, said means then controlling a series of impulses from said impulse generator to perform the addition of the numbers defined in the first and second groups, the transfer into the second group of the result obtained, a new first and second group addition, the transfer into the second group of the nine's complement of the result of this addition, and finally a third first+second group addition, said means then controlling the actuation of the machine read-out mechanism.

4. A machine according to claim 3, wherein the read-out mechanism has relay sensing parts to cooperate with those armatures of the third group that are in attracted position to establish electrical contacts.

5. A machine according to claim 4, wherein the relay sensing parts consist of supplementary armature provided on the relays of said third group of switching elements.

6. A machine according to claim 4, wherein the number of relay sensing parts is equal to that of the said third group relays, each sensing part consisting of a lever of insulating material one end of which lies between an armature and the core of the corresponding relay when the said armature is not attracted and to come up against the latter when it is attracted, the said armature being adapted to form an electric contact with the said core.

7. A machine according to claim 4, wherein the relay sensing parts comprise as many leaf springs as there are relays in the third group, each leaf being driven by a device to slide up against the core of the relay, exerting a slight pressure thereon, whereby said leaves of said springs coming against an armature in working position assume a position that is different from that of the leaves of the other of said springs not coming against an armature in working position.

8. A machine according to claim 4, wherein the read-out means comprises at least one shiftable part for each denomination row, each respective part bearing stops capable of entering into contact with the said sensing parts, so that its possible shift is a function of the digit read by the sensing parts.

9. A machine according to claim 8, in which the shiftable part of the read-out means is formed of at least one sliding bar, each in mesh with a drum bearing the digits from zero to nine, means adapted to push each respective bar against the action of a respectively associated spring and then permitting return until one of its associated stops coacts with one of the said sensing parts.

10. An electrical calculating machine as defined in claim 3, comprising a means for performing shift multiplications, said shift multiplications being accomplished in three successive stages, the first and third stages depending on a fixed control sequence and the second on the number constituting the said multiplier, said multiplication control device including relays to effect the first stage, said relays controlling the closure of contacts in the second group (B) defining the first operand of the multiplication and thereby introducing a nine in the extreme left denomination row of the denomination rows intended to contain said first operand constituting said multiplier, said means also comprising relays having windings connected to contacts belonging to the second group (B) and the third group (R) respectively, said latter relays having their respective windings connected to said contacts of the second group (B) and the third group (R) as to effect the second stage by controlling successive additions of the multiplicand set up in the first group (A) to the number set up in the second group (B) and by adding a 1 each time in the extreme left denomination row of the said multiplier, certain of said relays being actuable by an 8 and a 9 in the extreme left denomination row of the said multiplier the second group (B), as well as to a number less than 5 and greater than 5 in its next to last left denomination row to react in the following manner:

(a) when the last denomination row contains an 8 and the next to the last row of a digit at least equal to 5, the means controls, for the following calculation phase, an addition of the multiplicand and an addition of a 1 in the said last row, without change of denomination row, (b) when the last denomination row contains an 8 and the next to the last row a digit smaller than 5, the means controls an addition of the multiplicand and a shift of one denomination row to the left.

(c) when the last denomination row contains a 9 and the next to the last row a digit at least equal to 5, the means controls an addition of the multiplicand and a shift of one denomination row to the left, (d) when the last denomination row contains a 9 and the next to the last row a number less than 5, the means controls an addition of the multiplicand without denomination row shift, then the conversion of the number obtained into its nine's complement, others of said relays being sensitive to digits at least equal to 5 and to those less than 5 in the next to the left denomination row of the said multiplier in the third group (R), as well as to the denomination row shift control, to thereby control a transfer as a complement of all the denomination rows except the last row to the left when the contacts of the third group (R) that define a digit at least equal to 5 are set at a closed position, to thereby set up a denomination row shift, a transfer of said digit set up as a complement not occurring in the other cases except for the last denomination row to the left, said multiplication control means including at least two relays functioning alternately at each calculation and transfer phase, at least one of the relays of said multiplication control means having windings connected in one of the calculator or transfer circuits to be responsive to the fact that the intermediate result of the product is defined directly or by its nine's complement and to establish different connections as the case may be and at least one additional relay (R6p, R7p) controlling the introduction of a zero or a nine, respectively, in the first denomination row when a denomination row shift occurs, as the intermediate result is defined directly or by its complement, another group of relays 1Ba, 2Ba, 1Bt—Bt, Rb, Re—Rt alternately operating at each calculation phase operatively connected to register each denomination row shift, to thereby control said third stage and to stop the multiplication when the operations depend on the last denomination row of the said multiplier and the digit set up in the last row is at least equal to 8, the control mechanism of the said third stage comprising contacts whose position depends on the digit 8 or 9, respectively, defined by the contacts of the second group (B) of the last row of the multiplier and on the positions of the relays sensitive to the conversions of the intermediate result of the product into its nine's complement, to thereby effect the third stage in the following manner:

(a) when the intermediate product is directly defined and the digit 8 appears in the last row of the multiplier, the mechanism controls an addition of the multiplicand, then a transfer as complement, then three final phases followed by read-out, said three phases consisting of a supplementary addition without addition of a 1 in the last denomination row to the left, then a transfer as complement and finally a new addition accompanied by an addition of 1 in the last denomination row to the left, (b) when the intermediate product is defined by its nine's complement when the digit 8 appears in the last row of the multiplier, the mechanism controls two successive additions of the multiplicand with two direct transfers and then the final phases followed by read-out, (c) when the intermediate product is defined directly and the digit 9 appears in the last row of the multiplier, the mechanism controls an addition and a direct transfer, then the said three final phases followed by the read-out, (d) when the intermediate product is defined by its complementary number and the digit 9 appears in the last row of the multiplier, the mechanism controls an addition of the multiplicand, and then a direct transfer followed by the said three phases and the read-out.

11. A machine according to claim 3, in which each denomination row of the calculation circuit has two input conductors and two output conductors, the relays of the second group acting on double contacts, the contacts of the first group being connected to the contacts of the second group on the one hand and to the windings of the relays of the third group on the other, each relay of the third group comprising two main windings, one of the input conductors being used for the simple addition of the numbers defined by the first and second group contacts of the said denomination row, the second input conductor making it possible to effect the same operation with supplementary addition of a 1, the two output conductors being connected to the two input conductors of the contacts of the next higher denomination row, so that according to whether the current passes through one or the other of the two windings of a third group relay, it does or does not produce the addition of a 1 in the higher denomination row.

12. A machine according to claim 11, in which for each denomination row the second group of elements comprises ten double contacts and the third group ten relays each bearing two main windings, one of the windings of said relays being connected to one of the said output conductors and making it possible to define the numbers less than ten, while the other windings are connected to the other output conductor and make it possible to define the numbers from 10 to 19, the multiple-contact slider having twenty fixed contact members, each connected to one of the ends of the said windings of the relays of the third group, and eleven movable contact members connected, through the contacts of the second group, to the two input conductors.

13. A machine according to claim 11, in which the relays of the second group are polarized relays with at least three positions indicated 0, I, II, one of these three positions being a rest position 0, the polarization of these relays being produced electromatically with the help of polarization windings, the contacts of each relay of the second group having two different working positions I, II, one of which I defines a number while the other II defines its nine's complement, so that each relay is capable of defining two different numbers, means being provided to permit, at will, either direct transfer of the number of the third group into the second group, or transfer of the third group number as its nine's complement into the second group.

14. A machine according to claim 13, in which the second group of relays comprises five relays for each denomination row, each of these relays equipped with a double contact capable of being actuated for one position, and a double contact capable of being actuated for a second position, the third position being that of rest of the said contacts, the contacts actuated for the first position defining the digits from 0 to 4 and the contacts actuated for the second position defining the digits from 5 to 9, each of the relays bearing two main windings, designed to control the closure of the said contacts for each of the said positions, respectively.

15. A machine according to claim 3, in which the read-out means comprises mechanical parts to represent as a decimal number each number defined by the positions of the contacts of at least two relays in each denomination row.

16. A machine according to claim 15, in which each denomination row of the calculation circuit is made up of two portions, each with two input conductors and two output conductors, the second group of the first portion comprising two double contacts, contact means connected to the two output conductors of the preceding denomination row on the one hand and to three movable contact members of a multiple-contact slider of the first group on the other hand, these three movable contact members being able to assume two different positions with respect to four fixed contact members, which are connected to one of the ends of four windings of two relays of the third group, the other ends of these windings being connected to two output conductors of this first portion, respectively, the second group of the second portion comprising five double contacts including an even digit between 0 and 4, connected to the two output conductors of the first portion on the one hand and to six movable contact members of a multiple-contact slider of the first group on the other hand, these six movable contact members being adapted to assume five different positions with respect to ten fixed contact members, each of these last movable contact members being connected to an end of ten windings of five relays of the third group, each of these relays bearing two windings including an even digit between 0 and 8, the other ends of these windings being connected to the two said output conductors of the second portion, respectively, the five-position multiple-contact slider being designed to define the even digits from 0 to 8 for one position of the two-position slider and the odd digits from 1 to 9 for the other position of the said two-position slider.

17. A machine according to claim 16, in which the second group of relays comprises four relays for each denomination row, three of these relays being provided with a double contact including an even digit representation between 0 and 4, capable of being actuated for one position, and a second double contact including even digit representations capable of being actuated for a second position, the third position being that of rest of the said contacts, said first double contacts being used to define the digits 0, 2, 4 and 1, 3, 5, said second contacts being for the digits 8, 6, 4 and 9, 7, 5, the fourth relay comprising a third double contact capable of being actuated for one position and a fourth double contact capable of being actuated for the other position, this fourth relay making it possible to indicate whether the digit defined by any one of the other three relays belongs to the even or the odd group.

18. A machine according to claim 17, in which the read-out mechanism comprises contacts connected in parallel to those of the third group, a means being provided to send an impulse through these contacts in order to transfer the number manifested by the indicator into the second group and a long-duration polarization impulse to hold the number while the means controls a mechanical operation to set the read-out mechanism in a position in which the said contacts connected in parallel to those of the third group are cut out of the circuit, this means then controlling the initiation of the calculation operation to be performed, then, when the result of this operation is set up in the third group, a second mechanical operation during which the read-out mechanism picks up this result to indicate it.

19. A machine according to claim 18, which comprises a means to control the setting at zero of the read-out mechanism, this means first causing the setting at zero of the contacts of the second group, then the locking of these second contacts by a long-duration polarization impulse while the read-out mechanism is set in that one of its positions for which the contacts connected in parallel to those of the third group are cut out of the circuit, then the addition of the first group plus the second group, followed by the transfer to the second group of the result obtained as its nine's complement, then a new addition of the first and second groups with the supplementary addition of a 1 in the last denomination row to the right and finally the starting of the read-out mechanism.

20. A machine according to claim 19, in which the read-out mechanism comprises a bar equipped with stops set at angular intervals with reference to an axis of rotation coinciding with the longitudinal axis of said bar rotatively carrying a number wheel, said stops being adapted to cooperate with relay sensing parts whereby the rotation of said bar is controlled by the respective sensing part with which a stop comes into contact.

21. A machine according to claim 20, in which the number wheel bears two rows of digits arranged side by side, a second shiftable part, whose position depends on at least two relay sensing parts to shift the said number wheel along the axis so as to make the digits of one row or the other row at said window, depending on the positions of the said two sensing parts.

22. A machine according to claim 3, in which each of the relays of the third group comprises at least three contacts operating at the same time, these contacts being cooperatively connected to each of the control windings of the relays of the second group, whereby the first of said three contacts of the third group when closed permits transfer into the second group the number defined by the said contacts of the third group, the second of said three contacts upon closing permits transfer by replacing said number of its nine's complement, and the third of said three contacts permits transfer into the second group said number defined by the contacts of the third group, shifting this number one denomination row, at least one of a group of switches being connected to one of said three contacts to direct current impulse through each relay of the third group and during a transfer phase a current pulse across one of the said three contacts of the third group that corresponds to the kind of transfer desired.

23. A machine according to claim 22, in which each of the relays of the third group comprises a fourth contact, these contacts being cooperatively connected to each of the control windings of the relays of the second group thereby permitting transfer to this latter group the number defined in the third group, making it undergo a denomination row shift and at the same time converting it into its nine's complement.

24. A machine according to claim 22, in which each relay of the second group comprises three control windings, these three windings being cooperatively connected to each of the three contacts of the relays of the R group, respectively, thereby forming three electrically independent transfer circuits, a switch being closeable to send a current pulse at will through one of these three circuits.

25. A machine according to claim 2 equipped with a keyboard with a plurality of denomination rows comprising keys, sliding bars under the keys of each denomination row, each bar having stops coacting with a key when the latter is depressed, each of said bars having as many stops as there are keys in a denomination row and each of said stops being arranged to cooperate with only one key, each of said bars being subject to the action of spring means that urge the said respective stops toward the keys, and means adapted to push each respective bar against the action of its operatively associated spring and then let it return, until one of its stops coacts with a depressed key, each of said bars cooperating respectively with one of the said multiple contact sliders in such a way as to make it assume a position corresponding to the number defined by the depression of one of the keys.

26. A machine according to claim 8, including a sliding bar of the read-out means adapted to cooperate with a multiple-contact slider in such a way as to make it assume the position corresponding to the number defined by the said sensing part coacting with the said stop, while the sliding bar coacting with the keys of the keyboard is held up against its spring by the said bar pushing means.

27. A machine according to claim 26, in which relay control means having the indices $n$, $h$, $j$, $k$ are provided to produce $n$ through $k$ successive shifts in the said direction when the number defined in the third group must undergo $k$ denomination row shifts in the opposite direction.

28. A machine according to claim 1, in which contacts and connections are provided in one of the calculation and transfer circuits in order that at the time of a denomination row shift in one direction, the digit set up in the last denomination row in that direction is transferred to the last denomination row in the opposite direction and terminal means between the end denomination rows permitting, if desired, the transfer of a number from one end row to the other.

29. An electrical calculating machine including denominational rows and a read-out mechanism therefor being controlled by current impulses, comprising three groups A, B, and R of switching elements, the switching elements of the A group being intended to comprise the number to be added in an addition or the number to be subtracted in a subtraction, or the multiplier or the diviser, the switching elements of the B group being intended to comprise the other number of an addition or of a subtraction or the multiplicand or the dividend, the switching elements of the R group being intended to receive the result, said machine having an impulse generator for alternately displacing the number in group R in a calculation phase and in group B in a transfer phase, and a group of control members depending on the calculation operation involved, a device for setting the switching elements of group A for the addition table, said setting device having multiple contacts for addition defining the electrical connections between groups A, B, and R, said connections being traversed by a current from said impulse generator during the calculation phase, for causing the addition of the number contained in the A group with the number contained in the B group, the electrical connections remaining unchanged during all the calculation phases of a calculation operation, whereby an addition of the number maintained in the A group occurs during each calculation phase, independently of the kind of operation to be performed, namely, subtraction, multiplication, division, or decimal shifting to different denominational rows of the machine and whereas at least one of the two other groups B or R is provided with means known in the art for permitting, whenever desired, the conversion into a "complement" number and the decimal shifting of at least one of the numbers defined in the B group or the R group, the control members acting on said means for converting into the complement number and for decimal shifting between groups B and R, whereby the result of the performed operation, addition, subtraction, multiplication, division and decimal shifting, is obtained by a series of additions of the number constantly maintained in the switching elements of the A group, subtraction performing means controlling the closure of the contacts of the B group defining the operand of the first number of the subtraction, said means then controlling a series of impulses from said impulse generator to perform the addition of the numbers defined in the A and B groups, the transfer into the B group of the nine's denomination row of the said addition result, and finally said means controlling a third A+B group addition and the actuation of the machine's read-out mechanism, and division performing means controlling the closure of the contacts of the B group defining the operand of the first number, namely the dividend, of the division, said division controlling means controlling successive additions of the second number, namely the divisor, defined by the contacts of the A group, to the nine's complement of the dividend, and with each addition adding 1 in the extreme right denomination row of a certain number of denomination rows of the machine that are reserved for registering the quotient, said successive additions continuing until a ten's carry takes place in the extreme left denomination row of the dividend, said division performing means comprising at least one relay IRI$d$ actuated by the ten's carry operation to thereby control a transfer of the result obtained in the group R into its nine's row, said division performing means then providing a new addition followed by a row transfer as a complement except for the first denomination row of the portion of the machine reserved for the registration of the quotient, said division performing means then controlling a denomination row shift of one place to the left, and then providing more successive additions until a new ten's carry occurs, until the quotient is obtained.

30. An electrical calculating machine as defined in claim 29, comprising a multiplication control device, said control device comprising means for closing the contacts of the group B defining the first operand of the multiplication, said first operand being the multiplier, said multiplication control device then controlling successive additions of the number defined by the contacts of the A group and constituting the multiplicand simultaneously with the additions of the digit 1 in the extreme left denomination row of a certain number of denomination rows of the machine reserved for the registration of the multiplier, said successive additions continuing until a nine is obtained in the said denomination row, means actuated by the appearance of a nine in the said row to thereby control a one row shift of the number obtained, said multiplication control device again controlling successive additions until a nine is obtained in the extreme left denomination row of the said multiplier, and until the number of additions indicated by said multiplier has been made for each denomination row, said means actuated by the appearance of a nine into the last denomination row during the multiplication thereby simultaneously controlling the said denomination row shift and a new addition, other means providing control upon appearance of zero in the extreme left denomination row of the portion of the machine reserved for the multiplier, a transfer of the number set up in the R group as its complement, and a new addition followed by a denomination row shift and a second transfer as a complement before the multiplication control device begins once more to control new successive additions.

References Cited in the file of this patent

UNITED STATES PATENTS

| | | |
|---|---|---|
| 2,364,540 | Luhn | Dec. 5, 1944 |
| 2,486,809 | Stibitz | Nov. 1, 1949 |
| 2,528,101 | Williams | Oct. 31, 1950 |
| 2,671,611 | Vibbard | Mar. 9, 1954 |
| 2,679,977 | Andrews | June 1, 1954 |
| 2,699,290 | Hoppe | Jan. 11, 1955 |